US008312297B2

(12) United States Patent
Sato et al.

(10) Patent No.: US 8,312,297 B2
(45) Date of Patent: Nov. 13, 2012

(54) PROGRAM ILLEGIBLIZING DEVICE AND METHOD

(75) Inventors: Taichi Sato, Osaka (JP); Motoji Ohmori, Osaka (JP); Rieko Asai, Osaka (JP); Yuichi Futa, Osaka (JP); Tomoyuki Haga, Nara (JP); Masahiro Mambo, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1104 days.

(21) Appl. No.: 11/918,904

(22) PCT Filed: Apr. 21, 2006

(86) PCT No.: PCT/JP2006/308456
§ 371 (c)(1),
(2), (4) Date: Oct. 19, 2007

(87) PCT Pub. No.: WO2006/115219
PCT Pub. Date: Nov. 2, 2006

(65) Prior Publication Data
US 2009/0083521 A1    Mar. 26, 2009

(30) Foreign Application Priority Data
Apr. 21, 2005 (JP) ................................ 2005-124114

(51) Int. Cl.
*G06F 21/00* (2006.01)
(52) U.S. Cl. ............. 713/194; 713/190; 726/22; 726/26
(58) Field of Classification Search ................... 713/194
See application file for complete search history.

(56) References Cited

U.S. PATENT DOCUMENTS

| 5,410,657 | A | * | 4/1995 | Olson et al. ................... 712/215 |
| 5,526,499 | A | * | 6/1996 | Bernstein et al. ............. 712/216 |
| 5,799,179 | A | * | 8/1998 | Ebcioglu et al. .............. 712/234 |
| 6,668,325 | B1 |  | 12/2003 | Collberg et al. |
| 6,839,179 | B2 | * | 1/2005 | Boege ........................... 359/626 |
| 7,263,722 | B1 | * | 8/2007 | Luo et al. ........................ 726/26 |
| 7,383,443 | B2 | * | 6/2008 | Zeman et al. ................. 713/190 |
| 7,620,987 | B2 | * | 11/2009 | Shelest et al. ................... 726/22 |
| 8,112,636 | B1 | * | 2/2012 | Canzanese et al. ........... 713/190 |
| 2004/0019770 | A1 | * | 1/2004 | Kawahito ....................... 712/227 |

(Continued)

OTHER PUBLICATIONS

International Search Report issued Jun. 27, 2006 in the International (PCT) Application of which the present application is the U.S. National Stage.

(Continued)

*Primary Examiner* — Kambiz Zand
*Assistant Examiner* — Yonas Bayou
(74) *Attorney, Agent, or Firm* — Wenderoth, Lind & Ponack, L.L.P.

(57) ABSTRACT

A program obfuscating device for generating obfuscated program from which unauthorized analyzer cannot obtain confidential information easily. The program obfuscating device stores original program that contains authorized program instructions and confidential process instruction group containing confidential information that needs to be kept confidential, generates process instructions which, when executed in predetermined order, provide same result, with execution of last process instruction thereof, as the confidential process instruction group, inserts the process instructions into the original program at position between start of the original program and the confidential process instruction group so as to be executed in the predetermined order, in place of the confidential process instruction group, generates dummy block as dummy of the process instructions, and inserts the dummy block and control instruction, which causes the dummy block to be bypassed, into the original program, and inserts branch instruction into the dummy block.

25 Claims, 21 Drawing Sheets

U.S. PATENT DOCUMENTS

| | | | | |
|---|---|---|---|---|
| 2005/0289331 | A1* | 12/2005 | Watt | 712/245 |
| 2008/0215862 | A1* | 9/2008 | Haga et al. | 712/227 |
| 2009/0083521 | A1* | 3/2009 | Sato et al. | 712/220 |
| 2009/0177873 | A1* | 7/2009 | Sato et al. | 712/233 |
| 2009/0217008 | A1* | 8/2009 | Sato et al. | 712/221 |

OTHER PUBLICATIONS

Murayama et al., "How to make a software program hard to understand", *IEICE Technical Report*, vol. 95, No. 353, pp. 9-14, Nov. 1995 (including partial English translation).

Kamoshida et al., "On Constructing Tamper Resistant Software", *IEICE Technical Report*, vol. 97, No. 461, pp. 69-78, Dec. 1997 (including partial English translation).

Maruyama et al., "Essential Techniques to Make a Software Program Tamper-resistant", *The Institute of Electronics, Information and Communication Engineers*, pp. 302-303, Sep. 1997 (including English translation).

Monden et al., "Methods for Scrambling Programs Containing Loops", *The Transactions of the Institute of Electronics, Information and Communication Engineers*, vol. J80-D-I, No. 7, pp. 644-652, Jul. 1997 (including English translation).

Fukushima et al., "Program Birthmark Scheme with Tolerance to Equivalent Conversion of Java Classfiles", *Information Processing Society of Japan*, vol. 2003, No. 126, pp. 81-16, Dec. 2003.

Monden et al., "Recent Software Protection Technique (Part 1)—Software-only Tamper Prevention", *IPSJ Magazine*, vol. 46, No. 4, pp. 431-437, Apr. 2005 (including partial English translation).

Köbler et al., "The Graph Isomorphism Problem: Its Structural Complexity", *Progress in Theoretical Computer Science*, Birkhäuser Boston, 1993.

Toda, "Graph Isomorphism Problem", *College of Humanities and Sciences*, pp. 44-65, Nihon University, 2001 (including partial English translation).

Wang, "A Security Architecture for Survivability Mechanisms", pp. 1-197, Chenxi Wang, Oct. 2000.

\* cited by examiner

FIG. 3

```
func(int a, int b)
{
```

| Variable declaration part | — 202 |

```
Process group A
Process group B
Process group C
if(condition 1)goto labelF;
```
— 301a

```
Process group D
Process group E
a=b+512;
```
— 301b

```
labelF:
Process group F
Process group G
Process group H
```
— 301c

```
labelJ:
dkey=dkey*24+8;
Process group H
if(dkey>273)goto labelD;
goto labelB;
```

1301j

PROGRAM ILLEGIBLIZING DEVICE AND METHOD

TECHNICAL FIELD

The present invention relates to a technology for converting a program, which is executed while holding secret information, into a program with which it is difficult to analyze the secret information in an unauthorized manner.

BACKGROUND ART

Among conventional methods for preventing a malicious analysis/tampering of a program that uses confidential information such as an encryption key, there is known a method for converting a program into an obfuscated program by modifying the control structure, process or the like of the program into a form with which such an analysis is difficult (for example, see Document 1). Here, the confidential information is such information that needs to be kept confidential from the third party.

Document 1 discloses a method for generating an obfuscated program by inserting copy creation type dummy code that is created by copying part of the original code, and does not have much effect on the program output results.

Here will be described a method of generating an obfuscated program by inserting a pseudo branch instruction and dummy block.

It is presumed here that an original program before obfuscation is composed of instruction group 1, instruction group 2, and instruction group 3, and that the three instruction groups are executed in the order.

In this obfuscation method, dummy variables, which are irrelevant to the execution of the original program, are added to the original program, and some program instruction groups, which rewrite the values of the dummy variables, are inserted into the execution code. Also, a pseudo branch instruction, whose branch destination is determined by a value of a dummy variable, is inserted between instruction group 1 and instruction group 2. This pseudo branch instruction contains a branch condition that always takes a constant truth value (for example, one that always takes a true value) depending on a value of a dummy variable that is determined when the program is executed. Further, the branch destination is set to be the instruction group 2 when the branch condition takes a true value, and is set to be a dummy block when the branch condition takes a false value, The program that was obfuscated as described above is executed in the order of the instruction group 1, pseudo branch instruction, instruction group 2, and instruction group 3. Here, dummy blocks have also been added in the program. However, they are not executed when the program is executed in general use where a special operation, such as forcibly changing the program counter using a debugger or the like, is not executed.

The following describes a method of generating an obfuscated program by inserting the pseudo branch instruction.

It is presumed here that an original program before obfuscation is composed of instruction group 1, instruction group 2, and instruction group 3, and that the three instruction groups are executed in the order.

In this method, first a dummy variable is added into the original program. Next, a pseudo branch instruction, whose branch destination is determined by a value of a dummy variable, is inserted between instruction group 1 and instruction group 2. This pseudo branch instruction contains a branch condition that always takes a constant truth value (for example, one that always takes a true value) depending on a value of a dummy variable that is determined when the program is executed. Further, the branch destination is set to be the instruction group 2 when the branch condition takes a true value, and is set to be the instruction group 3 when the branch condition takes a false value, The program that was obfuscated as described above is executed in the order of the instruction group 1, pseudo branch instruction, instruction group 2, and instruction group 3.

Document 1 discloses that with the above-described obfuscation, it becomes difficult to estimate an algorithm from the program and to estimate a location of a particular module. For example, when it is desired to protect an encryption key contained in an encryption algorithm program from an unauthorized analysis, it is possible to make difficult the estimation of a location of an encryption algorithm module.

However, even if the program control structure has been made complicated using such a method, the confidential information such as an encryption key exists somewhere in the program. As a result, when all the constant data existing in the program is collected, the confidential information is found in the collected constant data.

Accordingly, in the case of encryption algorithm, for example, an unauthorized analyzer can encrypt a plain text to obtain an encrypted text assuming that each piece of constant data existing in the program is an encryption key, and check whether the obtained encrypted text matches an actual encrypted text. By continuing this operation, the unauthorized analyzer can detect an authentic encryption key sooner or later.

With respect to this problem, Document 1 discloses a method of obfuscating a program by replacing a program instruction containing confidential information with a plurality of program instruction groups. Document 1 discloses, for example, that when "1234" contained in program instruction "d0=1234" is confidential information, the program instruction "d0=1234" is replaced with program instruction groups "d0=230", "d0=d0+1000", and "d0=d0+4", and the program instruction groups are arranged separately in a distributed manner. With this method, even if all the constant data existing in the program is collected, it is impossible to detect the confidential information from the collected constant data. The plurality of program instructions generated by dividing the confidential information are called "divisional secrets".

Document 1: Kamoshida, Matsumoto, Inoue, "On Constructing Tamper Resistant Software", ISEC97-59

Document 2: Johaaes Koebler, Uwe Schoening, Jacobo Toran, "The Graph Isomorphism Problem", Birkhaauser, 1993

Document 3: Seinosuke Toda, "Graph Isomorphism Problem", College of Humanities and Sciences, Nihon University, 2001

SUMMARY OF THE INVENTION

The Problems the Invention is Going to Solve

As described above, there is known a method for converting a first program instruction containing the confidential information into a second program instruction group (in this example, a plurality of divisional secrets) having the same function as the first program instruction.

However, an unauthorized analyzer may detect the plurality of divisional secrets from a program having been obfuscated using the divisional secrets. For example, the unauthorized analyzer may focus on a variable used in the second program instruction group, and collect, from the obfuscated program, expressions that use the variable. For example, in the case where the aforesaid confidential information "d0=1234" is replaced with four processes "d0=230", "d0=d0+1000", and "d0=d0+4", the unauthorized analyzer can collect, from the program, processes that use variable "d0", detect the divisional secrets constituting the second program instruction group, and obtain the confidential information "d0=1234" from the detected divisional secrets.

The object of the present invention is therefore to provide program obfuscating device and method for generating an obfuscated program from which an unauthorized analyzer cannot obtain confidential information easily.

Means to Solve the Problems

The above-stated object of the present invention is fulfilled by a program obfuscating device for generating a program that is difficult to be analyzed from an original program which is composed of one or more authorized program instructions and contains a confidential process instruction group containing confidential information that needs to be kept confidential, the program obfuscating device comprising: a storage unit storing the original program; a process instruction generating unit operable to generate a plurality of process instructions which provide a same result as the confidential process instruction group, by executing last of the process instructions when the process instructions are executed in a predetermined calculation order; a process instruction inserting unit operable to insert the plurality of process instructions into the original program at a position between a start of the original program and the confidential process instruction group so as to be executed in the predetermined processing order, in place of the confidential process instruction group; a dummy block generating unit operable to generate at least one dummy block as a dummy of the plurality of process instructions; and a dummy block inserting unit operable to insert the at least one dummy block and a control instruction, which causes the dummy block to be bypassed, into the original program, and insert a branch instruction into the at least one dummy block generated by the dummy block generating unit.

Effects of the Invention

With the above-described structure in which the program obfuscating device inserts dummy blocks containing dummy process instructions into the original program, even-if an unauthorized analyzer of the original program detects a plurality of process instructions, it is difficult for the unauthorized analyzer to obtain a plurality of process instructions that are necessary for obtaining the confidential information since the detected process instructions include dummy process instructions. That is to say, the unauthorized analyzer cannot obtain the confidential information with ease.

In the above-stated program obfuscating device, the confidential process instruction group may be a confidential calculation expression that contains the confidential information as an object of the expression, the process instruction is a calculation expression that substitutes a calculation result for a secret variable, the dummy process instruction is a dummy calculation expression whose calculation object is the secret variable, the process instruction generating unit generates a plurality of calculation expressions which provide a same result as the confidential calculation expression, by executing last of the calculation expressions when the calculation expressions are executed in a predetermined calculation order, and the process instruction inserting unit includes: a replacement subunit operable to replace the confidential information contained in the original program with the secret variable; and an inserting subunit operable to insert the plurality of calculation expressions into the original program at a position between a start of the original program and the confidential process instruction group so as to be executed in the predetermined calculation order.

With the above-described structure in which the program obfuscating device inserts dummy blocks containing dummy calculation expressions into the original program, even if an unauthorized analyzer of the original program detects a plurality of calculation expressions, it is difficult for the unauthorized analyzer to obtain a plurality of calculation expressions that are necessary for obtaining the confidential information since the detected calculation expressions include dummy calculation expressions. That is to say, the unauthorized analyzer cannot obtain the confidential information with ease.

In the above-stated program obfuscating device, the dummy block inserting unit may insert into the at least one dummy block generated by the dummy block generating unit, a branch instruction whose branch destination is one of: (i) one of the one or more authorized program instructions; (ii) one of the plurality of process instructions; and (iii) another dummy block.

With the above-described structure in which the program obfuscating device inserts, into a dummy block, a branch instruction which branches from the dummy block to either an authorized program instruction contained in the original program or another dummy block, it becomes difficult for the unauthorized analyzer to analyze the original program.

In the above-stated program obfuscating device, the original program may contain a plurality of original blocks each of which contains one or more authorized program instructions, the original blocks being arranged in an order of execution, the process instruction inserting unit inserts each of the plurality of process instructions into a different one among a series of original blocks from an original block to be executed first to an original block containing the confidential process instruction group, and the dummy block inserting unit includes: a first generating subunit operable to generate a graph by regarding each of the plurality of original blocks and the at least one dummy block as a node, based on (a) an order of execution of the original blocks, (b) branch instructions contained in the original blocks, and (c) branch instructions contained in the at least one dummy block; a judging subunit operable to judge whether or not a difficulty level of the generated graph satisfies a predetermined condition; a second generating subunit operable to insert the at least one dummy block and the control instruction into the original program when the judging subunit judges that the difficulty level satisfies the predetermined condition, and insert a conditional branch instruction, whose branch destination is a block among the plurality of original blocks and another dummy block, into one of the at least one dummy block when the judging subunit judges that the difficulty level does not satisfy the predetermined condition; and a control subunit operable to perform a control such that the first generating subunit, the judging subunit, and the second generating subunit continue to perform processes thereof until the predetermined condition is satisfied.

With the above-described structure in which the program obfuscating device generates a graph from the original program in which dummy blocks have been inserted, it is possible to treat the original program in which dummy blocks have been inserted, as the subgraph isomorphism problem.

The subgraph isomorphism problem is a problem that is known as, when two graphs (a subgraph and an entire graph) are given, it is difficult to detect the subgraph from the entire graph. With application of the subgraph isomorphism problem to the invention, it becomes difficult to detect the original program, in which no dummy block is inserted, from a graph that has been made from the original program in which dummy blocks had been inserted.

The above-stated program obfuscating device may further comprise a receiving unit operable to receive a specified obfuscation strength, wherein it is regarded that the predetermined condition is satisfied when a value "(number of edges)–(number of nodes)", which is obtained from number of edges connecting nodes and number of nodes, is not smaller than a predetermined number that is determined according to a graph difficulty level corresponding to the specified obfuscation strength, and the judging subunit obtains number of edges and number of nodes from the graph generated by the first generating subunit, and judges whether the value "(number of edges)–(number of nodes)" is not smaller than the predetermined number.

With the above-described structure, the program obfuscating device can generate a graph, using the value "(number of edges)–(number of nodes)" as an index of the strength of the graph.

The above-stated program obfuscating device may further comprise a receiving unit operable to receive a specified obfuscation strength, wherein it is regarded that the predetermined condition is satisfied when number of closed paths in a graph is not smaller than a predetermined number that is determined according to a graph difficulty level corresponding to the specified obfuscation strength, and the judging subunit obtains number of closed paths from the graph generated by the first generating subunit, and judges whether the obtained number of closed paths is not smaller than the predetermined number.

With the above-described structure, the program obfuscating device can generate a graph, using the number of closed paths as an index of the strength of the graph.

In the above-stated program obfuscating device, when the graph is not a planar graph, it is regarded that the predetermined condition is satisfied, and the judging subunit judges whether or not the graph generated by the first generating subunit is a planar graph, and judges that the predetermined condition is satisfied when the judging subunit has judged the graph is not a planar graph.

With the above-described structure, the program obfuscating device can generate a graph, using, as an index of the strength of the graph, the fact that the graph is not a planar graph.

The above-stated program obfuscating device may further comprise a receiving unit operable to receive a specified obfuscation strength, wherein it is regarded that the predetermined condition is satisfied when number of closed paths, each of which is composed of a first predetermined number or more of nodes, is not smaller than a second predetermined number that is determined according to a graph difficulty level corresponding to the specified obfuscation strength, and the judging subunit obtains number of closed paths, each of which is composed of the first predetermined number or more of nodes, from the graph generated by the first generating subunit, and judges whether the obtained number of closed paths is not smaller than the second predetermined number.

With the above-described structure, the program obfuscating device can generate a graph, using the number of closed paths as an index of the strength of the graph.

In the above-stated program obfuscating device, the dummy block inserting unit may insert into each of the plurality of original blocks, a conditional branch instruction which contains a comparative expression with which a constant truth value is provided when each calculation is executed in a predetermined calculation order, where a branch destination of the conditional branch instruction is a next original block that is to be executed immediately after the original block in which the conditional branch instruction is inserted, when comparison result of the comparative expression is the constant truth value, and the control instruction is a conditional branch instruction inserted in an original block immediately after which a dummy block is inserted.

With the above-described structure, the program obfuscating device can make the original program difficult to analyze by inserting a conditional branch instruction, with which a constant truth value is provided, into the original program.

In the above-stated program obfuscating device, the original program contains a plurality of original blocks each of which contains one or more authorized program instructions, the original blocks being arranged in an order of execution, the process instruction inserting unit inserts each of the plurality of process instructions into one among a series of original blocks from an original block to be executed first to an original block containing the confidential process instruction group, and the dummy block inserting unit includes: a first generating subunit operable to generate a graph by regarding each of the plurality of original blocks and the at least one dummy block as a node, based on (a) an order of execution of the original blocks, (b) branch instructions contained in the original blocks, and (c) branch instructions contained in the at least one dummy block; a judging subunit operable to judge whether or not a strength of the generated graph satisfies a predetermined condition; a second generating subunit operable to insert the at least one dummy block and the control instruction into the original program when the judging subunit judges that the strength satisfies the predetermined condition, and either (i) insert a conditional branch instruction, whose branch destination is a block among the plurality of original blocks and another dummy block, into one of the at least one dummy block, or (ii) insert a conditional branch instruction, whose branch destination is a dummy block and which never branch to the branch destination, into an original block when the judging subunit judges that the strength does not satisfy the predetermined condition; and a control subunit operable to perform a control such that the first generating subunit, the judging subunit, and the second generating subunit continue to perform processes thereof until the predetermined condition is satisfied.

With the above-described structure in which the program obfuscating device generates a graph from the original program in which dummy blocks have been inserted, it is possible to treat the original program in which dummy blocks have been inserted, as the subgraph isomorphism problem. With application of the subgraph isomorphism problem to the invention, it becomes difficult to detect the original program, in which no dummy block is inserted, from a graph that has been made from the original program in which dummy blocks had been inserted.

In the above-stated program obfuscating device, the process instruction generating unit may generate the plurality of process instructions such that the process instructions provide the same result as the confidential process instruction group only when the process instructions are executed in the predetermined processing order.

With the above-described structure in which the plurality of process instructions generated by the program obfuscating device produce the confidential information only when they are executed in a correct calculation order, it is impossible for an unauthorized analyzer to obtain the confidential information unless the unauthorized analyzer detects the correct calculation order. That is to say, the program obfuscating device can make the original program difficult to analyze.

In the above-stated program obfuscating device, the dummy block inserting unit may include: a dividing subunit operable to divide the original program into a plurality of post-division blocks each of which includes one or more authorized program instructions; a replacement object block generating subunit operable to generate one or more replacement object blocks each of which includes a branch instruction indicating a post-division block to be executed next, respectively from one or more post-division blocks among the plurality of post-division blocks, excluding a post-division block that includes an authorized program instruction that is to be executed last in the original program; a block replacement subunit operable to replace with each other, in an arrangement order, (a) one or more replacement object blocks excluding a replacement object block that includes an authorized program instruction that is to be executed first in the original program and (b) the post-division block that includes the authorized program instruction to be executed last in the original program; and an inserting subunit operable to insert the at least one dummy block into the original program, wherein the control instruction is a branch instruction contained in a replacement object block immediately after which a dummy block is inserted.

With the above-described structure in which the program obfuscating device replaces the post-division blocks with each other in position, excluding the first post-division block of the original program, the program obfuscating device can make the original program difficult to analyze.

In the above-stated program obfuscating device, the dividing subunit may further divide the at least one dummy block into a plurality of dummy post-division blocks each of which includes one or more program instructions, the replacement object block generating subunit further generates dummy replacement object blocks, each of which includes a branch instruction indicating a dummy post-division block other than a current dummy post-division block, respectively from the plurality of dummy post-division blocks, and the inserting subunit inserts the dummy replacement object blocks into the original program.

With the above-described structure, the program obfuscating device makes the original program difficult to analyze, by inserting the dummy post-division blocks constituting the dummy blocks into the original program.

In the above-stated program obfuscating device, the replacement object block generating subunit may further generate dummy replacement object blocks, each of which includes a branch instruction indicating one divided block or a dummy block other than a current dummy block, respectively from the plurality of dummy blocks, and the inserting subunit inserts the dummy replacement object blocks into the original program.

With the above-described structure, the program obfuscating device makes the original program difficult to analyze, by inserting dummy blocks into the original program.

In the above-stated program obfuscating device, the original program may have been preliminarily divided into a plurality of post-division blocks each of which includes one or more authorized program instructions, the post-division blocks being arranged in an order of execution, the process instruction inserting unit inserts each of the plurality of process instructions into one among a series of post-division blocks from a post-division block to be executed first to a post-division block containing the confidential process instruction group, and the dummy block inserting unit includes: a dividing subunit operable to divide the original program into a plurality of post-division blocks each of which includes one or more authorized program instructions; a replacement object block generating subunit operable to generate one or more replacement object blocks each of which includes a branch instruction indicating a post-division block to be executed next, respectively from one or more post-division blocks among the plurality of post-division blocks, excluding a post-division block that includes an authorized program instruction that is to be executed last in the original program; a block replacement subunit operable to replace with each other, in an arrangement order, (a) one or more replacement object blocks excluding a replacement object block that includes an authorized program instruction that is to be executed first in the original program and (b) the post-division block that includes the authorized program instruction to be executed last in the original program; and an inserting subunit operable to insert the at least one dummy block into the original program, wherein the control instruction is a branch instruction contained in a replacement object block immediately after which a dummy block is inserted.

With the above-described structure in which the program obfuscating device replaces the post-division blocks with each other in position, excluding the first post-division block of the original program, the program obfuscating device can make the original program difficult to analyze.

BRIEF DESCRIPTION OF THE DRAWING

FIG. 3 shows one example of the structure of the basic block generated from the obfuscation target program 201.

Figure 1:
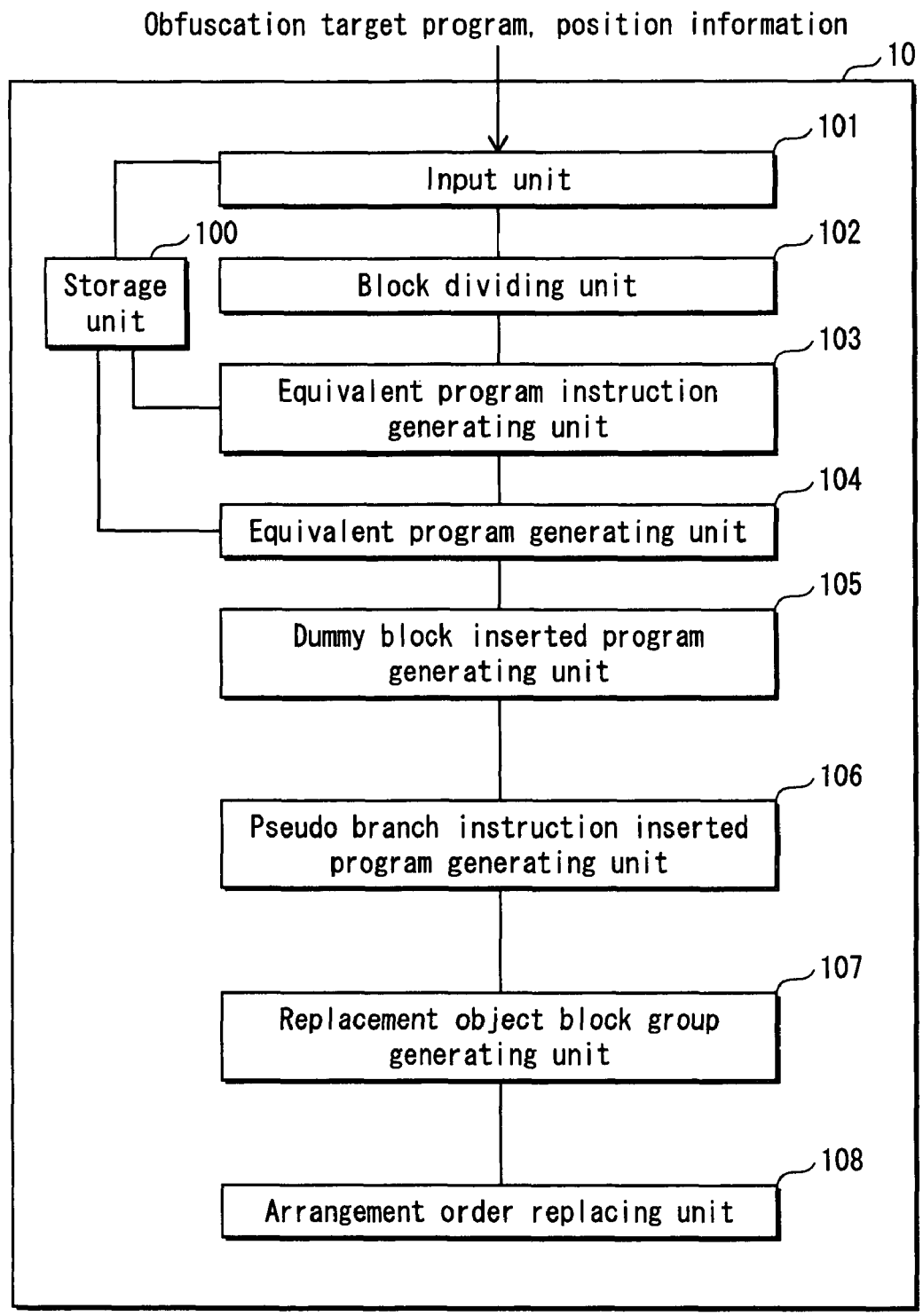
FIG. 1 is a block diagram showing the structure of the program obfuscating device 10.

DESCRIPTION OF CHARACTERS 10 program obfuscating device
100 storage unit
101 input unit
102 block dividing unit
103 equivalent program instruction generating unit
104 equivalent program generating unit
105 dummy block inserted program generating unit
106 pseudo branch instruction inserted program generating unit
107 replacement object block group generating unit
108 arrangement order replacing unit
201 obfuscation target program
202 variable declaration part
203 process part

DETAILED DESCRIPTION OF THE INVENTION

1. Embodiment 1

The following describes a program obfuscating device 10 as Embodiment 1 of the present invention, with reference to the attached drawings.

1.1 Structure of Program Obfuscating Device 10

The program obfuscating device 10 includes, as shown in FIG. 1, a storage unit 100, an input unit 101, a block dividing unit 102, an equivalent program instruction generating unit 103, an equivalent program generating unit 104, a dummy block inserted program generating unit 105, a pseudo branch instruction inserted program generating unit 106, a replacement object block group generating unit 107, and an arrangement order replacing unit 108. The following is a description of each component element.

In the following, first the operation of the component element will be described. Then, to make the component element more clearer, a process example of each component element will be described in an example of an obfuscation target program.

1.1.1 Input Unit 101

The input unit 101 receives an obfuscation target program and position information, where the obfuscation target program holds confidential information, and the position information indicates a position of a program instruction that has confidential information for the obfuscation target program.

The input unit 101 stores the received obfuscation target program and position information into the storage unit 100.

The input unit 101 outputs a division instruction for dividing the obfuscation target program, to the block dividing unit 102.

Here, the obfuscation target program is, for example, a program that decrypts an encrypted text using an encryption key being confidential information. The position information is a line number of a program instruction holding secret information for the received obfuscation target program.

A specific example will be given in the following.

Figure 2:
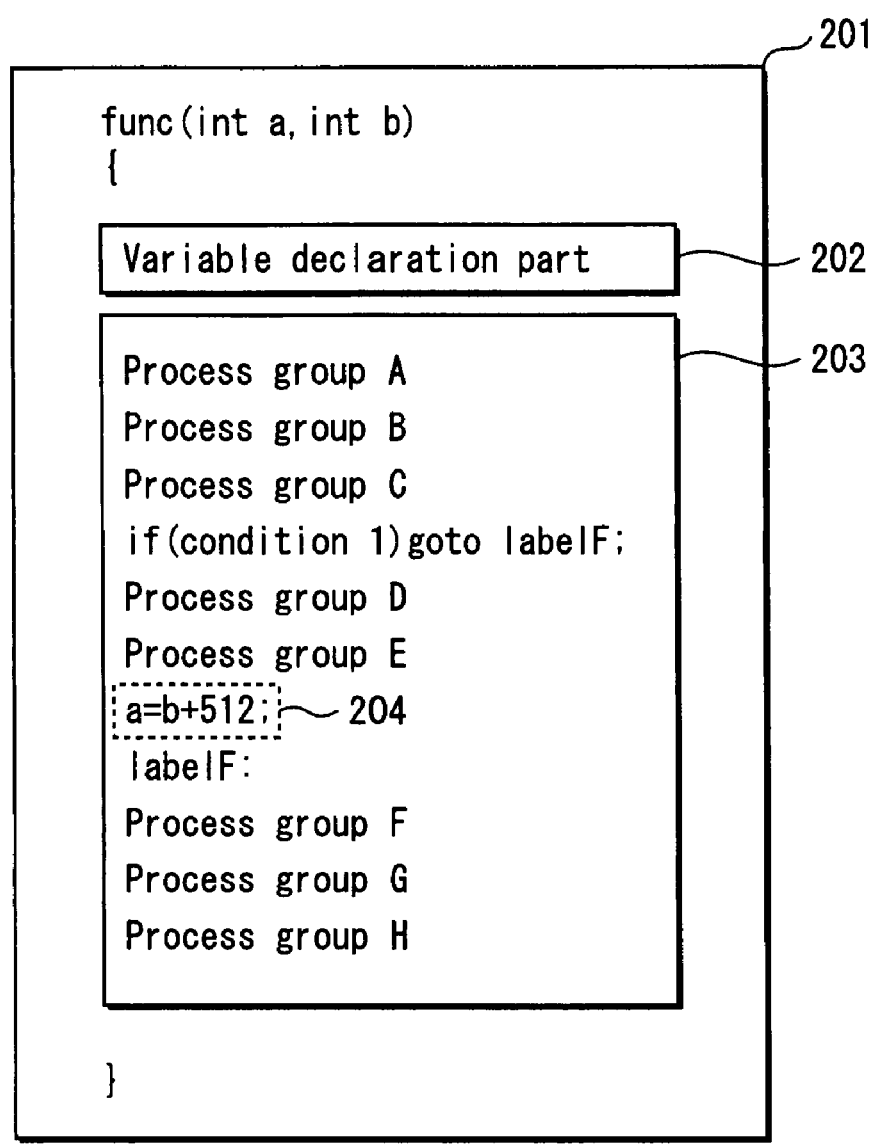
FIG. 2 shows one example of the structure of the obfuscation target program 201.

FIG. 2 shows one example of the obfuscation target program received by the input unit 101.

In FIG. 2, an obfuscation target program 201 is composed of a function "func". The function func is composed of a variable declaration part 202 and a process part 203. Although simplified in the illustration, a process group A is really a program instruction group composed of N pieces of program instructions: instruction a_1; instruction a_2; ... ; and instruction a_N, excluding repeat instructions (for statement, while statement, do-while statement), selection instructions (if statement, switch statement), and unconditional branch instructions (go to statement, break statement, continue statement, return statement). One example of an instruction in instruction a_1; instruction a_2; ... ; and instruction a_N is a program instruction "x+=10;" that instructs to add a constant to a variable. This also applies to process groups B, D, F, G, and H. It is presumed here that the last program instruction of process group H is "return;". The terms used in the C language are known, and a detailed description of the terms is omitted here.

The process groups C and E are program instruction groups each of which is composed of the same types of program instructions as the process A, except that the number of instructions contained therein is (N−1).

The process part 203 includes a program instruction 204 holding the confidential information. The program instruction 204 is a program instruction "a=b+512;" including confidential information "512" for the obfuscation target program 201.

The input unit 101 receives the obfuscation target program 201 and position information (in this example, the line number of the program instruction 204), and stores the received obfuscation target program 201 and position information into the storage unit 100.

The input unit 101 outputs the division instruction instructing to divide the obfuscation target program 201, to the block dividing unit 102.

In the following description, the obfuscation target program 201 will be used as a specific example.

1.1.2 Storage Unit 100

The storage unit 100 stores the received obfuscation target program and position information.

More specifically, the storage unit 100 stores the obfuscation target program 201 received by the input unit 101, and the position information indicating the position of the program instruction "a=b+512;" including confidential information "512" for this 201.

1.1.3 Block Dividing Unit 102

The block dividing unit 102, upon receiving the division instruction, reads out the obfuscation target program from the storage unit 100, and divides the process part included in the obfuscation target program in to one or more post-division blocks.

The block dividing unit 102 divides the process part included in the received obfuscation target program into one or more basic blocks, and generates post-division blocks by dividing each basic block into small pieces. It should be noted here that the basic block is a program instruction group composed of one or more program instructions, merges with another program instruction group only at the start of the program instruction group, not at the other positions thereof, and branches to another program instruction group only at the end of the program instruction group, not at the other positions thereof. A detailed description of the terms concerning the compiler is omitted here.

(1) Generating Basic Block

Upon receiving the obfuscation target program from the input unit 101, the block dividing unit 102 divides the process part included in the received obfuscation target program into one or more basic blocks. Here, the basic block is constructed such that its starting position is (a) the start of the process part (the program instruction at the entrance of the obfuscation target program, namely, the program instruction executed first among the instructions of the obfuscation target program), (b) a program instruction for merging with another process, or (c) a program instruction that follows a program instruction for branching, and its ending position is (a) a program instruction that is immediately before a program instruction for merging with another process, (b) the end of the process part (the program instruction at the exit of the program, namely, the program instruction executed last among the instructions of the obfuscation target program), or (c) a branch program instruction.

Generation of basic blocks is known in the technical field of compiler, and a detailed description thereof is omitted here.

With the above-described structure, the block dividing unit 102 can divide an obfuscation target program and thereby generate a plurality of basic blocks. Also, each of the program instructions constituting the obfuscation target program is included in any one basic block by the block dividing unit 102.

(2) Generating Post-Division Block

The block dividing unit 102 generates one or more post-division blocks by dividing each of the generated basic blocks as follows.

The block dividing unit 102 divides each basic block into ($[m-1/N]+1$) pieces of post-division blocks, where "m" denotes the number of program instruction contained in the basic block, and "N" denotes a predetermined number. In this division, it is attempted that each block has as equal number of program instructions as possible. Here, [a/b] represents an operation expression for performing a division "a/b" and obtaining an integer by truncating the fractional part from the result of the division. For example, [5/2]=2.

(3) Specific Example

FIG. 3 shows a result of dividing the obfuscation target program shown in FIG. 2 into basic blocks.

In FIG. 3, 301a through 301c indicate basic blocks that are generated by dividing the process part 203 of the function func shown in FIG. 2.

The basic block 301a is composed of program instructions such that the basic block 301a starts with a process group A that includes the program instruction at the entrance of the function func (namely, the program instruction executed first among the instructions of the function), and the basic block 301a includes program instructions thereafter up to program instruction "if (condition 1) go to label F;" being a conditional branch instruction (for statement, while statement, do-while statement, if statement, switch statement) that appears first after the process group A. The reason why the basic block 301a ends with this conditional branch instruction is that the basic block can branch only at the end of the block.

The basic block 301b is composed of program instructions such that the basic block 301b starts with a program instruction that is immediately after the last program instruction of the basic block 301a, and ends with program instruction "a=b+512;" that is immediately before "labelF;" being a position where a merge occurs first after the start of the basic block 301b. Here, the reason why the basic block 301b ends with the program instruction immediately before the merging position is that the basic block merges only at the start of the block. Also, the reason why "labelF;" is determined to be a merging position is that there may be two or more paths over which the process can move to "labelF;". For example: a process may move thereto by a conditional branch after the basic block 301a is executed; and a process may move thereto after the basic block 301b is executed.

The basic block 301c is composed of program instructions such that the basic block 301c starts with a program instruction that is immediately after the last program instruction of the basic block 301b, and ends with a program instruction that is the exit of the function func (namely, the program instruction that is executed last among the instructions of the function).

Figure 4:
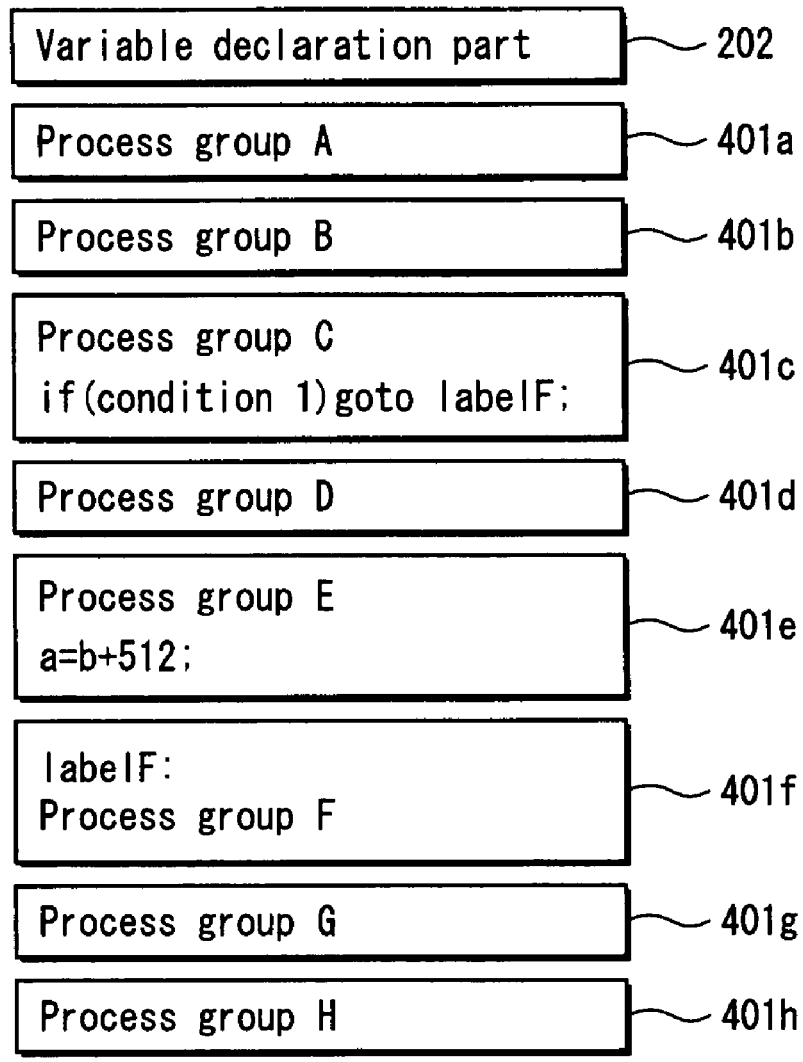
FIG. 4 shows one example of the structure of the post-division block generated from the basic block.

Next, FIG. 4 shows the result of dividing each basic block shown in FIG. 3 into post-division blocks.

The total number of program instructions contained in the basic block 301a composed of process groups A, B, and C is 3N. This is because it is presumed here that the number of program instructions contained in each of process groups A and B is N, that the number of program instructions contained in process group C is N−1, and that the basic block 301a includes program instruction "if (condition 1) go to label F;".

The number of post-division blocks generated by dividing the basic block 301a is 3, which is obtained by substituting 3N for m in the expression ($[(m-1)/N]+1$). The three post-division blocks generated by dividing the basic block 301a are post-division blocks 401a through 401c.

Similarly, post-division blocks generated by dividing the basic block 301b, which is composed of 2N pieces of program instructions, are post-division blocks 401d through 401e. Further similarly, post-division blocks generated by dividing the basic block 301c, which is composed of 3N pieces of program instructions, are post-division blocks 401f through 401h.

The present embodiment shows a structure where basic blocks are further divided into post-division blocks. However, basic blocks themselves may be treated as post-division blocks.

1.1.4 Equivalent Program Instruction Generating Unit 103

The equivalent program instruction generating unit 103 generates an instruction group having a function that is equivalent to the function of a program instruction containing the confidential information. In the following description, each instruction constituting this instruction group is referred to as equivalent program instruction.

In the present embodiment, for the sake of convenience, instructions constituting a program instruction group, which calculates a constant as the confidential information from a plurality of program instructions, are referred to as equivalent program instructions.

The equivalent program instruction generating unit 103 determines a variable name (secret information dedicated variable name) used for equivalent program instructions, generates a graph, determines an equivalent program instruction insertion target block, and generates an equivalent program instruction to be inserted into the equivalent program instruction insertion target block.

(1) Determining Secret Information Dedicated Variable Name

The equivalent program instruction generating unit 103 determines a name of a variable used for the equivalent program instruction.

First, the equivalent program instruction generating unit 103 analyzes the obfuscation target program to check on all variable names used in the program. Next, the equivalent program instruction generating unit 103 generates a variable name that does not overlap any of the currently used variable names, and determines the generated variable name as the secret information dedicated variable name.

(2) Generating Graph

The equivalent program instruction generating unit 103 generates a graph showing the structure of the obfuscation target program.

The equivalent program instruction generating unit 103 regards each post-division block, which was generated by the block dividing unit 102, as a node. Further, in the case where the first node includes a branch instruction (unconditional branch instruction such as goto statement, break statement, continue statement, or return statement, or conditional branch instruction such as for statement, while statement, do-while statement, if statement, or switch statement) for branching to the second node, or in the case where the last program instruction of the first node is a program instruction other than the unconditional branch instruction and the second node includes a program instruction that follows, on the program, a program instruction corresponding to the last program instruction of the first node, the equivalent program instruction generating unit 103 determines that there is an edge between the first and second nodes and generates a graph that includes the nodes and edge. The terms concerning the graph are known, and description thereof is omitted here. Generation of graphs is known in the technical field of compiler, and a detailed description thereof is omitted here.

In such a graph, the first node is also called a preceding block to the second block, and the second node is also called a succeeding block to the first block.

Also, it is presumed here that a node including a program instruction that contains confidential information indicated by position information is referred to as a confidentiality holding node. Further, anode containing a program instruction positioned at the entry of a program (program instruction that is executed first among instructions of the program) is referred to as a start node, and a node containing a program instruction positioned at the exit of a program (program instruction that is executed last among instructions of the program) is referred to as an end node.

(3) Determining Equivalent Program Instruction Insertion Target Block

The equivalent program instruction generating unit 103 determines, based on the generated graph, a post-division block into which to insert an equivalent program instruction.

First, the equivalent program instruction generating unit 103 regards, as a first equivalent program instruction insertion target block, a block corresponding to the confidentiality holding node. Next, when there is only one preceding block to the first equivalent program instruction insertion target block, the equivalent program instruction generating unit 103 regards the preceding block as a second equivalent program instruction insertion target block. Following this, similarly, when there is only one preceding block to the $n^{th}$ equivalent program instruction insertion target block, the equivalent program instruction generating unit 103 regards the preceding block as the $(n+1)^{th}$ equivalent program instruction insertion target block. When there are a plurality of preceding blocks to the $n^{th}$ equivalent program instruction insertion target block, the equivalent program instruction generating unit 103 stops the process, and determines that the number of equivalent program instructions is n. In the following description, a post-division block that was not selected as an equivalent program instruction insertion target block in any of the above-described steps is referred to as equivalent program instruction not-inserted block.

When equivalent program instruction insertion target blocks are determined by the above-described method, the second equivalent program instruction insertion target block is executed without fail before the first equivalent program instruction insertion target block is executed, when the determined blocks are executed in general use where a special operation, such as forcibly changing the program counter using a debugger or the like, is not executed. This is understood from the fact that the only preceding block to the first equivalent program instruction insertion target block is the second equivalent program instruction insertion target block. Similarly, the $n^{th}$ equivalent program instruction insertion target block is executed without fail before the $(n-1)^{th}$ equivalent program instruction insertion target block is executed. In summary, the $n^{th}$ $(n-1)^{th}$, . . . , second equivalent program instruction insertion target blocks are executed in the stated order before the first equivalent program instruction insertion target block is executed. The process of actually inserting the equivalent program instructions is performed by the equivalent program generating unit 104. A detailed description thereof will be provided later.

(4) Generating Equivalent Program Instruction

The equivalent program instruction generating unit 103 generates equivalent program instructions to be inserted into the equivalent program instruction insertion target block. The equivalent program instruction generating unit 103 generates as many equivalent program instructions as the number of equivalent program instructions "n". It is presumed here that the number of equivalent program instructions is "N", and based on this, the following will describe the procedures of generating first through the $N^{th}$ equivalent program instructions.

(A) Generating First Equivalent Program Instruction

The equivalent program instruction generating unit 103 selects integer RA_0 randomly, and generates the first equivalent program instruction "(secret information dedicated variable)=RA_0;".

(B) Generating $t^{th}$ (t=2, 3, . . . N−1) Equivalent Program Instruction

The equivalent program instruction generating unit 103 randomly selects integers RA_t and RB_t, excluding "0". The equivalent program instruction generating unit 103 then generates the $t^{th}$ (t=2, 3, . . . N−1) equivalent program instruction "(secret information dedicated variable)=(secret information dedicated variable) ($t^{th}$ operator) RA_t+RB_t;" using the selected integers RA_t and RB_t other than "0" and using the $t^{th}$ operator. Here, the $t^{th}$ operator is either "*" denoting a multiplication, or "/" denoting a division, and either of these is selected randomly as the $t^{th}$ operator.

(C) Generating $N^{th}$ Equivalent Program Instruction

The equivalent program instruction generating unit 103 randomly selects integer RA_N, excluding "0". The equivalent program instruction-generating unit 103 then generates the $N^{th}$ equivalent program instruction "(secret information dedicated variable)=(secret information dedicated variable)*RA_N+(first value);" using the selected integer RA_N other than "0" and using the operator "*".

Here, a method of generating the first value will be described.

The equivalent program instruction generating unit 103 obtains the position information stored in the storage unit 100, and obtains the value of the confidential information contained in the program instruction indicated by the obtained position information.

The equivalent program instruction generating unit 103 then calculates, as the second value, the value of the secret information dedicated variable, which is obtained when executing the following program instruction group that is composed of the first through $(N-1)^{th}$ equivalent program instructions arranged in the order:
"(secret information dedicated variable)=RA_0;
(secret information dedicated variable)=(secret information dedicated variable) (second operator) RA_2+RB_2;
(secret information dedicated variable)=(secret information dedicated variable) (third operator) RA_3+RB_3; . . .
(secret information dedicated variable)=(secret information dedicated variable) $((N-1)^{th}$ operator) RA_(N-1)+RB_(N-1);".

The equivalent program instruction generating unit 103 determines, as the first value, the value that is obtained by the following expression:

$$\text{(First value)}=\text{(value of confidential information)}-\{\text{(second value)}*RA\_N\}. \quad \text{Expression 1}$$

When the first through the $N^{th}$ equivalent program instructions are generated by the above-described method, and when the instructions of the following program instruction group are executed in the order, the secret information dedicated variable becomes equal to the value of the confidential information, at the end of the process:
"(secret information dedicated variable)=RA_0;
(secret information dedicated variable)=(secret information dedicated variable) (second operator) RA_2+RB_2;
(secret information dedicated variable)=(secret information dedicated variable) (third operator) RA_3+RB_3; . . .
(secret information dedicated variable)=(secret information dedicated variable) $((N-1)^{th}$ operator) RA_(N-1)+RB_(N-1);
(secret information dedicated variable)=(secret information dedicated variable)$((N\_1)^{th}$ operator)*RA_N+(first value);".

According to this generation method, it is found, for example, that a value obtained by executing the equivalent program instructions in the order of the first, second, . . . , $(t-1)^{th}, (t+1)^{th}, t^{th}, (t+2)^{th}, \ldots, N^{th}$ in which the $t^{th}$ and $(t+1)^{th}$ equivalent program instructions have been replaced with each other, is different from a value obtained by executing the equivalent program instructions in the original order of the first, second, . . . , $N^{th}$.

It should be noted here that the operations of the equivalent program instructions are not limited to the combination of the multiplication and addition as shown in this example, but may be any types of operations in so far as the instructions provide the value of the confidential information.

(5) Specific Example

First, the equivalent program instruction generating unit 103 refers to the obfuscation target program 201 shown in FIG. 2 to check on the variable names of the arguments used in the function func of the obfuscation target program 201 and the variable names declared in the variable declaration part 202, generates a variable name that does not overlap any of these variable names, and determines the generated variable name as the secret information dedicated variable name. In this example, the secret information dedicated variable name is determined as "dkey".

Next, the equivalent program instruction generating unit 103 generates a graph G100 using the post-division blocks 401a through 401h shown in FIG. 4, as follows. In the following description, the post-division blocks 401a through 401h are regarded as nodes 501a through 501h, respectively.

The last program instruction in the post-division block 401a is not an unconditional branch instruction. The program instruction next to the post-division block 401a is a program instruction of the post-division block 401b. Accordingly, the equivalent program instruction generating unit 103 generates an edge 502a between nodes 501a and 501b.

Similarly, the equivalent program instruction generating unit 103 generates edges 502b through 502g.

The post-division block 401c includes conditional branch instruction "if (condition 1) goto labelF;" for conditionally branching to label "labelF;" in the post-division block 401f. Accordingly, the equivalent program instruction generating unit 103 generates an edge 502h between nodes 501c and 501f.

Figure 5:
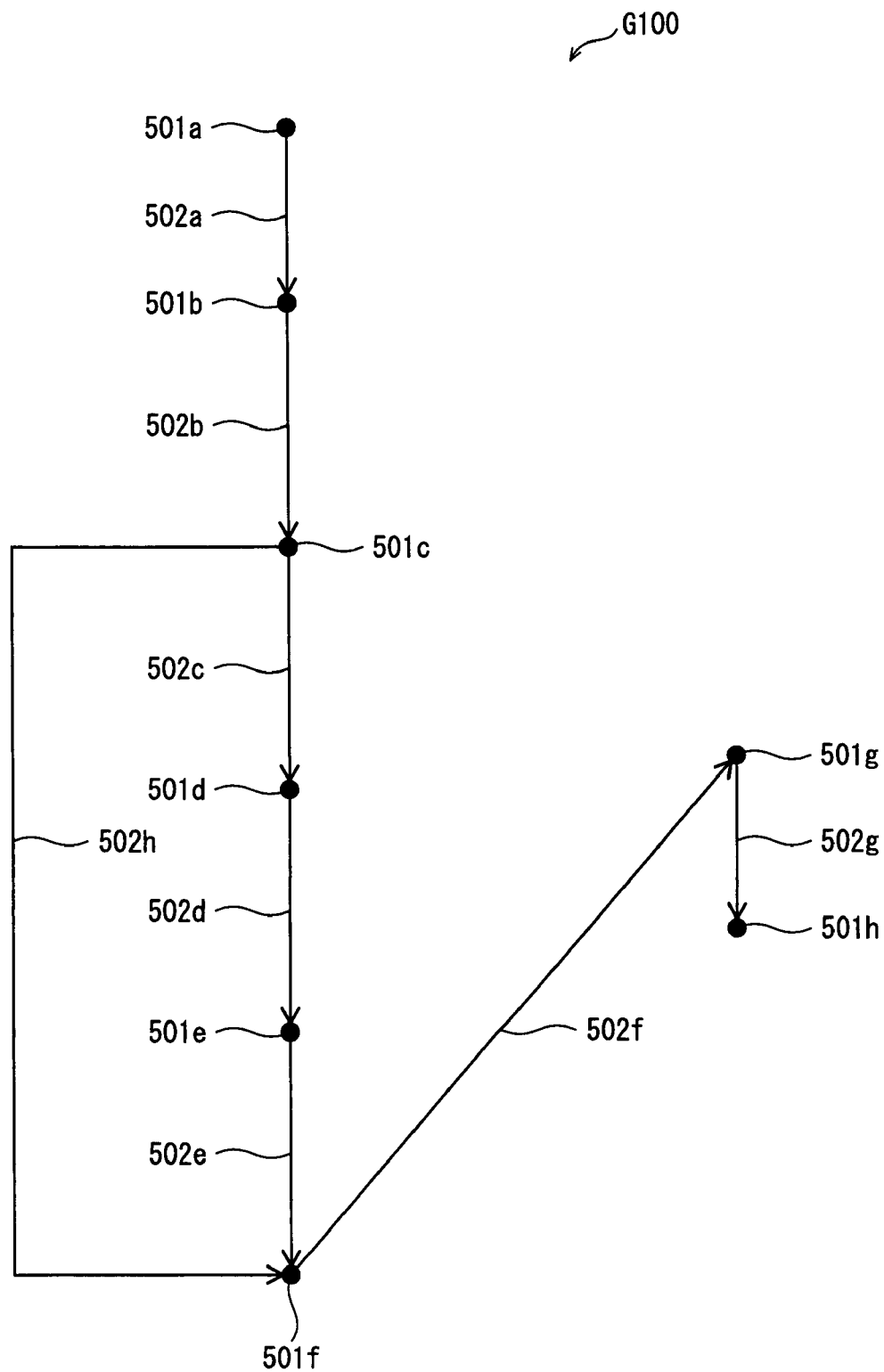
FIG. 5 shows a graph that was generated based on the post-division blocks.

The equivalent program instruction generating unit 103 generates the graph G100 that shows the structure of the obfuscation target program 201, by performing the above-described operation. FIG. 5 shows the generated graph G100.

It should be noted here that in this graph, the node 501a is the start node, the node 501b is the end node, and the node 501e is the confidentiality holding node.

Next, the equivalent program instruction generating unit 103 determines the post-division blocks into which equivalent program instructions are to be inserted, based on the graph G100 shown in FIG. 5, as follows.

The equivalent program instruction generating unit 103 regards the post-division block 401e, which corresponds to the node 501e being the confidentiality holding node, as the first equivalent program instruction insertion target block. The equivalent program instruction generating unit 103 regards the post-division block 401d, which corresponds to the node 501d that is the only preceding block to the node 501e, as the second equivalent program instruction insertion target block. Similarly, the equivalent program instruction generating unit 103 regards the post-division block 401c, which corresponds to the node 501c, as the third equivalent program instruction insertion target block, regards the post-division block 401b, which corresponds to the node 501b, as the fourth equivalent program instruction insertion target block, and regards the post-division block 401a, which corresponds to the node 501a, as the fifth equivalent program instruction insertion target block. Since there is no preceding block to the fifth equivalent program instruction insertion target block, the equivalent program instruction generating unit 103 determines that the number of equivalent program instructions is "5".

Next, the equivalent program instruction generating unit 103 generates five equivalent program instructions to be as many as the number of equivalent program instructions. In this example, the equivalent program instruction generating unit 103 generates the first through fifth equivalent program instructions.

The equivalent program instruction generating unit 103 selects integer "18", and generates the first equivalent program instruction "dkey=18;".

Following this, the equivalent program instruction generating unit 103 determines the second through fourth equivalent program instructions.

In this example, the equivalent program instruction generating unit 103 determines the second through fourth operators as "/", "*", and "/", respectively; randomly selects values "2", "4", and "5" as values RA_2 through RA_4, respectively; randomly selects values "54", "−32", and "+8" as values RB_2 through RB_4, respectively; and generates the following equivalent program instructions respectively as the second through fourth equivalent program instructions:

"*d*key=*d*key/2+54;",

"*d*key=*d*key*4−32;", and

"*d*key=*d*key/5+8;".

Next, the equivalent program instruction generating unit 103 generates the fifth equivalent program instruction.

In this example, the equivalent program instruction generating unit 103 randomly selects value "9" as value RA_N. Further, the equivalent program instruction generating unit 103 calculates the second value by executing the following program instruction group:

"*d*key=18;",

"*d*key=*d*key/2+54;",

"*d*key=*d*key*4−32;", and

"*d*key=*d*key/5+8;".

As these program instructions are executed in this order, the value of "dkey" changes, taking "18", "63", "220", and "52" in the order. The equivalent program instruction generating unit 103 determines value "52" as the second value.

The equivalent program instruction generating unit 103 calculates the first value "44" by substituting "512" for the value of confidential information, "52" for the second value, and "9" for RA_N in (First value)=(value of confidential information)−{(second value)*$RA\_N$}.    Expression 1

The equivalent program instruction generating unit 103 then generates the fifth equivalent program instruction as "dkey=dkey*9+44;"

The first through fifth equivalent program instructions generated with the operations described up to now are as follows in the order:

"*d*key=18;",

"*d*key=*d*key/2+54;",

"*d*key=*d*key*4−32;",

"*d*key=*d*key/5+8;", and

"*d*key=*d*key*9+44;".

The value of "dkey" obtained last after executing these program instructions in the order is "512". This makes it possible to confirm that the value of "dkey" obtained last immediately after executing these program instructions in the order is identical with the value of the confidential information.

1.1.5 Equivalent Program Generating Unit 104

The equivalent program generating unit 104 replaces the confidential information with the secret information dedicated variable, and generates equivalent program inserted blocks by inserting the equivalent program instructions generated by the equivalent program instruction generating unit 103 into the equivalent program instruction insertion target blocks.

The equivalent program generating unit 104 generates an equivalent program that is composed of the generated equivalent program inserted blocks and post-division blocks in which no equivalent program instruction has been inserted. The equivalent program is a program in which instructions containing the confidential information have been replaced with an equivalent program instruction group, but has the same function as the program before the replacement.

It should be noted here that hereinafter, post-division blocks in which no equivalent program instruction has been inserted are referred to as equivalent program not-inserted blocks.

The equivalent program generating unit 104 adds the secret information dedicated variable, replaces the confidential information, and inserts the equivalent program instruction.

(1) Adding Secret Information Dedicated Variable

The equivalent program generating unit 104 generates a new variable declaration part by adding the secret information dedicated variable, which was determined by the equivalent program instruction generating unit 103, to the variable declaration part of the obfuscation target program.

(2) Replacing Confidential Information

The equivalent program generating unit 104 obtains the position information stored in the storage unit 100, and replaces the value of the confidential information, which is contained in the program instruction indicated by the obtained position information, with the secret information dedicated variable. Here, the equivalent program generating unit 104 replaces the value of the confidential information contained in the confidentiality holding node with the secret information dedicated variable.

(3) Inserting Equivalent Program Instruction

The equivalent program generating unit 104 inserts each of the equivalent program instructions generated by the equivalent program instruction generating unit 103 into any of the equivalent program instruction insertion target blocks determined by the equivalent program instruction generating unit 103. The following is a detailed description of the operation.

The equivalent program generating unit 104 generates the $(N-t+1)^{th}$ equivalent program instruction inserted block by inserting the $t^{th}$ (t=1, 2, ..., N) equivalent program instruction into the $(N-t+1)^{th}$ equivalent program instruction insertion target block.

That is to say, the equivalent program generating unit 104 generates the $N^{th}$ equivalent program instruction inserted block by inserting the first equivalent program instruction into the $N^{th}$ equivalent program instruction insertion target block. Then, similarly, the equivalent program generating unit 104 generates the $t^{th}$ equivalent program instruction inserted block by inserting the $t^{th}$ (t=2, 3, ..., N) equivalent program instruction into the $(N-t+1)^{th}$ equivalent program instruction insertion target block.

Here, the $N^{th}$ equivalent program instruction is inserted before a program instruction in which the confidential information has been replaced with the secret information dedicated variable. This arrangement is made for the purpose of ensuring that the program instruction in which the confidential information has been replaced with the secret information dedicated variable is executed after the secret information dedicated variable has become the value of the confidential information.

It should be noted here that hereinafter, post-division blocks in which no equivalent program instruction has been inserted are referred to as equivalent program not-inserted blocks.

In this way, the equivalent program generating unit 104 can generate an equivalent program that is composed of one or more equivalent program inserted blocks and one or more equivalent program not-inserted blocks.

It is also confirmed that the value of the confidential information is set to the secret information dedicated variable after the first through $N^{th}$ equivalent program instruction inserted blocks are executed.

This is confirmed as follows. That is to say, as described above, the first equivalent program instruction insertion target block is a post-division block that contains the confidential information. Furthermore, the $N^{th}$, $(N-1)^{th}$, . . . , second equivalent program instruction insertion target blocks are executed in the order without fail before the first equivalent program instruction insertion target block is executed. On the other hand, as stated earlier in (1.1.4), the value of the secret information dedicated variable is identical with the value of the confidential information immediately after the first, second, . . . , $N^{th}$ equivalent program instructions are executed in the order. Accordingly, after the equivalent program generating unit 104 generates the first through $N^{th}$ equivalent program inserted blocks as described above, the $N^{th}$, $(N-1)^{th}$, . . . , second equivalent program instruction inserted blocks are executed without fail before the first equivalent program instruction inserted block is executed. Here, the first, second, . . . , $(N-1)^{th}$ equivalent program instructions, which are included therein, are executed without-fail in the order. Accordingly, immediately after the $N^{th}$ equivalent program instruction included in the first equivalent program instruction inserted block is executed, the secret information dedicated variable is identical with the value of the confidential information.

Therefore, when an equivalent program generated by the equivalent program generating unit 104 is executed in general use where a special operation, such as forcibly changing the program counter using a debugger or the like, is not executed, and immediately after the $N^{th}$ equivalent program instruction inserted block including the first equivalent program instruction is executed, the secret information dedicated variable takes the value of immediately after the first equivalent program instruction is executed. Further, immediately after the $(N-1)^{th}$ equivalent program instruction inserted block including the second equivalent program instruction is executed, the secret information dedicated variable takes the value of immediately after the first and second equivalent program instructions are executed in the order. Similarly, immediately after the $(N-t+1)^{th}$ equivalent program instruction inserted block including the $t^{th}$ (t=3, 4, . . . N−1) equivalent program instruction is executed, the secret information dedicated variable takes the value of immediately after the first through $t^{th}$ equivalent program instructions are executed in the order.

(4) Specific Example

Figure 6:
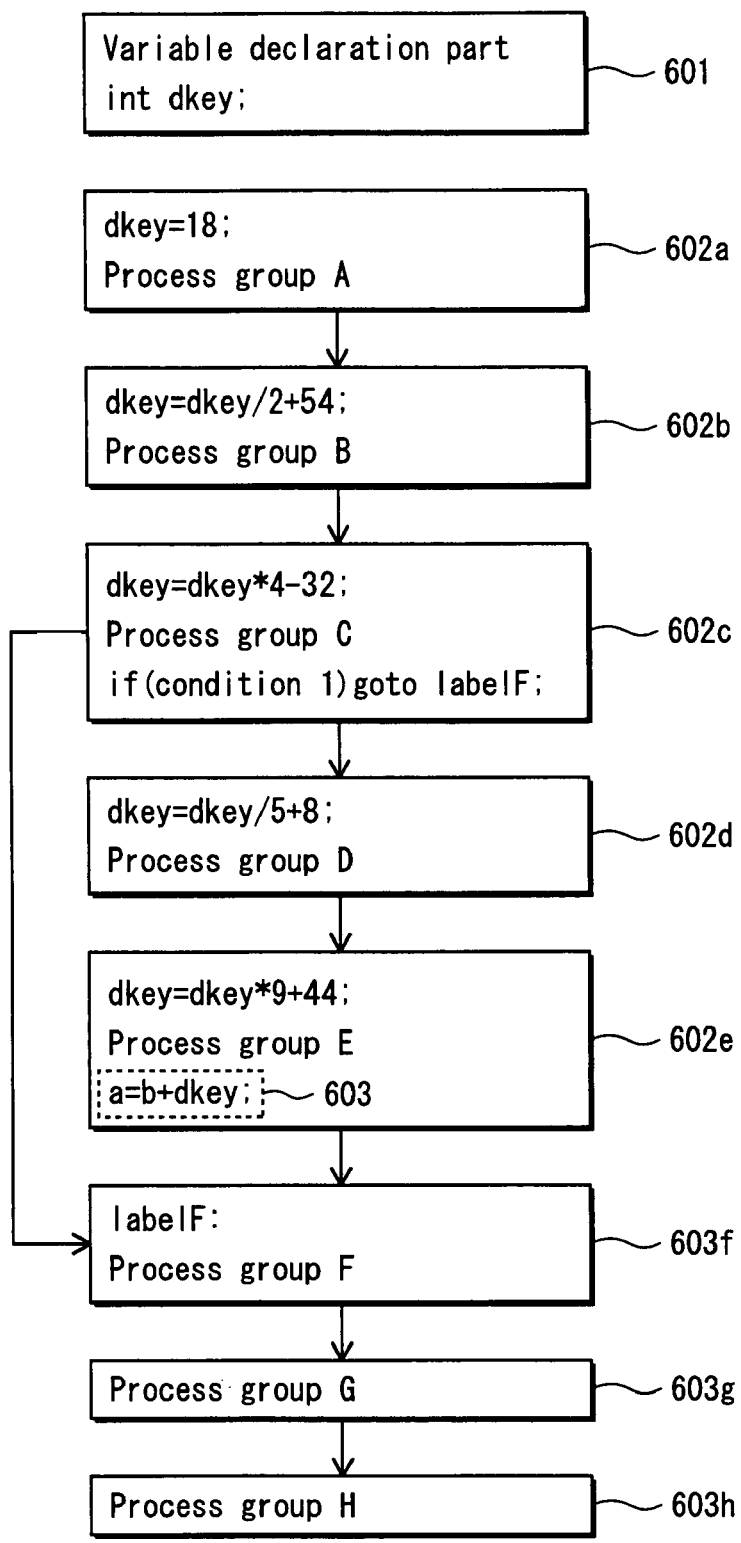
FIG. 6 shows equivalent program instruction inserted blocks.

The equivalent program generating unit 104 generates a new variable declaration part 601 shown in FIG. 6 by adding the secret information dedicated variable "dkey", which was determined by the equivalent program instruction generating unit 103, to the variable declaration part of the obfuscation target program. The variable declaration part 601 additionally contains, in the variable declaration part 202, the declaration statement for the secret information dedicated variable "dkey". Here, when adding the secret information dedicated variable "dkey" into the variable declaration part of the obfuscation target program, the equivalent program generating unit 104 represent it as a variable type that can indicate the value "512" of the confidential information (for example, the 8-bit positive integer type is not used since it can indicate only 0 through 255, not 512). Here, for example, the int type is used as the variable type of the variable "dkey".

Next, the equivalent program generating unit 104 generates a new program instruction 603 shown in FIG. 6 by replacing the value "512" of the confidential information in the program instruction (in the present example, program instruction 204 shown in FIG. 2) indicated by the position information, with the secret information dedicated variable "dkey".

Next, the equivalent program generating unit 104 generates a fifth equivalent program instruction inserted block 602a by inserting the first equivalent program instruction "dkey=18" into the node 501a being the fifth equivalent program instruction insertion target block. Similarly, the equivalent program generating unit 104 generates a fourth equivalent program instruction inserted block 602b by inserting the second equivalent program instruction "dkey=dkey/2+54" into the node 501b being the fourth equivalent program instruction insertion target block. Then, similarly, the equivalent program generating unit 104 generates a third equivalent program instruction inserted block 602c, a second equivalent program instruction inserted block 602d, and a first equivalent program instruction inserted block 602e.

It should be noted here that hereinafter, the nodes 501f through 501h in which no equivalent program instruction has been inserted are referred to as equivalent program instruction not-inserted blocks 603f through 603h, respectively.

FIG. 6 shows a graph using the equivalent program instruction inserted blocks 602a through 602e and equivalent program instruction not-inserted blocks 603f through 603h.

1.1.6 Dummy Block Inserted Program Generating Unit 105

The dummy block inserted program generating unit 105 generates dummy blocks that are program instruction groups that are neither necessary nor executed for obtaining an execution result in the general use. The dummy block are, more specifically, program instruction groups that are not executed unless the program counter or the variable value is forcibly changed with use of a debugger or the like while the program is running.

The dummy block inserted program generating unit 105 generates a dummy block inserted program that is composed of the generated dummy blocks, equivalent program instruction inserted blocks, and equivalent program instruction not-inserted blocks.

The dummy block inserted program generating unit 105 obtains the number of dummy blocks, generates dummy blocks, generates dummy equivalent program instruction inserted dummy blocks, and generates pseudo branch instruction attached dummy blocks.

(1) Obtaining Number of Dummy Blocks

The dummy block inserted program generating unit 105 preliminarily stores the number of dummy blocks to be generated.

The dummy block inserted program generating unit 105 obtains the stored number of dummy blocks. The number of dummy blocks is, for example, "1000". In the present example, it is presumed that the number of dummy blocks is "4", for the sake of convenience.

Figure 7:
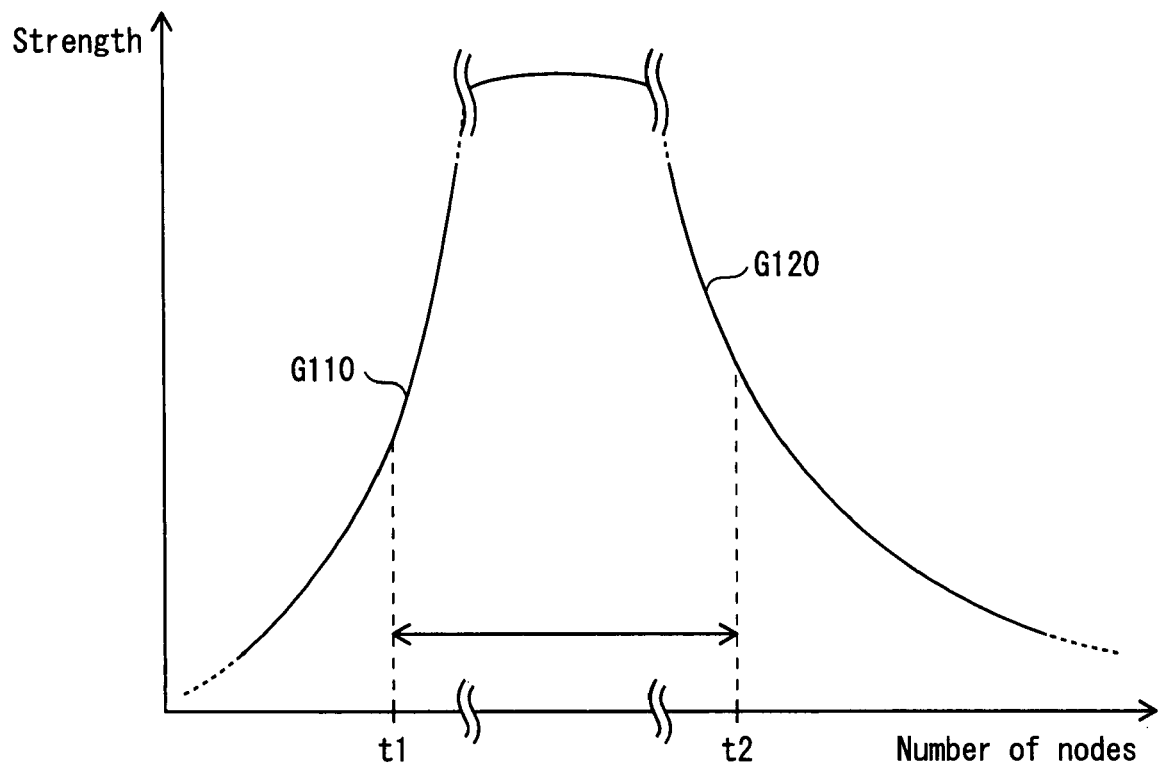
FIG. 7 shows a range from which the number of nodes can be taken.

Here will be explained how the number of dummy blocks is determined. FIG. 7 shows the relationships between the number of nodes (in this example, the number of dummy blocks) and the obfuscation strength. As shown in FIG. 7, as the number of nodes increases, the obfuscation strength increases exponentially (the function G110 in FIG. 7), and then from some point in time, the obfuscation strength decreases exponentially (the function G120 in FIG. 7). It is preferable as one example that the number of dummy blocks is selected from values in the range from t1 to t2 indicated in FIG. 7. It is especially-preferable that the number of dummy blocks is identical with the number of nodes at t1.

(2) Generates Dummy Blocks

The dummy block inserted program generating unit 105 generates as many dummy blocks as the obtained number of dummy blocks.

The dummy block inserted program generating unit 105 selects one or more post-division blocks randomly from among the post-division blocks generated by the block dividing unit 102.

The dummy block inserted program generating unit 105 generates dummy blocks by removing (conditional and unconditional) branch instructions from each program instruction group that constitutes the selected one or more post-division blocks.

(3) Generates Dummy Equivalent Program Instruction Inserted Dummy Blocks

The dummy block inserted program generating unit 105 generates a dummy equivalent program instruction for each of the generated dummy blocks. The dummy block inserted program generating unit 105 generates dummy equivalent program instruction inserted dummy blocks by inserting the generated dummy equivalent program instruction into each corresponding one of the dummy blocks. Here, the dummy equivalent program instructions are program instructions in which the same variables and operators as those used in the $t^{th}$ (t=2, 3, ... N) equivalent program instruction used by the equivalent program generating unit 104 are used.

The dummy block inserted program generating unit 105 generates dummy equivalent program instruction inserted dummy blocks by performing the following operation onto all of the generated dummy blocks.

The dummy block inserted program generating unit 105 selects integers RA and RB other than 0 randomly, and generates dummy equivalent program instruction "(secret information dedicated variable)=(secret information dedicated variable) (operator) (RA)+(RB);" using the selected integers RA and RB. Here, the operator is either "*" denoting a multiplication, or "/" denoting a division, and is selected from these randomly. The dummy block inserted program generating unit 105 inserts the generated dummy equivalent program instruction into the start of the corresponding dummy block.

The dummy equivalent program instruction generated as described above is a program instruction in which the secret information dedicated variable is used as is the case with the above-described equivalent program instruction, and is a program instruction that cannot be discerned from an equivalent program instruction in terms of the secret information dedicated variable. For this reason, an unauthorized analyzer intending to collect the equivalent program instruction by checking on only the secret information dedicated variable, cannot discern between the dummy equivalent program instruction and the equivalent program instruction.

(4) Generating Pseudo Branch Instruction Attached Dummy Blocks

The dummy block inserted program generating unit 105 preliminarily stores a predetermined number that is determined in accordance with the obfuscation strength desired by the user. In the present embodiment, the predetermined number is, for example, "13".

The dummy block inserted program generating unit 105 generates pseudo branch instruction attached dummy blocks by inserting at least one of the conditional and unconditional branch instructions into each of the generated dummy equivalent program instruction inserted dummy blocks.

The dummy block inserted program generating unit 105 generates label inserted equivalent program instruction not-inserted blocks by inserting a different label into each start of the equivalent program instruction not-inserted blocks.

The dummy block inserted program generating unit 105 generates label inserted dummy equivalent program instruction inserted dummy blocks by inserting a different label into each start of the generated dummy equivalent program instruction inserted dummy blocks.

Here, the label name of each label that is inserted into each block is determined not to overlap any label name that has already been used in the program. Furthermore, when a label has already been inserted, a label is not inserted newly.

Next, the dummy block inserted program generating unit 105 adds an unconditional branch instruction to the end of each label inserted dummy equivalent program instruction inserted dummy block. It should be noted here that hereinafter, label inserted dummy equivalent program instruction inserted dummy blocks with an unconditional branch instruction attached to the end thereof, are referred to as TMP blocks.

The branch destination of the unconditional branch instruction, which is added when a TMP block is generated, is the start of a block that is selected randomly from among (i) the label inserted dummy equivalent program instruction inserted dummy blocks, (ii) the label inserted equivalent program instruction inserted blocks, and (iii) the label inserted equivalent program not-inserted blocks. In the following description, a set of all the TMP blocks generated by the above-described operation is referred to as a TMP block group.

Next, the dummy block inserted program generating unit 105 regards, as a node, (a) each of TMP blocks constituting the TMP block group, (b) each of the label inserted equivalent program inserted blocks, and (c) each of the label inserted equivalent program instruction not-inserted blocks. Further, the dummy block inserted program generating unit 105 determines that there is an edge between the first and second nodes when the first node includes a branch instruction for branching to the second node, determines that there is an edge between the first and second nodes when the last program instruction of the first node is not the unconditional branch instruction and when a node corresponding to a program instruction following the last program instruction is the second node, and generates a graph that includes the nodes and edge.

Next, the dummy block inserted program generating unit 105 obtains the number of nodes and the number of edges, using the generated graph. The dummy block inserted program generating unit 105 performs a calculation of expression "(number of edges)−(number of nodes)", and judges whether or not the calculated value is not smaller than a predetermined number.

When it judges that the calculated value is not smaller than the predetermined number, the dummy block inserted program generating unit 105 stops the process. Hereinafter, the TMP blocks, which constitute the TMP block group at the time when the process was stopped, are referred to as dummy blocks.

When it judges that the calculated value is smaller than the predetermined number, the dummy block inserted program generating unit 105 performs the following operation.

The dummy block inserted program generating unit 105 selects a TMP block, which to insert a conditional branch instruction, randomly from among TMP blocks constituting the TMP block group. The dummy block inserted program generating unit 105 then generates a new TMP block by inserting the conditional branch instruction into the selected TMP block. Here, the branch condition of the inserted conditional branch instruction is represented by a conditional expression for comparing the secret information dedicated variable with a randomly determined value. Further, the branch destination of the conditional branch instruction is the start of a block that corresponds to any of the nodes constituting the generated graph. The conditional branch instruction is inserted before the first branch instruction included in the insertion target block. When the insertion target block does not include a branch instruction, the conditional branch instruction is inserted into the end of the insertion target block.

The dummy block inserted program generating unit 105 regards, as a new TMP block group, a block group that is composed of: the new TMP block with the conditional branch instruction having been inserted therein; and the TMP blocks that have not been changed, with no insertion of a conditional branch instruction. The dummy block inserted program generating unit 105 then generates a graph again, and performs the above-described operation.

(5) Specific Example

The dummy block inserted program generating unit 105 obtains the number or dummy blocks "4", which has been stored preliminarily.

Figure 8:
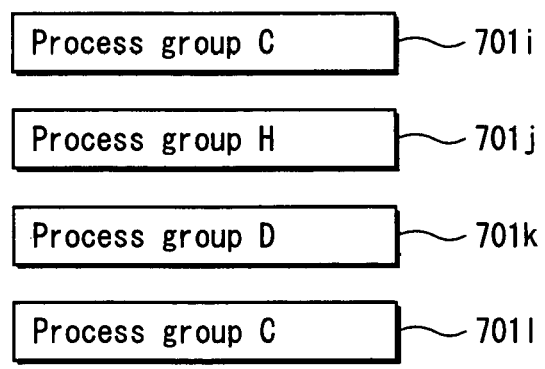
FIG. 8 shows one example of the structure of the dummy block.

The dummy block inserted program generating unit 105 generates as many dummy blocks as the obtained number of dummy blocks, namely four dummy blocks 701$i$ through 701$l$, as shown in FIG. 8.

The dummy block inserted program generating unit 105 selects post-division block 401$c$ from among the post-division blocks generated by the block dividing unit 102, generates the program instruction group C by removing branch instruction "if (condition 1) goto labelF;" from the selected post-division block 401$c$, and generates dummy block 701$i$ using the program instruction group C.

The dummy block inserted program generating unit 105 selects post-division block 401$h$ from among the post-division blocks generated by the block dividing unit 102, and generates dummy block 701$j$ using the selected post-division block 401$h$. The dummy blocks 701$k$ and 701$l$ are generated similarly, and description thereof is omitted.

Figure 9:
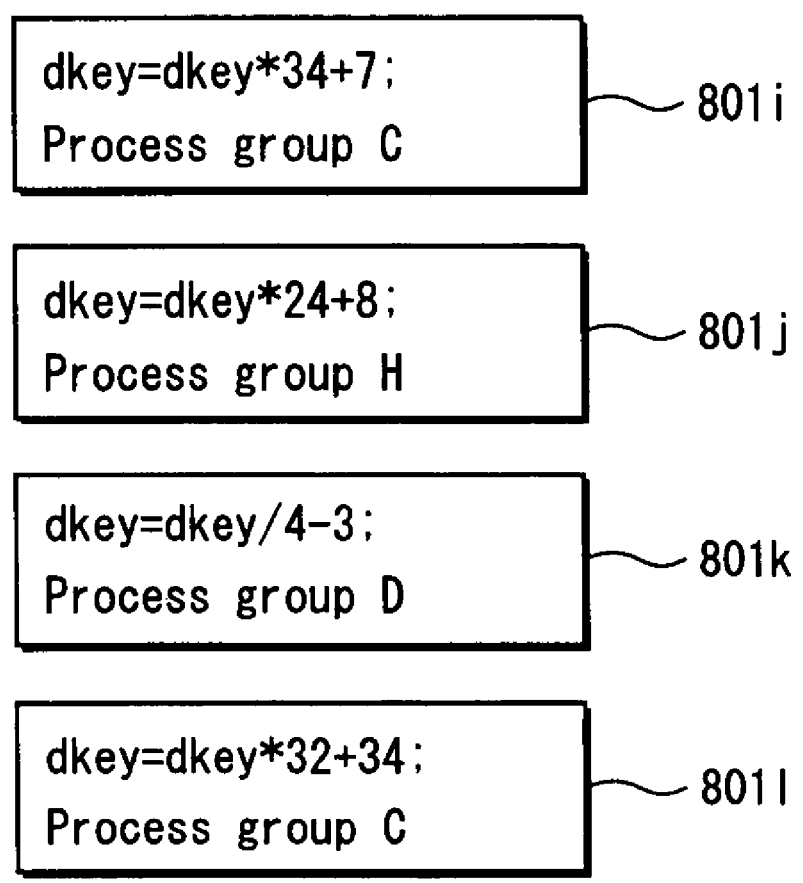
FIG. 9 shows one example of the structure of the dummy equivalent program instruction inserted dummy block.

Next, the dummy block inserted program generating unit 105 generates dummy equivalent program instructions respectively in correspondence with the generated dummy blocks 701$i$ through 701$l$. The dummy block inserted program generating unit 105 then generates dummy equivalent program instruction inserted dummy blocks 801$i$ through 801$l$ shown in FIG. 9 by inserting the generated dummy equivalent program instructions respectively into the dummy blocks 701$i$ through 701$l$.

For example, the dummy block inserted program generating unit 105 generates the dummy equivalent program instruction inserted dummy block 801$i$ by generating dummy equivalent program instruction "dkey=dkey*34+7;" for the dummy block 701$i$, and inserting the generated dummy equivalent program instruction into the dummy block 701$i$.

The dummy equivalent program instruction inserted dummy blocks 801$j$ through 801$l$ are generated similarly, and description thereof is omitted.

Figure 10:
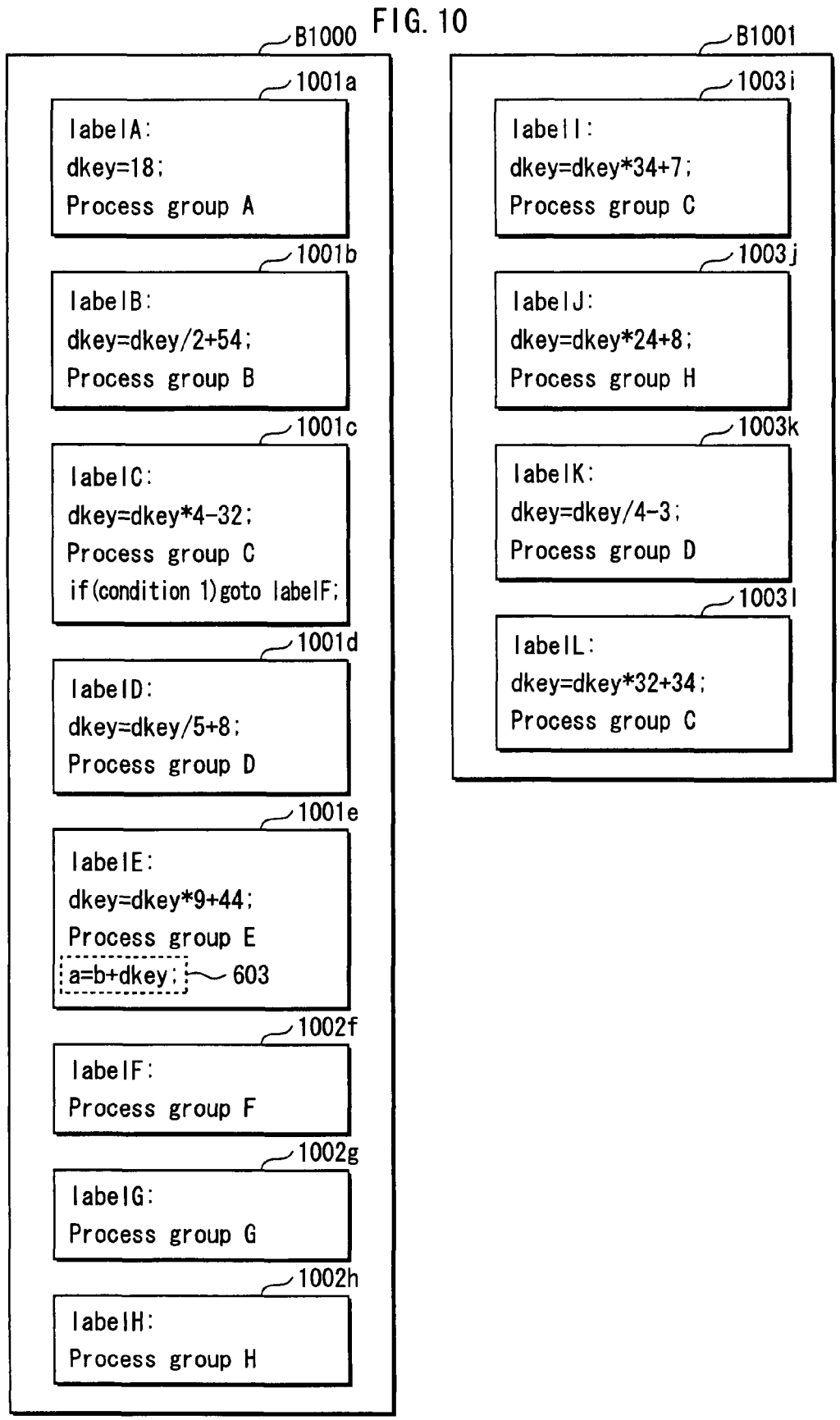
FIG. 10 shows one example of the structure of the label inserted equivalent program instruction inserted block, label inserted equivalent program instruction not-inserted block, and label inserted dummy equivalent program instruction inserted dummy block.

Next, the dummy block inserted program generating unit 105 generates label inserted equivalent program instruction inserted blocks 1001$a$ through 1001$e$, label inserted equivalent program instruction not-inserted blocks 1002$f$ through 1002$h$, and label inserted dummy equivalent program instruction inserted dummy blocks 1003$i$ through 1003$l$ by inserting a label into the start of each of the equivalent program instruction inserted blocks 602$a$ through 602$e$, equivalent program instruction not-inserted blocks 603$f$ through 603$h$, and dummy equivalent program instruction inserted dummy blocks 801$i$ through 801$l$. FIG. 10 shows an example of the generated blocks. In this example, the block B1000 is composed of the label inserted equivalent program instruction inserted blocks 1001$a$ through 1001$e$ and label inserted equivalent program instruction not-inserted blocks 1002$f$ through 1002$h$, which are either executed in the stated order (from upper to lower), or executed as follows: the label inserted equivalent program instruction inserted blocks 1001$a$ through 1001$c$ are executed; then the branch instruction causes the execution to branch to label inserted equivalent program instruction not-inserted block 1002$f$; and then the label inserted equivalent program instruction not-inserted blocks 1002$f$ through 1002$h$ are executed. Further, in this example, the block B1001 is composed of the label inserted dummy equivalent program instruction inserted dummy blocks 1003$i$ through 1003$l$.

In FIG. 10, the label inserted equivalent program instruction inserted blocks 1001$a$ through 1001$e$ have been generated by inserting a different label into the start of each of the equivalent program instruction inserted blocks 602$a$ through 602$e$.

The label inserted equivalent program instruction not-inserted blocks 1002$f$ through 1002$h$ have been generated by inserting a different label into the start of each of the equivalent program instruction not-inserted blocks 603$f$ through 603$h$. It should be noted here that since the start of the equivalent program instruction not-inserted block 603$f$ had already had label "labelF", a label has not been inserted thereinto.

The label inserted dummy equivalent program instruction inserted dummy blocks 1003$i$ through 1003$l$ have been generated by inserting a different label into the start of each of the dummy equivalent program instruction inserted dummy blocks 801$i$ through 801$l$.

Figure 11:
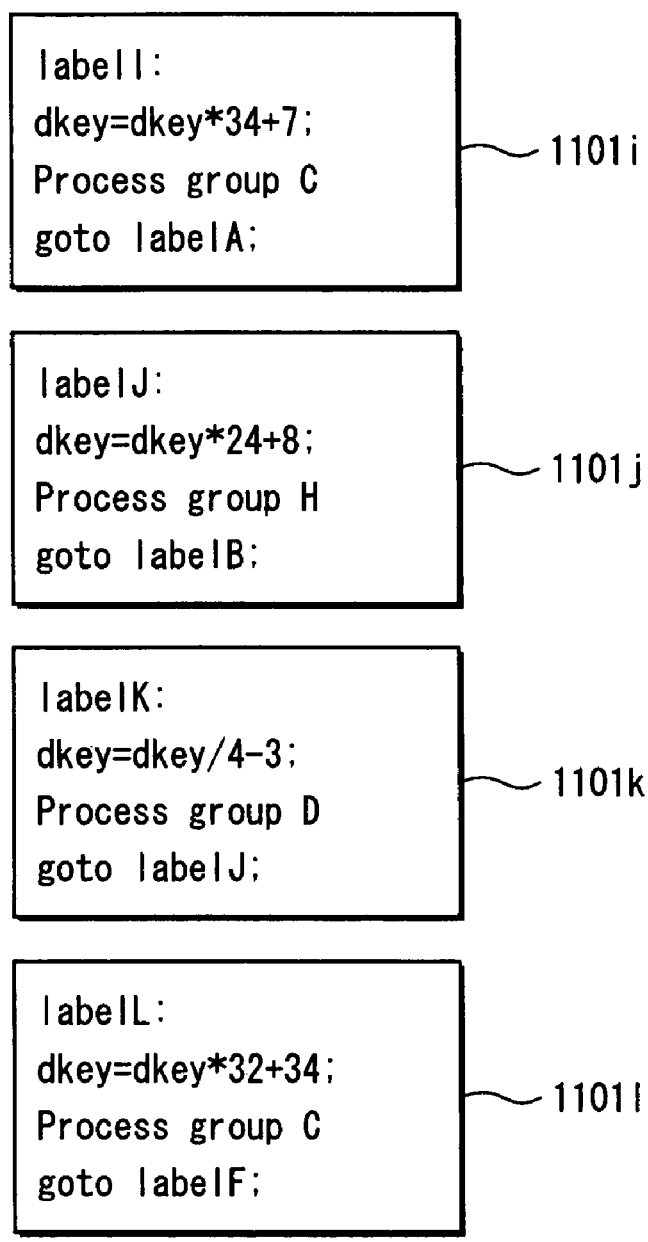
FIG. 11 shows one example of the structure of the TMP block.

Next, the dummy block inserted program generating unit 105 generates TMP blocks 1101$i$ through 1101$l$ from the generated label inserted dummy equivalent program instruction inserted dummy blocks 1003$i$ through 1003$l$. FIG. 11 shows an example of the generated TMP blocks 1101$i$ through 1101$l$.

The dummy block inserted program generating unit 105 selects, for example, the label inserted equivalent program instruction inserted block 1001$a$ from among the label inserted equivalent program instruction inserted blocks 1001*a* through 1001*e*, label inserted equivalent program instruction riot inserted blocks 1002*f* through 1002*h*, and label inserted dummy equivalent program instruction inserted dummy blocks 1003*i* through 1003*l*. Then, the dummy block inserted program generating unit 105 generates an unconditional branch instruction "go to labelA;", and generates a TMP block 1101*i* by inserting the generated unconditional branch instruction into the end of the label inserted dummy equivalent program instruction inserted dummy block 1003*i*.

The TMP blocks 1101*j* through 1101*l* are generated similarly, and description thereof is omitted here.

Next, the dummy block inserted program generating unit 105 generates graph G200 shown in FIG. 12, as follows. In the following description, it is presumed that the label inserted equivalent program instruction inserted blocks 1001*a* through 1001*e* are regarded as nodes 1201*a* through 1201*e*, respectively; the label inserted equivalent program instruction not-inserted blocks 1002*f* through 1002*h* are regarded as nodes 1201*f* through 1201*h*, respectively; and the TMP blocks 1101*i* through 1101*l* are regarded as nodes 1201*i* through 1201*l*, respectively.

The last program instruction of the label inserted equivalent program instruction inserted block 1001*a* is not an unconditional branch instruction. Also, a program instruction following the label inserted equivalent program instruction inserted block 1001*a* is a program instruction of the label inserted equivalent program instruction inserted block 1001*b*. Therefore, the dummy block inserted program generating unit 105 generates an edge 1202*a* between nodes 1201*a* and 1201*b*.

Similarly, the dummy block inserted program generating unit 105 generates edges 1202*b* through 1202*g*.

The label inserted equivalent program instruction inserted block 1001*c* includes conditional branch instruction "if (condition 1) goto labelF;" for conditionally branching to label "labelF;" in the label inserted equivalent program instruction not-inserted block 1002*f*. Accordingly, the dummy block inserted program generating unit 105 generates an edge 1202*h* between nodes 1201*c* and 1201*f*.

The last program instruction of the TMP block 1101*l* is unconditional branch instruction "goto labelA;" for unconditionally branching to label "labelA;" in the label inserted equivalent program instruction inserted block 1001*a*. Accordingly, the dummy block inserted program generating unit 105 generates an edge 1202*i* between nodes 1201*i* and 1201*a*.

Similarly, the dummy block inserted program generating unit 105 generates edges 1202*j* through 1202*k*.

The dummy block inserted program generating unit 105 generates the graph G200 by performing the above-described operation.

Figure 12:
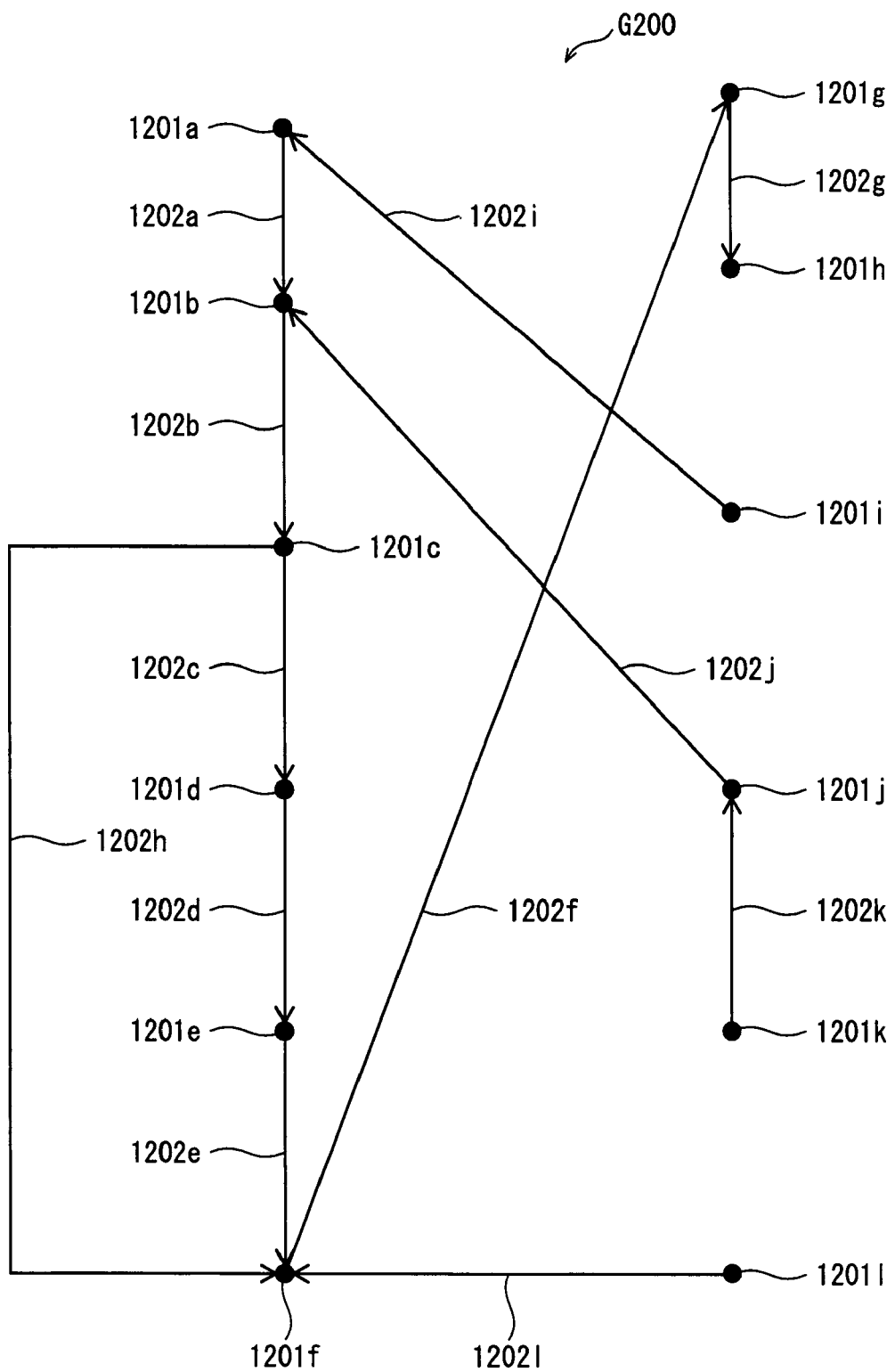
FIG. 12 shows one example of the structure of the graph generated by using the label inserted equivalent program instruction inserted blocks, label inserted equivalent program instruction not-inserted blocks, and TMP blocks.

Next, the dummy block inserted program generating unit 105 judges whether or not the value of "(number of edges)−(number of nodes)" is not smaller than the predetermined number "13", using the graph G200 shown in FIG. 12.

In the present example, the value of "(number of edges)−(number of, nodes)" is 0. Therefore, the dummy block inserted program generating unit 105 judges that the value of "(number of edges)−(number of nodes)" is smaller than the predetermined number, and performs the following operation.

Figure 13:
FIG. 13 shows one example of the structure of the new TMP block 1301*j* generated by inserting a conditional branch instruction into the TMP block 1101*j*.

The dummy block inserted program generating unit 105 selects a TMP block 1101*j* randomly from among the TMP blocks 1101*i* through 1101*l*, and generates a new TMP block 1301*j* shown in FIG. 13 by inserting the conditional branch instruction into the selected TMP block 1101*j*.

When generating the TMP block 1301*j*, the dummy block inserted program generating unit 105 first generates the conditional branch instruction that is to be inserted into the selected TMP block 1101*j*. In the present example, the secret information dedicated variable is "dkey", the randomly determined value is "273", and the branch condition is represented by a conditional expression for comparing "dkey" with "273". Further, the node 1201*d* is randomly selected from among the nodes 1201*a* through 1201*l*. The dummy block inserted program generating unit 105 sets the conditional branch destination of the generated conditional branch instruction to the start of the label inserted equivalent program instruction inserted block 1001*d*, which is a block corresponds to the selected node 1201*d*. The conditional branch instruction generated in this way is program instruction "if (dkey>273) goto labelD;". Next, the dummy block inserted program generating unit 105 generates the TMP block 1301*j* by inserting the generated program instruction into immediately before the last program instruction of the TMP block 1101*j*, which is unconditional branch instruction "goto label B;".

After the above-described operation is completed, the dummy block inserted program generating unit 105 generates a new TMP block group that is composed of the generated TMP block 1301*j* and TMP blocks 1101*i*, 1101*k*, and 1101*l* that have not been changed, and generates a graph based on the new TMP block group.

Figure 14:
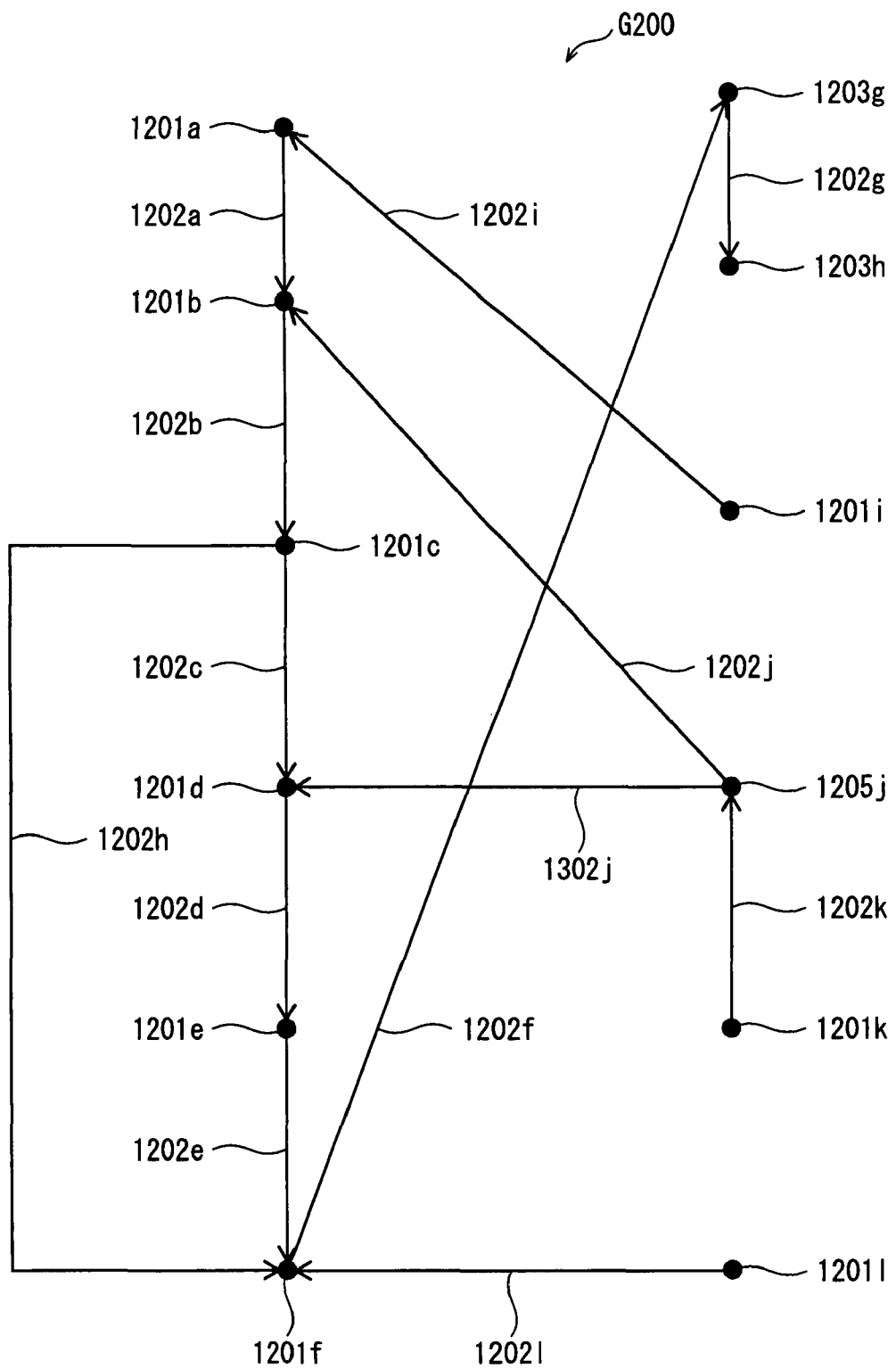
FIG. 14 shows a graph re-generated by using the new TMP block 1301*j*.

FIG. 14 shows graph G210 based on the new TMP block group. The graph G210 differs from the graph G200 in that node 1205*j* has replaced the node 1201*j*, edge 1202*j* has been provided between the node 1205*j* and the node 1201*b*, and edge 1302*j* has been provided between the node 1205*j* and the node 1201*d*. The TMP block 1301*j* corresponds to the node 1205*j*.

1.1.7 Pseudo Branch Instruction Inserted Program Generating Unit 106

The pseudo branch instruction inserted program generating unit 106 generates pseudo branch instruction inserted blocks by inserting pseudo branch instructions into the label inserted equivalent program instruction inserted blocks generated by the dummy block inserted program generating unit 105. Here, each pseudo branch instruction that is inserted into the label inserted equivalent program instruction inserted blocks is a conditional branch instruction whose truth value inevitably takes a constant value when the program is executed in general use where a special operation, such as forcibly changing the program counter using a debugger or the like, is not executed.

The pseudo branch instruction inserted program generating unit 106 generates a pseudo branch instruction inserted program that is composed of the generated pseudo branch instruction inserted blocks, the label inserted equivalent program instruction not-inserted-blocks, and the dummy blocks generated by the dummy block inserted program generating unit 105.

The pseudo branch instruction inserted program generating unit 106 generates a pseudo branch instruction inserted program by determining a value of equivalent program instruction inserted block secret information dedicated variable for the $n^{th}$ through first label inserted equivalent program instruction inserted blocks, and inserting pseudo branch instructions into the blocks.

The following describes the case where the pseudo branch instruction inserted program generating unit 106 generates the pseudo branch instruction inserted blocks from the $t^{th}$ (t=1, 2, 3, . . . N) label inserted equivalent program instruction inserted block.

The pseudo branch instruction inserted program generating unit 106 obtains the first through (N−t+1) the equivalent programs.

The pseudo branch instruction inserted program generating unit 106 calculates the value of equivalent program instruction inserted block secret information dedicated variable by sequentially executing the obtained first through $(N-t+1)^{th}$ equivalent programs.

Next, the pseudo branch instruction inserted program generating unit 106 generates a conditional expression "dkey (comparative operator) m" by randomly selecting a constant "m" and a comparative operator.

The pseudo branch instruction inserted program generating unit 106 generates a pseudo branch instruction "if (dkey (comparative operator) m) then first branch destination else second branch destination" using the generated conditional expression. The pseudo branch instruction inserted program generating unit 106 generates pseudo branch instruction inserted blocks by inserting the generated pseudo branch instruction into the $t^{th}$ label inserted equivalent program instruction inserted block. Note that the conditional branch instruction is added to the end of the block.

Here will be described a pseudo branch instruction generation method.

The pseudo branch instruction inserted program generating unit 106 judges whether or not the conditional expression is true by substituting the calculated value of equivalent program instruction inserted block secret information dedicated variable into the variable "dkey".

When it has judged that the conditional expression is true, the pseudo branch instruction inserted program generating unit 106 sets the first branch destination to the next block, and sets the second branch destination to a block selected randomly from among the label inserted equivalent program instruction inserted blocks, label inserted equivalent program instruction not-inserted blocks, and dummy blocks.

When it has judged that the conditional expression is false, the pseudo branch instruction inserted program generating unit 106 sets the first branch destination to a block selected randomly from among the label inserted equivalent program instruction inserted blocks, label inserted equivalent program instruction not-inserted blocks, and dummy blocks, and sets the second branch destination to the next block.

It should be noted here that the pseudo branch instruction inserted program generating unit 106 selects each block so that the first branch destination and the second branch destination do not overlap each other.

Here will be provided a specific example.

Figure 15:
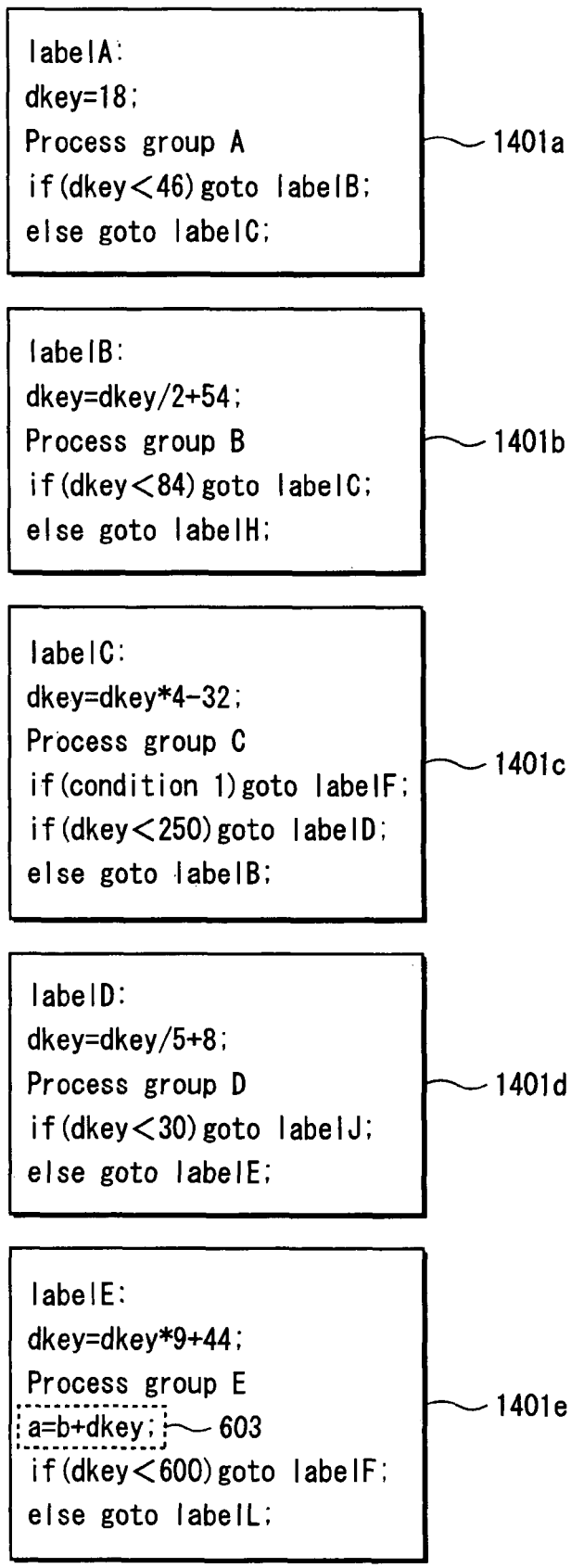
FIG. 15 shows one example of the structure of the pseudo branch instruction inserted block.

In this specific example, pseudo branch instruction inserted blocks 1401a through 1401e, which are shown in FIG. 15, are generated from the label inserted equivalent program instruction inserted blocks 1001a through 1001e.

First, the pseudo branch instruction inserted program generating unit 106 generates the pseudo branch instruction inserted block 1401a from the $N^{th}$ (in this example, N=5) label inserted equivalent program instruction inserted block 1001a, as follows.

The pseudo branch instruction inserted program generating unit 106 obtains the first equivalent program instruction "dkey=18;", and calculates the value "18" of equivalent program instruction inserted block secret information dedicated variable, using the obtained first equivalent program instruction.

The pseudo branch instruction inserted program generating unit 106 generates a conditional expression "dkey<46" by randomly selecting a constant "m" (in this example, "46") and a comparative operator (in this example, "<").

The pseudo branch instruction inserted program generating unit 106 judges whether or not the conditional expression is true by substituting the calculated value "18" of equivalent program instruction inserted block secret information dedicated variable into the variable "dkey".

In this example, the conditional expression is judged to be true, and the pseudo branch instruction inserted program generating unit 106 generates a program instruction "if (dkey<46) goto labelB; else goto labelC" being a pseudo branch instruction by selecting the next block (in this example, a block with label name "labelB") as the first branch destination, and selecting a block with label name "labelC") as the second branch destination.

The pseudo branch instruction inserted program generating unit 106 generates the pseudo branch instruction inserted block 1401a by inserting the generated pseudo branch instruction into the end of the fifth label inserted equivalent program instruction inserted block 1001a.

The pseudo branch instruction inserted blocks 1401b through 1401e are generated similarly, and description thereof is omitted here.

1.1.8 Replacement Object Block Group Generating Unit 107

The replacement object block group generating unit 107 extracts, from among a block group composed of the label inserted equivalent program instruction not-inserted blocks, dummy blocks, and pseudo branch instruction inserted blocks, one or more blocks each of which has a path for moving to another block without using the goto statement when the program is executed in general use where a special operation, such as forcibly changing the program counter using a debugger or the like, is not executed.

The replacement object block group generating unit 107 then replaces the path for moving to another block with a branch using the goto statement, with respect to each of the extracted one or more blocks.

Further, the replacement object block group generating unit 107 extracts a block containing a program instruction that is an exit of the program, and when the last instruction of the extracted block is a program instruction other than program instructions "return;" and "exit( );", adds program instruction "return;" to the end of the block.

The replacement object block group generating unit 107 generates a replacement object block group that is composed of the modified blocks and the blocks whose components have not been replaced.

In the following description, the blocks contained in the replacement object block group are referred to as replacement object blocks.

The following shows a specific example.

Figure 16:
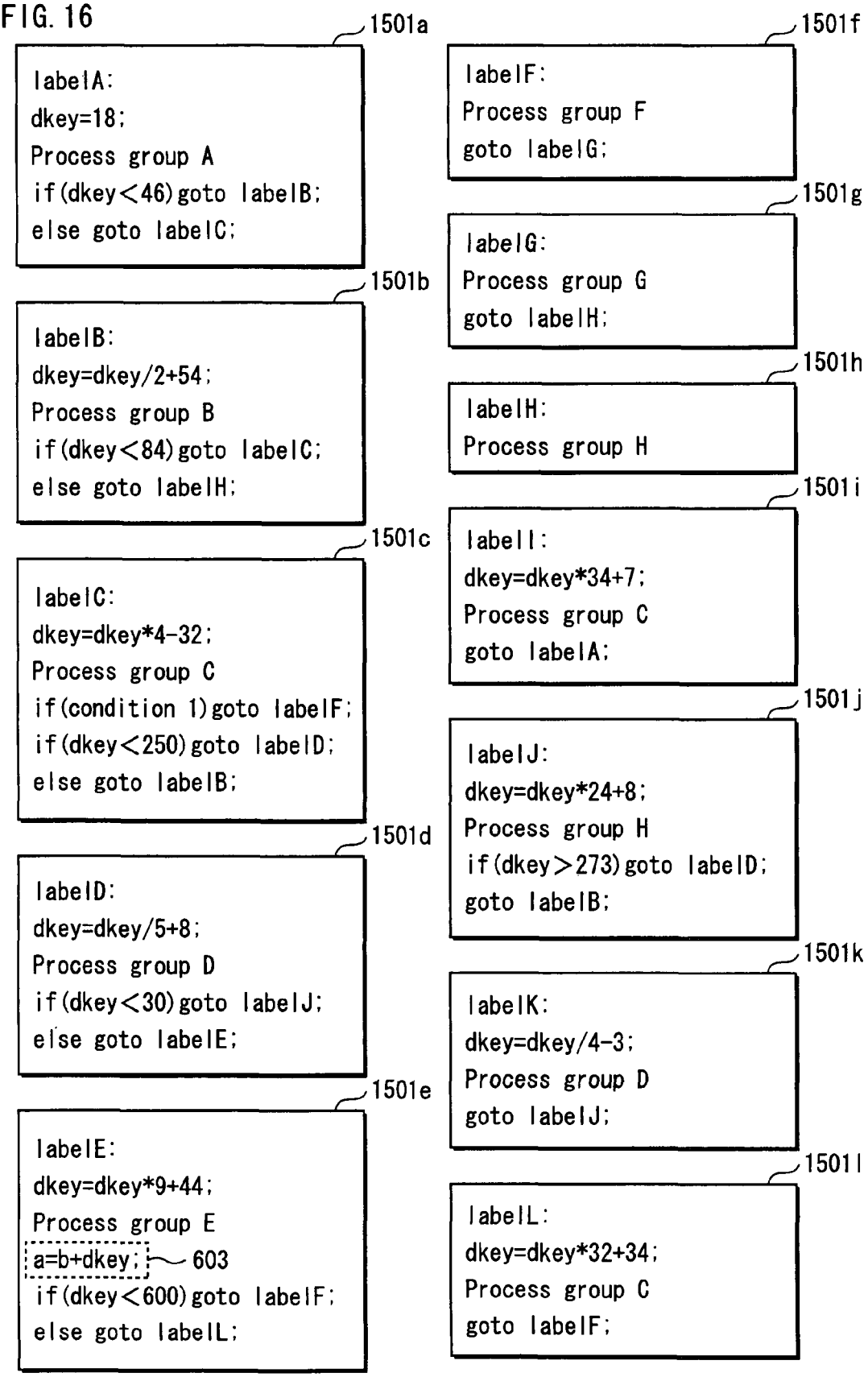
FIG. 16 shows one example of the structure of the replacement object block.

FIG. 16 shows a replacement object block group generated by the replacement object block group generating unit 107 from the label inserted equivalent program instruction not-inserted blocks 1002f through 1002h, dummy blocks, and pseudo branch instruction inserted blocks 1401a through 1401e.

The replacement object block group generating unit 107 extracts blocks (in this example, label-inserted equivalent program instruction not-inserted blocks 1002f and 1002g) each of which has a path for moving to another block without using the goto statement, from among the label inserted equivalent program instruction not-inserted blocks 1002f through 1002h, dummy blocks, and pseudo branch instruction inserted blocks 1401a through 1401e.

The replacement object block group generating unit 107 generates a replacement object block 1501f by replacing the path for moving to another block (in this example, the next block) with a program instruction "goto labelG;" being an unconditional branch instruction, with respect to the label inserted equivalent program instruction not-inserted block 1002*f*.

Similarly, the replacement object block group generating unit 107 generates a replacement object block 1501*g* by inserting a program instruction "goto labelH;" being an unconditional branch instruction, with respect to the label inserted equivalent program instruction not-inserted block 1002*g*.

Further, the replacement object block group generating unit 107 extracts a block containing a program instruction that is an exit of the program (in this example, the label inserted equivalent program instruction not-inserted block 1002*h*). Here, the label inserted equivalent program instruction not-inserted block 1002*h* includes process group H, which is instruction group H. The last instruction of the instruction group H is "return;". As a result, the replacement object block group generating unit 107 generates a replacement object block 1501*h* without adding program instruction "return;" to the end of the block. That is to say, the label inserted equivalent program instruction not-inserted block 1002*h* and the replacement object block 1501*h* are the same.

Further, each of the pseudo branch instruction inserted blocks 1401*a* through 1401*e* uses the goto statement for branching to another block. Accordingly, the replacement object block group generating unit 107 generates replacement object blocks 1501*a* through 1501*e* without adding a change to each of the pseudo branch instruction inserted blocks 1401*a* through 1401*e*.

Also, the replacement object block group generating unit 107 generates replacement object blocks 1501*j* through 1501*l* by using the dummy blocks themselves as the replacement object blocks.

1.1.9 Arrangement Order Replacing Unit 108

The arrangement order replacing unit 108 randomly replaces the arrangement order of replacement object blocks, except for a replacement object block that is the start node, among the replacement object blocks contained in the replacement object block group generated by the replacement object block group generating unit 107.

The arrangement order replacing unit 108 generates an obfuscated program that is composed of (i) the new variable declaration part generated by the equivalent program generating unit 104 and (ii) replacement object blocks whose arrangement order has been replaced.

The arrangement order replacing unit 108 distributes the generated obfuscated program to the external devices that execute the obfuscated program.

The following is a specific example of this.

The arrangement order replacing unit 108 replaces the replacement object blocks 1501*b* through 1501*l* shown in FIG. 16. In the present example, the arrangement order replacing unit 108 replaces the replacement object blocks so that all the replacement object blocks are finally arranged in the order of 1501*a*, 1501*g*, 1501*d*, 1501*c*, 1501*e*, 1501*l*, 1501*f*, 1501*b*, 1501*h*, 1501*k*, 1501*i*, and 1501*j*.

Figure 17:
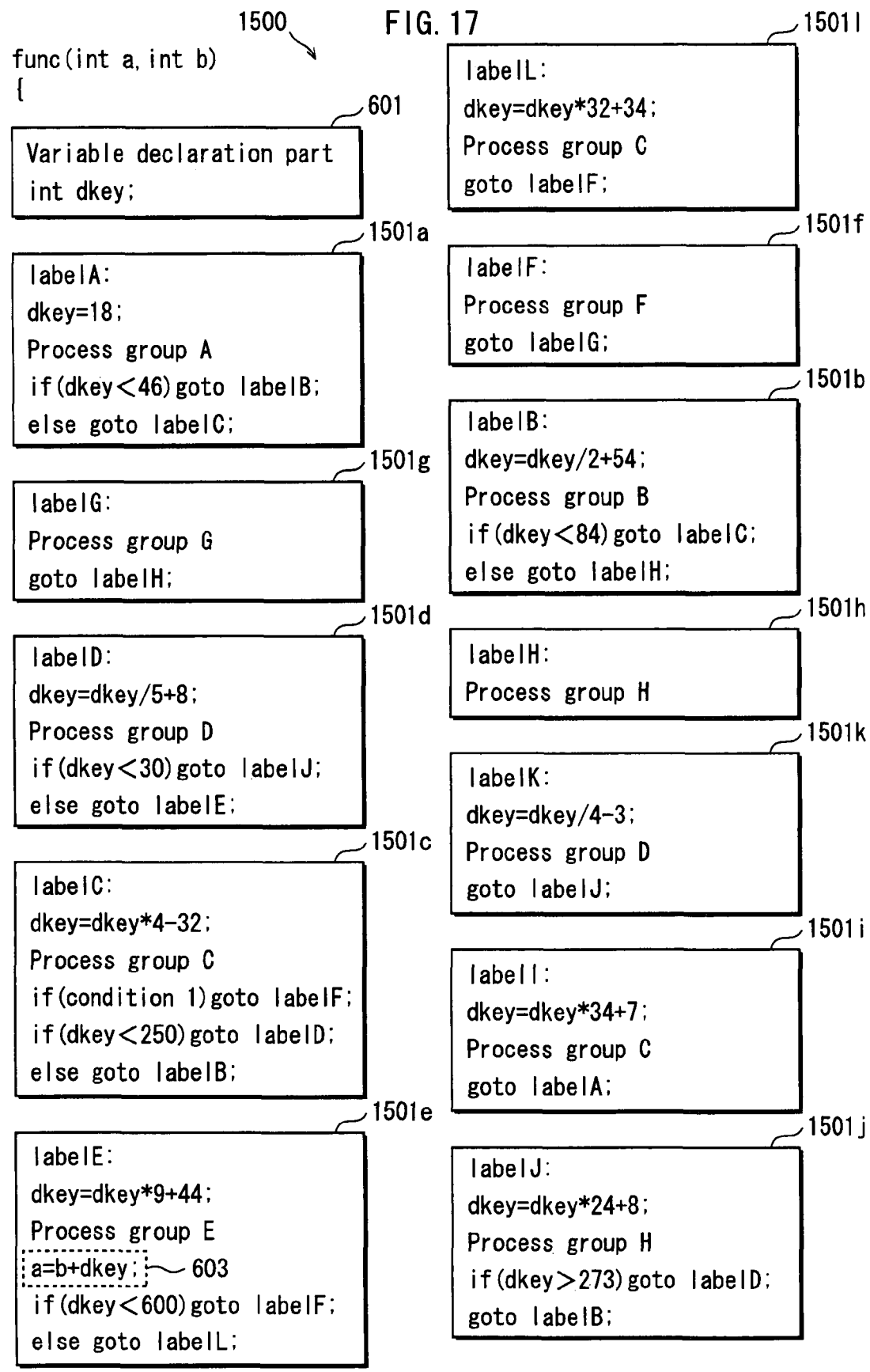
FIG. 17 shows one example of the structure of the obfuscated program 1500 generated from the obfuscation target program 201.

The arrangement order replacing unit 108 generates an obfuscated program 1500 shown in FIG. 17 using the replacement object blocks having been replaced with each other, and the variable declaration part 601 generated by the equivalent program generating unit 104.

1.2 Operation of Program Obfuscating Device 10

Here, the operation of the program obfuscating device 10 will be described.

1.2.1 Operation Summary

Here will be described an operation summary of the program obfuscating device 10 in obfuscating the obfuscation target program, with reference to FIG. 18.

The input unit 101 of the program obfuscating device 10 receives the obfuscation target program and position information (step S5).

The input unit 101 stores the received obfuscation target program and position information into the storage unit 100.

The block dividing unit 102 reads out the obfuscation target program from the storage unit 100, and divides the process part of the obfuscation target program into one or more basic blocks. Then, the block dividing unit 102 generates post-division blocks by dividing each basic block into small pieces (step S10).

The program obfuscating device 10 generates an equivalent program by performing the equivalent program generation process (step S15).

The program obfuscating device 10 generates a dummy block inserted program by performing the dummy block inserted program generation process (step S20).

The pseudo branch instruction inserted program generating unit 106 of the program obfuscating device 10 generates pseudo branch instruction inserted blocks by inserting pseudo branch instructions into the label inserted equivalent program instruction inserted blocks. The pseudo branch instruction inserted program generating unit 106 generates the pseudo branch instruction inserted program that is composed of the generated pseudo branch instruction inserted blocks, the label inserted equivalent program instruction not-inserted blocks, and the dummy blocks generated by the dummy block inserted program generating unit 105 (step S25).

The replacement object block group generating unit 107 extracts one or more blocks each of which has a path for moving to another block without using the goto statement when the program is executed in general use, from among a block group composed of the label inserted equivalent program instruction not-inserted blocks, dummy blocks, and pseudo branch instruction inserted blocks. The replacement object block group generating unit 107 then replaces the path for moving to another block with a branch using the goto statement, with respect to each of the extracted one or more blocks. Further, the replacement object block group generating unit 107 extracts a block containing a program instruction that is an exit of the program, and when the last instruction of the extracted block is a program instruction other than program instructions "return;" and "exit( )" adds program instruction "return;" to the end of the block. The replacement object block group generating unit 107 generates a replacement object block group that is composed of the modified blocks and the blocks whose components have not been replaced (step S30).

The arrangement order replacing unit 108 randomly replaces the arrangement order of replacement object blocks, except for a replacement object block that is the start node, among the replacement object blocks contained in the replacement object block group generated by the replacement object block group generating unit 107. The arrangement order replacing unit 108 generates an obfuscated program that is composed of (i) the new variable declaration part generated by the equivalent program generating unit 104 and (ii) replacement object blocks whose arrangement order has been replaced (step S35).

The arrangement order replacing unit 108 distributes the generated obfuscated program to the external devices that execute the obfuscated program (step S40).

1.2.2 Operation of Equivalent Program Generation Process

Here will be described the operation of the equivalent program generation process (step S15) shown in FIG. 18, with reference to the flowchart shown in FIG. 19.

The equivalent program instruction generating unit 103 analyzes the obfuscation target program to check on all variable names used in the program. Next, the equivalent program instruction generating unit 103 generates a variable name that does not overlap any of the currently used variable names, and determines the generated variable name as the secret information dedicated variable name (step S100).

The equivalent program instruction generating unit 103 generates a graph by regarding each post-division block, which was generated by the block dividing unit 102, as a node.

The equivalent program instruction generating unit 103 obtains, based on the graph generated in the graph generation step, the first through $N^{th}$ equivalent program instruction insertion target blocks into which to insert an equivalent program instruction (step S150). Here, N is an integer "1" or higher.

The equivalent program instruction generating unit 103 generates equivalent program instructions respectively in correspondence with the obtained one or more equivalent program instruction insertion target blocks (step S110).

The equivalent program generating unit 104 generates a new variable declaration part by adding the secret information dedicated variable name, which was determined by the equivalent program instruction generating unit 103, to the variable declaration part of obfuscation target program (step S115).

The equivalent program generating unit 104 obtains the position information that is stored in the storage unit 100, and replaces the value of the confidential information contained in the program instruction indicated by the obtained position information, with the secret information dedicated variable (step S120).

The equivalent program generating unit 104 generates the $(N-t+1)^{th}$ equivalent program instruction inserted block by inserting the $t^{th}$ (t=1, 2, ..., N) equivalent program instruction into the $(N-t+1)^{th}$ equivalent program instruction insertion target block. The equivalent program generating unit 104 generates an equivalent program that is composed of one or more equivalent program inserted blocks and one or more equivalent program not-inserted blocks (step S125).

1.2.3 Operation of Dummy Block Inserted Program Generation Process

Figure 20:
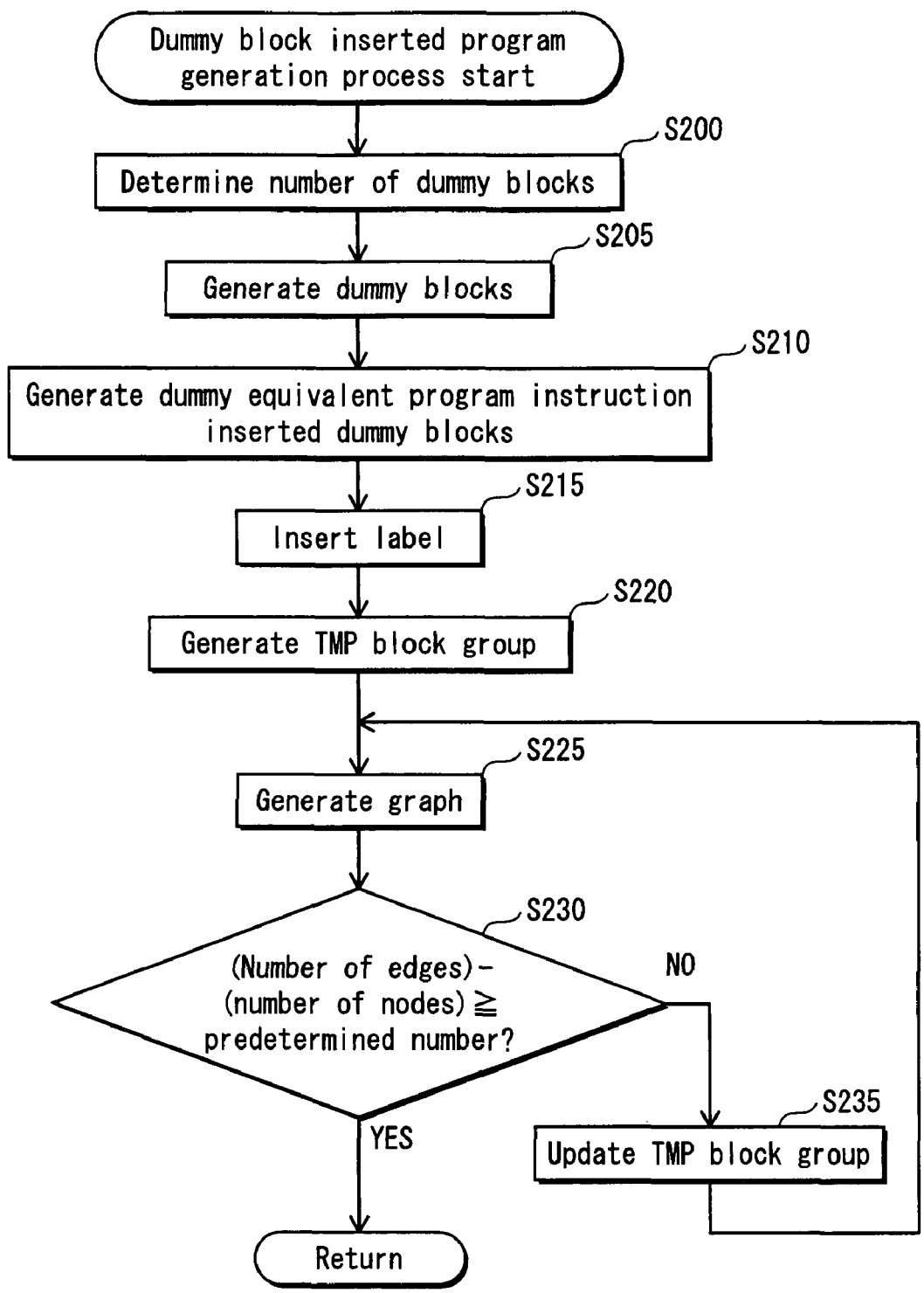
FIG. 20 is a flowchart showing an operation of the dummy block inserted program generation process.

Here will be described the operation of the dummy block inserted program generation process (step S20) shown in FIG. 18, with reference to the flowchart shown in FIG. 20.

The dummy block inserted program generating unit 105 determines the number of dummy blocks by obtaining the stored number of dummy blocks (step S206).

The dummy block inserted program generating unit 105 selects one or more post-division blocks randomly from among the post-division blocks generated by the block dividing unit 102, and generates dummy blocks by removing (conditional and unconditional) branch instructions from each program instruction group that constitutes the selected one or more post-division blocks (step S205). The dummy block inserted program generating unit 105 performs this step as many times as the obtained number of dummy blocks.

The dummy block inserted program generating unit 105 generates a dummy equivalent program instruction for each of the generated dummy blocks, and generates as many dummy equivalent program instruction inserted dummy blocks as the obtained number of dummy blocks, by inserting the generated dummy equivalent program instruction into each corresponding one of the dummy blocks (step S210).

The dummy block inserted program generating unit 105 generates label inserted equivalent program instruction inserted blocks by inserting a different label into each start of the equivalent program instruction inserted blocks generated by the equivalent program generating unit 104. The dummy block inserted program generating unit 105 generates label inserted equivalent program instruction not-inserted blocks by inserting a different label into each start of the equivalent program instruction not-inserted blocks. The dummy block inserted program generating unit 105 generates label inserted dummy equivalent program instruction inserted dummy blocks by adding a different label to each start of the generated dummy equivalent program instruction inserted dummy blocks (step S215).

The dummy block inserted program generating unit 105 generates as many TMP blocks as the number of dummy blocks, by adding an unconditional branch instruction to the end of each label inserted dummy equivalent program instruction inserted dummy block. The dummy block inserted program generating unit 105 generates a TMP block group that is composed of the generated one or more TMP blocks (step S220).

The dummy block inserted program generating unit 105 generates a graph by regarding, as a node, (a) each of TMP blocks constituting the TMP block group, (b) each of the label inserted equivalent program inserted blocks, and (c) each of the label inserted equivalent program instruction not-inserted blocks (step S225).

The dummy block inserted program generating unit 105 judges whether the value of "(number of edges)−(number of nodes)" is not smaller than a predetermined number (step S230).

When it judges that the calculated value is not smaller than the predetermined number (YES in step S230), the dummy block inserted program generating unit 105 ends the process.

When it judges that the calculated value is smaller than the predetermined number (NO in step S230), the dummy block inserted program generating unit 105 randomly selects a TMP block, into which to insert a conditional branch instruction, from among the TMP blocks constituting the TMP block group, generates a new TMP block by inserting the conditional branch instruction into the selected TMP block, and updates (generates) the new TMP block group (step S235), and returns to step S225.

1.3 Effects of Embodiment 1

With the above-described structure, it is possible to make it difficult to find the secret information from the obfuscated program.

First, the equivalent program instruction generating unit 103 and the equivalent program generating unit 104 replace the instructions containing secret information with equivalent program instructions, and allocate the equivalent program instructions to various positions in the program. With this structure, even if the unauthorized analyzer collects all the constant values contained in the program, the unauthorized analyzer cannot find the secret information. Also, with a structure where the equivalent program instructions are allocated to various positions in the obfuscated program, with post-division blocks between the equivalent program instructions, it is further difficult for the unauthorized analyzer to find the secret information.

Also, the dummy block inserted program generating unit 105 inserts dummy equivalent program instructions, which are program instructions using the same variable as equivalent program instructions, into dummy blocks. With this structure, even if the unauthorized analyzer collects a process that uses a particular variable in the program, it is difficult for the unauthorized analyzer to collect equivalent program instructions since the collected process includes both equivalent program instructions and dummy equivalent program instructions.

Further, the equivalent program instruction generating unit 103 generates equivalent program instructions by combining a plurality of calculations. Accordingly, even if the unauthorized analyzer detects a set of equivalent program instructions in the program, the unauthorized analyzer needs to rearrange the equivalent program instructions in the detected set to calculate the value of the confidential information. For example, when the equivalent program instructions are program instructions "(secret information dedicated variable name)=RA_0;", "(secret information dedicated variable name)=RA_2;", and "(secret information dedicated variable name)=RA_3;", the same value of the confidential information is obtained if the second and third instructions are executed in a reversed order. This does not happen with the method described in the embodiment above.

There is further a possibility that the unauthorized analyzer knows the algorithm for the obfuscation target program (program before obfuscation) and the obfuscation method itself, and performs an unauthorized analysis using the information. This will be described in detail in the following.

For example, algorithms for such encryption programs as DES and AES are publicized broadly, making it easy for the unauthorized analyzer to detect the algorithm for the obfuscation target program. Even with respect to such an obfuscation target program, there is a demand for protecting an encryption key, which is the confidential information, from an unauthorized analysis.

In this situation, it is presumed that the unauthorized analyzer who knows the algorithm for the obfuscation target program can generate a graph of the program before the obfuscation (for example, the graph shown in FIG. 5). It is also presumed that the unauthorized analyzer can generate a graph of the obfuscated program (for example, the graph shown in FIG. 12) by analyzing the obfuscated program.

The unauthorized analyzer may attempt an unauthorized analysis of detecting a graph of the program before the obfuscation within a graph of the obfuscated program, and removing dummy blocks from the obfuscated program to detect a remaining portion.

In the present embodiment, the dummy block inserted program generating unit 105 inserts pseudo branch instructions into the dummy blocks. This makes the structure of the graph of the obfuscated program complicated, thus making the unauthorized analysis difficult.

The arrangement order replacing unit 108 may make the structure of the graph of the obfuscated program complicated to make the unauthorized analysis difficult.

Also, in the case of an encrypted program having an encryption key, the program obfuscating device obfuscates the encrypted program using the encryption key as the confidential information. With this structure, it is difficult for the unauthorized analyzer to analyze the encryption key. Also, with this structure, when encrypted data is generated by encrypting copyright-protection-target data, it is difficult to obtain the encryption key, and this makes it difficult to analyze the encrypted data in an unauthorized manner.

1.4 Modification 1

In the above-described Embodiment 1, the program obfuscating device 10 generates the graph using the TMP block group. However, the present invention is not limited to this structure.

The program obfuscating device may include, instead of the dummy block inserted program generating unit 105 and the pseudo branch instruction inserted program generating unit 106, a pseudo branch instruction inserted program generating unit 106a that is composed of the dummy block inserted program generating unit 105 and the pseudo branch instruction inserted program generating unit 106, and may generate a graph using pseudo branch instruction inserted program.

1.4.1 Pseudo Branch Instruction Inserted Program Generating Unit 106a

The pseudo branch instruction inserted program-generating unit 106a obtains the number of dummy blocks, generates dummy blocks, generates dummy equivalent program instruction inserted dummy blocks, generates pseudo branch instruction attached dummy blocks, generates a TMP block group, and generates a pseudo branch instruction inserted program.

The operation of obtaining the number of dummy blocks, generating the dummy blocks, and generating the dummy equivalent program instruction inserted dummy blocks is the same as the operation of obtaining the number of dummy blocks, generating the dummy blocks, and generating the dummy equivalent program instruction inserted dummy blocks performed by the dummy block inserted program generating unit 105, and description thereof is omitted here.

The following will describe the generation of the TMP block group and the pseudo branch instruction inserted program.

(1) Generation of TMP Block Group

The pseudo branch instruction inserted program generating unit 106a generates label inserted equivalent program instruction inserted blocks by inserting a different label into the start of each equivalent program instruction inserted block generated by the equivalent program generating unit 104.

The pseudo branch instruction inserted program generating unit 106a generates label inserted equivalent program instruction not-inserted blocks by inserting a different label into the start of each equivalent program instruction not-inserted block.

The pseudo branch instruction inserted program generating unit 106a generates label inserted dummy equivalent program instruction inserted dummy blocks by inserting a different label into each start of the generated dummy equivalent program instruction inserted dummy blocks.

Here, the label name of each label that is inserted into each block is determined not to overlap any label name that has already been used in the program. Furthermore, when a label has already been inserted, a label is not inserted newly.

Next, the pseudo branch instruction inserted program generating unit 106a generates TMP blocks by adding an unconditional-branch instruction to the end of each label inserted dummy equivalent program instruction inserted dummy block.

The pseudo branch instruction inserted program generating unit 106a generates a TMP block group by generating a TMP block for each of the label inserted dummy equivalent program instruction inserted dummy block.

Next, the pseudo branch instruction inserted program generating unit 106a generates the pseudo branch instruction inserted blocks from the $t^{th}$ (t=1, 2, 3, ... N) label inserted equivalent program instruction inserted block. The generation method of this is the same as the generation method used by the pseudo branch instruction inserted program generating unit 106 of Embodiment 1, and description thereof is omitted.

Next, the pseudo branch instruction inserted program generating unit 106a generates a graph by regarding each block contained in the pseudo branch instruction inserted blocks as a node. The graph generation method is the same as the generation method used by the dummy block inserted program generating unit 105 of Embodiment 1, and description thereof is omitted.

The pseudo branch instruction inserted program generating unit 106a obtains the number of closed paths contained in the generated graph, and judges whether the obtained number of closed paths is not smaller than a predetermined number. Here, the closed path indicates a path whose start node and end node are the same node, among the paths each of which connects a start node and an end node. Here, the predetermined number is determined depending on the strength of the obfuscation desired by the user, and is, for example, "13".

When it judges that the number of closed paths is smaller than the predetermined number, the pseudo branch instruction inserted program generating unit 106a randomly selects a block, into which to insert a conditional branch instruction, from among the label inserted equivalent program instruction inserted blocks, label inserted equivalent program instruction not-inserted blocks, and TMP blocks. The pseudo branch instruction inserted program generating unit 106a generates a new block by inserting the conditional branch instruction into the selected block.

When the selected block is the $t^{th}$ (t=1, 2, 3, ... N) label inserted equivalent program instruction inserted block, the pseudo branch instruction inserted program generating unit 106a calculates the value of equivalent program instruction inserted block secret information dedicated variable by executing the first through $(N-t+1)^{th}$ equivalent programs in the order. The pseudo branch instruction inserted program generating unit 106a randomly selects a constant. "m", substitutes the selected value for the secret information dedicated variable dkey, determines a comparative operator such that a conditional expression "dkey (comparative operator) m" becomes false, and generates a pseudo branch instruction "if (dkey (comparative operator) m) then branch destination" using the generated comparative operator. It is presumed here that the branch destination is the start of the TMP block, and that the conditional branch instruction is inserted into the end of the block.

When the selected block is a label inserted equivalent program instruction not-inserted block, the pseudo branch instruction inserted program generating unit 106a calculates the value of equivalent program instruction inserted block secret information dedicated variable by executing the first through $N^{th}$ equivalent programs in the order. The operation subsequent to this is the same as that described earlier, and description thereof is omitted. It is also presumed that the conditional branch instruction is inserted into the end of the block.

When the selected block is a TMP block, the pseudo branch instruction inserted program generating unit 106a performs the operation that is the same as that of generating a new TMP block by the dummy block inserted program generating unit 105 as described earlier, and description thereof is omitted. It is also presumed that the conditional branch instruction is inserted into a position immediately before the first branch instruction that the insertion target block has. If the insertion target block does not have a branch instruction, the conditional branch instruction is inserted into the end of the insertion target block.

The pseudo branch instruction inserted program generating unit 106a generates a graph again using the new block, which was generated by inserting the conditional branch instruction, and using each block that has not been changed by the insertion, and then performs the above-described operation.

When it judges that the number of closed paths is not smaller than the predetermined number, the pseudo branch instruction inserted program generating unit 106a judges whether the generated graph is a planar graph (a graph that does not include a crossing).

When it judges that the graph is not a planar graph, the pseudo branch instruction inserted program generating unit 106a ends the process.

When it judges that the graph is a planar graph, the pseudo branch instruction inserted program generating unit 106a randomly selects a block, into which to insert a conditional branch instruction, from among the label inserted equivalent program instruction inserted blocks, label inserted equivalent program instruction not-inserted blocks, and TMP blocks. The pseudo branch instruction inserted program generating unit 106a generates a new block by inserting the conditional branch instruction into the selected block. The pseudo branch instruction inserted program generating unit 106a generates a graph again using the new block, which was generated by inserting the conditional branch instruction, and using each block that has not been changed by the insertion, and then performs the above-described operation.

The planar graph is known in the field of graph theory, and description thereof is omitted here.

Instead of obtaining the number of closed paths, the pseudo branch instruction inserted program generating unit 106a may count the number of edges and nodes in the generated graph, and use a value calculated by the expression "(number of edges)−(number of nodes)+1" as the approximate value of the number of closed*paths.

1.4.2 Operation Summary.

Here will be described an operation summary of the program obfuscating device in obfuscating the obfuscation target program in Modification 1, with reference to the flowchart shown in FIG. 18.

Figure 18:
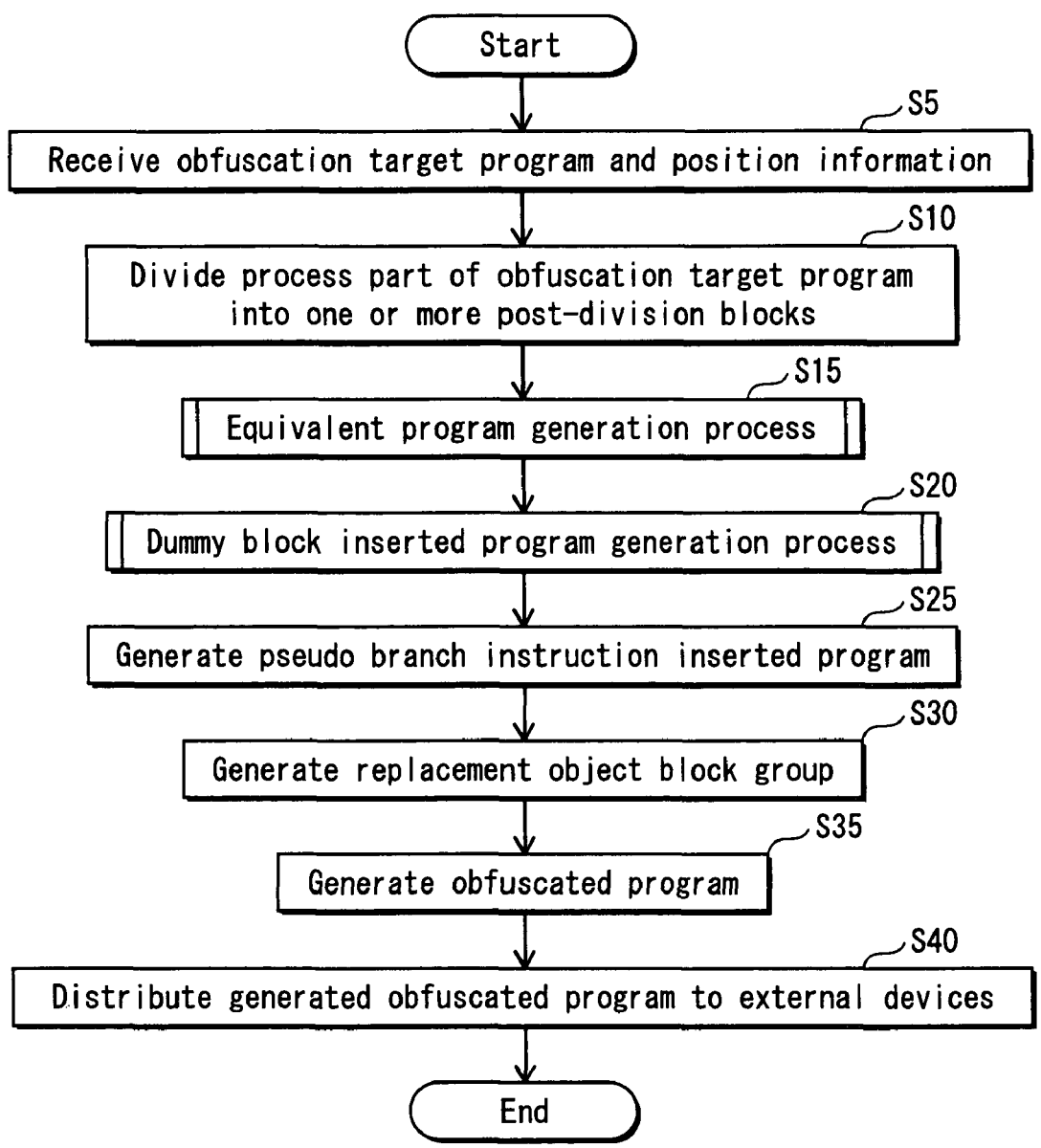
FIG. 18 is a flowchart showing an operation summary of the program obfuscating device 10.
Figure 19:
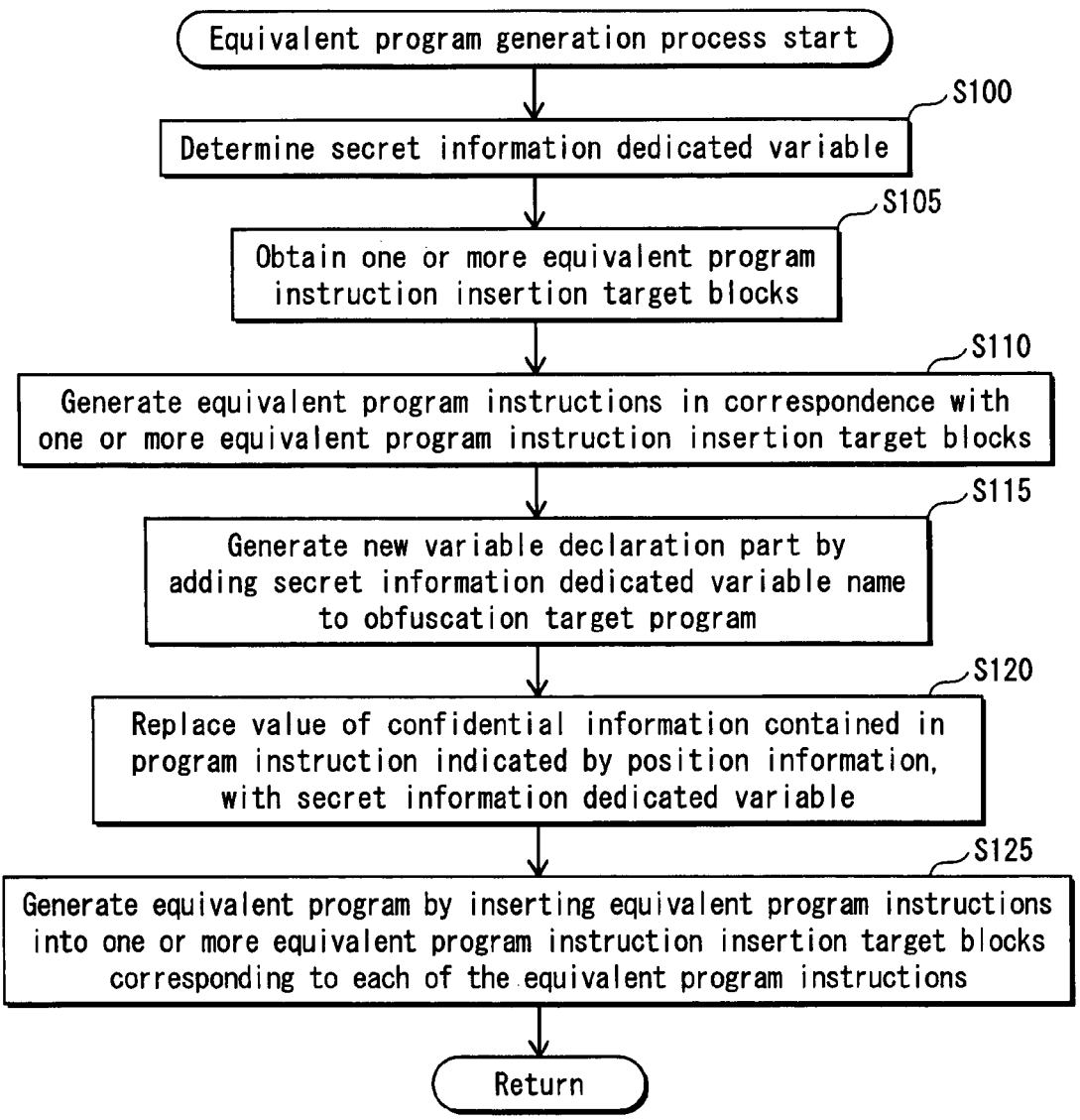
FIG. 19 is a flowchart showing an operation of the equivalent program generation process.

The program obfuscating device in Modification 1 performs a pseudo branch instruction inserted program generation process in step S20 instead of the dummy block inserted program generation process, after executing steps S5 through S15 shown in FIG. 18.

The program obfuscating device in Modification 1 omits step S25 and performs step S30 and onwards after performing the pseudo branch instruction inserted program generation process.

1.4.3 Pseudo Branch Instruction Inserted Program Generation Process

Figure 21:
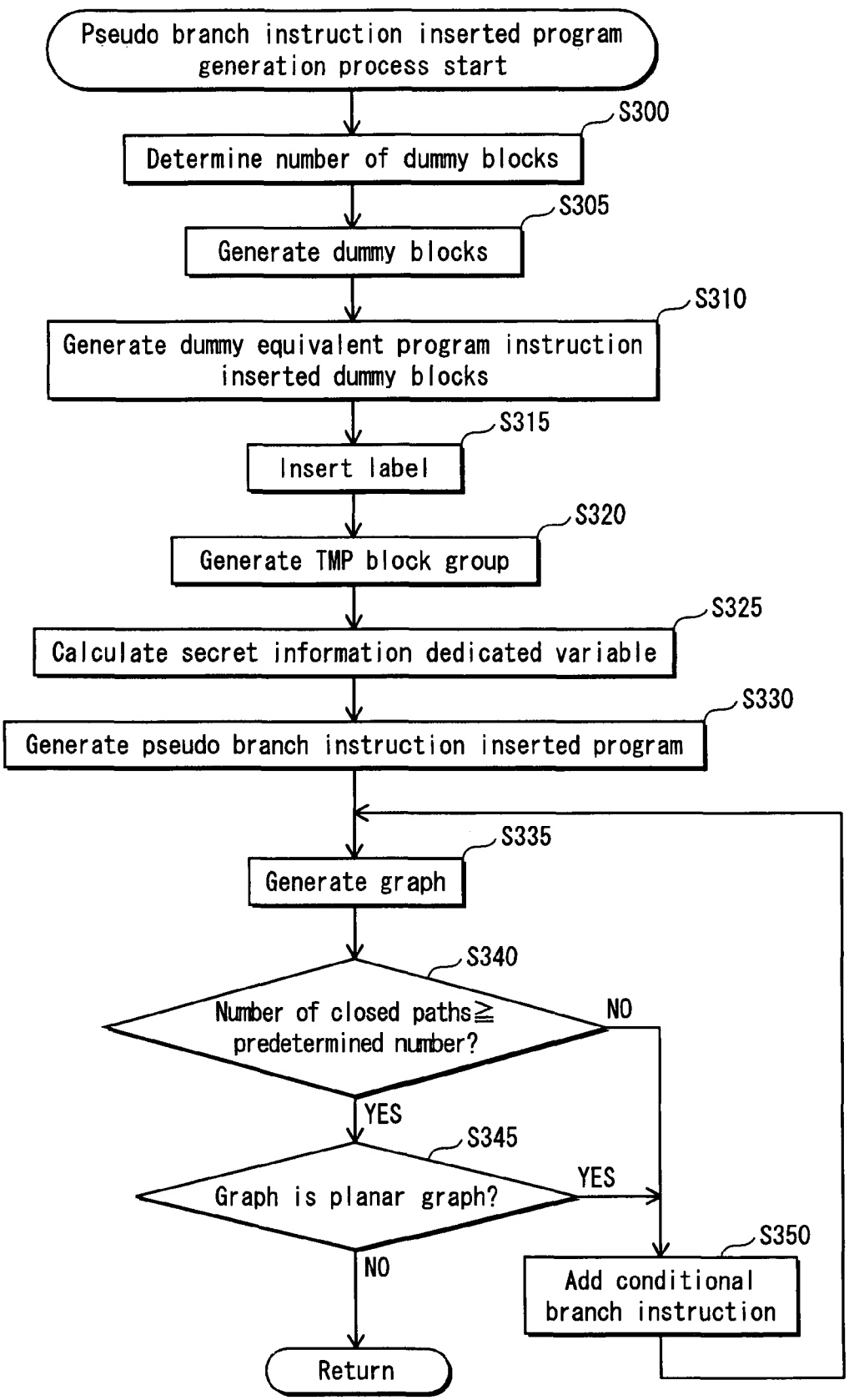
FIG. 21 is a flowchart showing an operation of the pseudo branch instruction inserted program generation process.

Here will be described the operation of the pseudo branch instruction inserted program generation process, with reference to the flowchart shown in FIG. 21.

The pseudo branch instruction inserted program generating unit 106a determines the number of dummy blocks by obtaining the stored number of dummy blocks (step S300).

The pseudo branch instruction inserted program generating unit 106a selects one or more post-division blocks randomly from among the generated post-division blocks, and generates dummy blocks by removing (conditional and unconditional) branch instructions from each program instruction group that constitutes the selected one or more post-division blocks (step S305). The pseudo branch instruction inserted program generating unit 106a performs this step as many times as the obtained number of dummy blocks.

The pseudo branch instruction inserted program generating unit 106a generates a dummy equivalent program instruction for each of the generated dummy blocks, and generates as many dummy equivalent program instruction inserted dummy blocks as the obtained number of dummy blocks, by inserting the generated dummy equivalent program instruction into each corresponding one of the dummy blocks (step S310).

The pseudo branch instruction inserted program generating unit 106a generates label inserted equivalent program instruction inserted blocks by inserting a different label into each start of the equivalent program instruction inserted blocks, generates label inserted equivalent program instruction not-inserted blocks by inserting a different label into each start of the equivalent program instruction not-inserted blocks, and generates label inserted dummy equivalent program instruction inserted dummy blocks by adding a different label to each start of the generated dummy equivalent program instruction inserted dummy blocks (step S315).

The pseudo branch instruction inserted program generating unit 106a generates as many TMP blocks as the number of dummy blocks, by adding an unconditional branch instruction to the end of each label inserted dummy equivalent program instruction inserted dummy block. The pseudo branch instruction inserted program generating unit 106a generates a TMP block group that is composed of the generated one or more TMP blocks (step S320).

The pseudo branch instruction inserted program generating unit 106a calculates the value of equivalent program instruction inserted block secret information dedicated variable in correspondence with the $t^{th}$ (t=1, 2, 3, ... N) label inserted equivalent program instruction inserted block (step S325). The calculation method is the same as the method used by the pseudo branch instruction inserted program generating unit 106 in Embodiment 1 described above, and description thereof is omitted here.

The pseudo branch instruction inserted program generating unit 106a generates, from the calculated values of the variables, pseudo branch instructions that are to be inserted into the $t^{th}$ (t=1, 2, ... N) label inserted equivalent program instruction inserted block, and generates pseudo branch instruction inserted blocks by inserting the generated pseudo branch instructions into the $t^{th}$ (t=1, 2, ... N) label inserted equivalent program instruction inserted block. The pseudo branch instruction inserted program generating unit 106a generates a pseudo branch instruction inserted program that is composed of the pseudo branch instruction inserted blocks, label inserted equivalent program instruction not-inserted blocks, and dummy blocks (TMP blocks) (step S330).

The pseudo branch instruction inserted program generating unit 106a generates a graph by regarding each block contained in the pseudo branch instruction inserted program, as a node (step S335).

The pseudo branch instruction inserted program generating unit 106a obtains the number of closed paths from the generated graph, and judges whether the obtained number of closed paths is not smaller than a predetermined number (step S340).

When it judges that the number of closed paths is not smaller than the predetermined number (YES in step S340), the pseudo branch instruction inserted program generating unit 106a judges whether the generated graph is a planar graph (a graph that does not include a crossing) (step S345).

When it judges that the graph is not a planar graph (NO in step S345), the pseudo branch instruction inserted program generating unit 106a ends the process.

When it judges that the number of closed paths is smaller than the predetermined number (NO in step S340), or when it judges that the graph is a planar graph (YES in step S345), the pseudo branch instruction inserted program generating unit 106a randomly selects a block, into which to insert a conditional branch instruction, from among the label inserted equivalent program instruction inserted blocks, label inserted equivalent program instruction not-inserted blocks, and (dummy blocks) TMP blocks. The pseudo branch instruction inserted program generating unit 106a generates a new block by inserting the conditional branch instruction into the selected block (step S350), and returns to step S335.

1.4.4 Effects of Modification 1

Known in the field of graph theory is the subgraph isomorphism problem where when two graphs G1 and G2 are given, it is difficult to decide whether G1 is contained in G2 (whether G1 is isomorphic to a subgraph of G2). The problem is described in Document 2.

According to this problem, even if it is known that G2 contains G1, it is difficult to decide which part of G2 contains G1. Also, such conditions that the program does not have a tree structure and that the program is not a planar graph are known as the conditions with which the subgraph isomorphism problem becomes difficult.

Therefore, it is possible to make the aforesaid unauthorized analysis difficult by constructing a graph of an obfuscated program based on the index of making difficult the subgraph isomorphism problem when detecting a graph of the program before the obfuscation within a graph of the obfuscated program.

The program obfuscating device of Modification 1 can construct a graph of the obfuscated program with which the subgraph isomorphism problem is difficult.

The program obfuscating device of Modification 1 may obtain the number of closed paths within a predetermined range, instead of obtaining the number of all closed paths.

Further, instead of obtaining the number of all closed paths, the program obfuscating device of Modification 1 may check on the closed paths contained in the program before obfuscation, detects the number of nodes that constitute each of the checked closed paths, and count as many closed paths as the detected number of nodes. With this structure, the program obfuscating device of Modification 1 can have a rough trend in the number of closed paths, thus reducing the time required for calculating the number of closed paths.

Further, the index of complexity when calculating the graph isomorphism problem, which is shown in Document 3 (44-50), may be used in a judgment, as well as the judgment on the number of closed paths and the judgment on the planar graph. Since the graph isomorphism problem can be regarded as a special case of the subgraph isomorphism problem, it is possible to use the index to generate a graph of an obfuscated program with which the subgraph isomorphism problem is difficult.

Described in the above is a case where the pseudo branch is added when the dummy blocks are generated and the subgraph isomorphism problem is not difficult. However, not limited to this structure, a graph of an obfuscated program with which the subgraph isomorphism problem becomes difficult may be generated preliminarily, and then the pseudo branch may be added in compliance with the generated graph.

1.4.5 Other Modifications

The pseudo branch instruction inserted program generating unit 106a performs both the judgment on the number of closed paths and the judgment on the planar graph when generating a pseudo branch instruction inserted program. However, the present invention is not limited to this structure.

The pseudo branch instruction inserted program generating unit 106a may perform either the judgment on the number of closed paths or the judgment on the planar graph when generating a pseudo branch instruction inserted program.

1.5 Modification 2

The operation in steps S330 and S350 of Modification 1 shown in FIG. 21 may be modified as follows.

1.5.1 Modification to Step S330

The pseudo branch instruction inserted program generating unit 106a inserts, as a branch instruction, a program instruction "return;" or "exit( );" that corresponds to a program end process.

1.5.2 Modification to Step S350

The pseudo branch instruction inserted program generating unit 106a inserts, as a conditional branch instruction, a program instruction "return;" or "exit( );" that corresponds to a program end process.

1.5.3 Effects of Modification 2

An unauthorized analyzer who knows the algorithm for the program before obfuscation may perform an analysis of a graph of the obfuscated program to detect a graph of the program before obfuscation therefrom. In doing this, the unauthorized analyzer may attempt to detect a correspondence between the end nodes of the program before obfuscation and the obfuscated program. For example, if the unauthorized analyzer detects a correspondence between the node 501h in the graph of FIG. 5 and the node 1201h in the graph of FIG. 12, it will facilitate the unauthorized analyzer to detect a graph of the program before obfuscation from a graph of the obfuscated program.

According to Modification 2, the number of candidates for the end node increases. Therefore, with the structure of Modification 2, it is difficult to detect the end node from the obfuscated program.

1.6 Modification 3

An unauthorized analyzer who knows the algorithm for the program before obfuscation may perform an analysis of a graph of the obfuscated program to detect a graph of the program before obfuscation therefrom. In doing this, the unauthorized analyzer may attempt to detect a correspondence between the start nodes of the program before obfuscation and the obfuscated program. For example, if the unauthorized analyzer detects a correspondence between the node 501a in the graph of FIG. 5 and the node 1201a in the graph of FIG. 12, it will facilitate the analysis. Modification 3 is aimed to make it difficult to extract the start node of the program. The program obfuscating device of Modification 3 includes an arrangement order replacing unit 108a, which is described in the following, instead of the arrangement order replacing unit 108 shown in Embodiment 1.

1.6.1 Arrangement Order Replacing Unit 108a

The arrangement order replacing unit 108a analyzes the obfuscation target program to check on all variable names used in the program and all variable names used in the arguments, and generates a new variable declaration part 601a by adding a variable name, which does not overlap any of the currently used variable names, to the variable declaration part 601 as a start node specification dedicated variable name being a new argument for specifying a start node for the obfuscation target program.

The arrangement order replacing unit 108a then adds a switch statement, which is a conditional branch instruction, to the start of the program. The switch statement to be added is a program instruction for selecting a case statement for execution depending on the value of the start node specification dedicated variable. Each case statement contains a branch instruction for branching to the start of the block that corresponds to a node group containing the start node.

Next, the arrangement order replacing unit 108a adds a value of the start node specification dedicated variable, which is referred to when the branch instruction is executed to branch to the start of the block corresponding to the start node, to an argument of a program instruction for calling an obfuscation target program, which is contained in a program that calls the obfuscation target program.

Next, the arrangement order replacing unit 108a generates an obfuscation target program by randomly arranging the order of all blocks, including the start node.

1.6.2 Specific Example

The arrangement order replacing unit 108a analyzes the obfuscation target program to check on all variable names used in the program and all variable names used in the arguments, and generates a variable name, which does not overlap any of the currently used variable names, as the start node specification dedicated variable. It is presumed in this example that the start node specification dedicated variable is "start".

Next, the arrangement order replacing unit 108a adds a switch statement to the start of the program.

It is presumed here that a program instruction being the switch statement to be added is as follows:

```
"
switch(start){
    case 1:
        goto labelC;
    case 2:
        goto labelA;
    case 3:
        goto labelL;
    default:
}
".
```

Next, the arrangement order replacing unit 108a replaces the function declaration and function name from "func(int a, int b)" to "func(int a, int b, int start)".

Also, when the program instruction for calling the obfuscation target is "func(a, b);", the arrangement order replacing unit 108a replaces it with "func(a, b, 2);". Here, the value "2" is a numeral value that is stored in the start node specification dedicated variable "start" that is used in the switch statement. It should be noted here that the program that calls the obfuscation target program may be obfuscated separately to conceal the start node specification dedicated variable "2".

1.6.3 Effects of Modification 3

With the application of the above-described obfuscation method, it becomes impossible to know the start node unless a correct value contained in the start node specification dedicated variable is known. That is to say, when one analyzes an obfuscation target program partially, he/she cannot detect the start node, and thus cannot find a correspondence between the start node in the graph of the program before obfuscation and the start node in the graph of the obfuscated program.

1.7 Modification 4

In the obfuscated program described in Embodiment 1, only a program instruction (in FIG. 17, the replacement object block 1501e) having the confidential information has the secret information dedicated variable only on the right-hand side thereof. Therefore, an unauthorized analyzer who knows the algorithm for the program before obfuscation may perform an unauthorized analysis by detecting a correspondence between a node (in FIG. 5, the node 501e) at the confidential information in a graph of the program before obfuscation and a block having the secret information dedicated variable only on the right-hand side thereof in the obfuscated program.

To prevent such an unauthorized analysis, the program obfuscating device in Modification 4 may add one or more program instructions that have the secret information dedicated variable only on the right-hand side thereof, when generating the dummy blocks. With this structure, the program obfuscating-device in Modification 4 can provide a program that is difficult to be analyzed by the above-described unauthorized analysis.

Further, the program obfuscating device in Modification 4 may replace a constant, which is contained on the right-hand side of an instruction in an equivalent program instruction inserted block, with a program instruction that calculates the constant using a calculated equivalent program instruction inserted block secret information dedicated variable. This increases the number of program instructions that have the secret information dedicated variable on the right-hand side thereof. With this structure, the program obfuscating device in Modification 4 can provide a program that is difficult to be analyzed by the above-described unauthorized analysis.

1.8 Modification 5

A program before obfuscation may include a unique calculation or a calculation using a unique numeral (for example, the number of loops in an algorithm of an encryption program). In such a case, an unauthorized analyzer who knows the algorithm for the program before obfuscation may detect a unique calculation or a unique numeral in the program before obfuscation, and use it to detect a node indicating a correspondence between the graphs before and after obfuscation.

To make such an unauthorized analysis difficult to achieve, the unique calculation may be replaced with another process. This method is disclosed in Document 1.

Also, the unique numeral may be treated as secret information, and may be kept to be confidential by the obfuscation method described above or another obfuscation method.

1.9 Other Modifications 1.9.1 Other than C Language

In Embodiment 1 described above, the program holding the secret information is written in C language. However, not limited to this, the program may be written in Java™ bytecode, Java™ language, assembly language, machine language or the like.

In the case where the program is written in Java™ bytecode, program instruction "goto" or "goto_w" is used to generate a program instruction "goto" statement in C language. The respective uses of program instructions "goto" and "goto_w" are known, and description thereof is omitted here.

Other instructions corresponding to those in C language can also be generated in accordance with the description method for Java™ bytecode.

Further, in the process of detecting an unconditional branch instruction, an unconditional branch in Java™ bytecode is detected, and in the process of detecting a conditional branch instruction, a complex branch or a conditional branch in Java™ bytecode is detected.

Further, when the program is written in Java™ language, since Java™ language does not have an instruction that corresponds to the program instruction "goto" in C language, each block is generated as a method. Then, a program instruction, from which an exception is thrown, is added to a method that contains a program instruction that is an exit of the program, and a program instruction, which catches a thrown exception, is added to a method that contains a program instruction that is an entry of the program. How to describe a method or exception is known, and description thereof is omitted here.

Other instructions corresponding to those in C language can also be generated in accordance with the description method for Java™ language.

Further, when the program is written in Java™ language, in the process of detecting an unconditional branch instruction, a program instruction "break", "continue", "return", or "throw" is detected.

In the process of detecting a conditional branch instruction, "if-else", "switch", "while", "do-while", "for", or "try, catch, finally". These program instructions are known, and description thereof is omitted here.

In the case where the program is written in an assembly language, an instruction set for use differs depending on the assembly language used. For example, when an assembly language by GAS is used, program instruction "jmp" is used to generate a program instruction "goto" statement in C language.

Further, in the process of detecting an unconditional branch instruction, a program instruction "jmp", "call", "ret", or "hlt" is detected.

In the process of detecting a conditional branch instruction, a jump instruction other than "jmp" is detected. It should be noted here that the assembly language by GAS is known, and description thereof is omitted.

In the case where the program is written in a machine language, an instruction set for use differs depending on the machine language used. Instruction sets are described in accordance with a description method of the machine language used.

Further, in the case where the program is written in a machine language, the generation of a switch statement explained in Modification 3 may be replaced with a structure that uses the following process. That is to say, instead of generating the switch statement, a relative jump instruction using the start node specification dedicated variable as the argument (an instruction for operating the program counter as many times as the value of a variable that is specified as the argument) may be generated. In this case, instead of a value used in the case statement in the switch statement, a value, with which the generated relative jump instruction makes a jump to an address corresponding to the start node, is set to the start node specification dedicated variable.

1.9.2 Divisional Blocks

In Embodiment 1 described above, a division into basic blocks is performed, and then post-division blocks are generated by dividing each basic block into small pieces. However, not limited to this, a division into basic blocks may be omitted, and post-division blocks may be generated by a division that is based on only the number of lines.

In the case where such a structure is adopted, the program obfuscating device inserts an equivalent program instruction into a place before the first branch instruction and after the last merging position in the equivalent program instruction insertion target block.

1.10 Other Modifications

Up to now, the present invention has been described through an embodiment thereof. However, the present invention is not limited to the embodiment, but includes, for example, the following modifications.

(1) In Embodiment 1 described above, the position information that the program obfuscating device 10 receives is a line number of a program instruction that holds secret information for the obfuscation target program. However, the present invention is not limited to this.

The position information may be specified using a macro name that is a constant value. That is to say, a program instruction containing a macro with a predetermined name may be used as the position information.

Alternatively, the position information may be specified using a label. That is to say, in the program, a line that follows a line in which a label with a predetermined name exists, may be used as the confidential information.

Further alternatively, instead of the macro/label with a predetermined name, a macro/label with a predetermined prefix or suffix may be used to specify the position information.

(2) In Embodiment 1 described above, the program obfuscating device 10 preliminarily stores the number of dummy blocks. However, the present invention is not limited to this.

The program obfuscating device 10 may obtain the number of dummy blocks by using the following expression, where "e" represents the complexity level of the obfuscation target program.

(Number of generated dummy blocks)=(Predetermined number)−e

Here, the complexity level is a value that indicates a level of complexity of a program, by means of the number of program instructions contained in the program, the number of loops, the number of variables used in the program, or a combinations of these. The complexity level is used for detecting a program that is easy to contain a bug.

Here, the predetermined number is a number that is determined in accordance with the obfuscation strength desired by the user.

Figure 22:
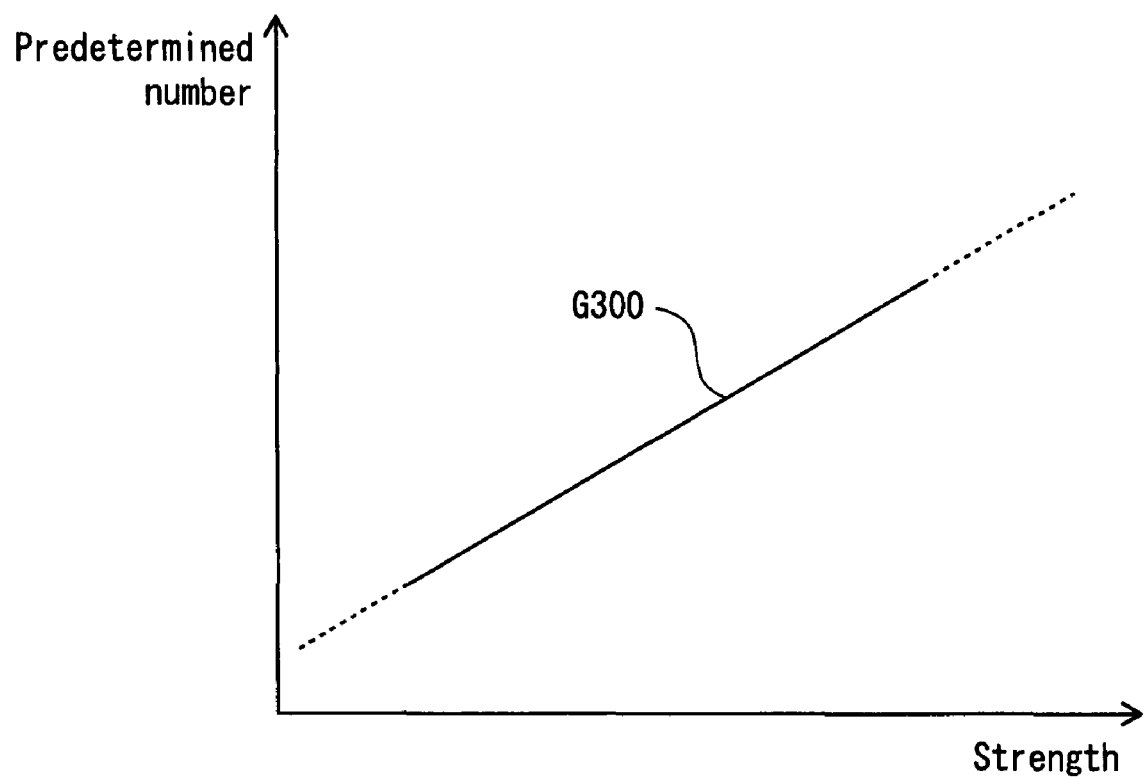
FIG. 22 shows the relationships between a predetermined number and the graph strength.

The following will describe how the predetermined number is determined. FIG. 22 shows the relationships between the predetermined number and the obfuscation strength. As shown in FIG. 22, as the strength increases, the predetermined number increases monotonously (function G300 shown in FIG. 22). The graph G300 is represented by y=aX+b. With this structure, when the strength that the user desires is determined, the predetermined number is determined uniquely. The program obfuscating device subtracts the complexity level "e" of the obfuscation target program from the determined predetermined number, and determines the result of the subtraction as the number of dummy blocks.

Alternatively, a result of subtracting the number of post-division blocks from the determined number of nodes may be determined as the number of dummy blocks.

(3) In Embodiment 1 described above, the program obfuscating device 10 preliminarily stores the predetermined number that is determined is in accordance with the obfuscation strength desired by the user. However, the present invention is not limited to this.

In the program obfuscating device 10, the input unit 101 may receive a specification of the obfuscation strength each time a program is obfuscated, and the program obfuscating device 10 may obfuscate the program using a predetermined number depending on the specified strength.

Alternatively, the input unit 101 of the program obfuscating device 10 may receive a predetermined number, which corresponds to an obfuscation strength, each time a program is obfuscated, and the program obfuscating device 10 may obfuscate the program using the received predetermined number.

Further alternatively, the program obfuscating device 10 may receive a specification of the obfuscation strength from another program each time a program is obfuscated, and the program obfuscating device 10 may obfuscate the program using a predetermined number depending on the specified strength.

Yet further alternatively, the program obfuscating device 10 may receive a predetermined number, which corresponds to an obfuscation strength, from another program each time a program is obfuscated, and the program obfuscating device 10 may obfuscate the program using the received predetermined number.

(4) In Embodiment 1 described above, the program obfuscating device 10 generates the dummy equivalent program instruction inserted dummy blocks by inserting a dummy equivalent program instruction into each of all the dummy blocks. However, the present invention is not limited to this.

The program obfuscating device 10 may generate the dummy equivalent program instruction inserted dummy blocks by inserting a dummy equivalent program instruction into each of one or more dummy blocks among a plurality of generated dummy blocks.

(5) As a modification to Embodiment 1 described above, the program obfuscating device 10 may use the block dividing unit to generate one or more post-division blocks from a pseudo branch instruction inserted program, and generate a replacement object block group from the generated one or more post-division blocks.

Alternatively, the program obfuscating device 10 may use the block dividing unit to generate one or more post-division blocks from a partial program that is composed of one or more blocks that are executed by an operation in general use contained in a pseudo branch instruction inserted program, and generate a replacement object block group from the generated one or more post-division blocks and one or more blocks that are not executed by operations in the general use contained in the pseudo branch instruction inserted program.

(6) In Embodiment 1 described above and Modifications, "(number of edges)−(number of nodes)", the number of closed paths, or the planar graph is used as an example of an index indicating the graph difficulty level (strength). However, the present invention is not limited to this.

As the index indicating the graph difficulty level, the number of closed paths, each of which is composed of a first predetermined number or more of nodes, may be used. In this case, for example, the program obfuscating device 10 preliminarily stores "3" as the first predetermined number, and preliminarily stores "4" as the second predetermined number that indicates the smallest number of closed paths.

The dummy block inserted program generating unit 105 of the program obfuscating device 10 obtains all closed paths, each of which is composed of three or more nodes, from a generated graph.

The dummy block inserted program generating unit 105 judges whether the obtained number of closed paths is not smaller than the second predetermined number.

When it judges that the obtained number of closed paths is not smaller than the second predetermined number, the dummy block inserted program generating unit 105 stops the process.

When it judges that the obtained number of closed paths is smaller than the second predetermined number, the dummy block inserted program generating unit 105, as is the case with Embodiment 1, randomly selects a TMP block, into which to insert a conditional branch instruction, from among the TMP blocks constituting the TMP block group, and generates a new TMP block from the selected TMP block.

(7) In Embodiment 1 described above, the confidential information is a constant. However, the present invention is not limited to this. The confidential information may be an instruction group composed of one or more program instructions.

For example, a branch destination of a branch instruction may be treated as confidential information. More specifically, when branch destination "label D" of branch instruction "goto label D;" is confidential information, it may be broken into "x=0;", "x=x+3;", "if (x==2) then goto label B;", and "if (x==3) then goto label D;". With such a-break, added to the dummy block is, for example, at least one of (i) an expression using variable "x", (ii) an instruction for branching to label D, and (iii) an instruction for changing a branch destination depending on the value stored in the variable "x". Specific examples of the added program instructions are "x=x+5;", "if (x==5) then goto label D;", and "if (x==4) then goto label A;". Here, the concept of the program instruction includes calculation expression. The "labelA" and "labelB" described above are label names written in the obfuscation target program.

Also, for example, two program instructions "a=a*10; a=a+5;" may be treated as confidential information, and the program obfuscating device may generate three equivalent program instructions "a=a*2;", "a=a+1;", and "a=a*5" from the two program instructions. In this case, an expression using variable "a" is added to the dummy block. An example of the expression using variable "a" is "a=a*5+2".

(8) In Embodiment 1 described above, the secret information dedicated variable is used. However, not limited to this, the secret information dedicated variable may not be used.

For example, "b=a^3" may be treated as confidential information, and it may be broken into "b=a;", "b=b*a+4;", and "b=(b−4)*a;". With such a break, added to the dummy block is, for example, at least one of (i) an expression using both variables "a" and "b", and (ii) an expression using either variable "a" or variable "b". Specific examples of the added expressions are "b=b*a−6;", "b=b+2;", and "a=a+1;".

Further, for example, "b=9" may be broken into "an instruction for writing value 8 to file A", "an instruction for reading out file A", "an instruction for substituting the read-out value for variable b", and "an instruction for adding 1 to variable b for which the read-out value has been substituted". Alternatively, "b=9" may be broken into "an instruction for writing value 8 to file A", "an instruction for reading out file A", "an instruction for substituting the read-out value for variable c", "an instruction for adding 1 to variable c for which the read-out value has been substituted", and "an instruction for substituting the addition result for variable b". With such a break, added to the dummy block is, for example, at least one of the program instructions: (i) an expression using variable "b"; (ii) an instruction for writing file A; (iii) an instruction for reading out file A; and (iv) an instruction for reading out file A and substituting the read-out value for variable b. Specific examples of the added expressions are "b=b*3+1;", "write value 3 to file A;", and "b=read function (read out file A);". Here, the concept of the program instruction includes calculation expression.

(9) As a modification to Embodiment 1 described above, the program obfuscating device may generate a replacement object block group by using a plurality of post-division blocks and one or more dummy equivalent program instruction inserted dummy blocks. Also, a label name may be assigned to each of the post-division blocks.

Alternatively, the program obfuscating device may generate a replacement object block group by using a plurality of post-division blocks and one or more TMP blocks. Also, a label name may be assigned to each of the post-division blocks.

(10) In Embodiment 1 described above, the arrangement order replacing unit 108 randomly replaces the arrangement order of replacement object blocks, except for a replacement object block that is the start node. However, the present invention is not limited to this.

The arrangement order replacing unit 108 may randomly replace the arrangement order of all replacement object blocks, including a replacement object block that is the start node. In this case, when a replacement object block being a dummy block is arranged at the start of the process part of the program after the replacement, the arrangement order replacing unit 108 inserts, into the start of the replacement object block being a dummy block, a conditional branch instruction or an unconditional branch instruction for branching to a replacement object block that always contains the process group A (a block that is the start node).

With this structure, even if a dummy block exists in the start of the program, the obfuscated program is executed always starting with a correct block.

(11). In Embodiment 1 described above, the program obfuscating device 10 inserts one equivalent program instruction into each equivalent program instruction insertion target block. However, the present invention is not limited to this. The program obfuscating device 10 may insert two or more equivalent program instructions into each equivalent program instruction insertion target block.

(12) In Embodiment 1 described above, the program obfuscating device 10 inserts the equivalent program instruction into each of the blocks that range from a block being the start node to a block being a secret holding node. However, not limited to this, the program obfuscating device 10 may insert the equivalent program instruction in the order into one or more blocks among the blocks that range from a block being the start node to a block being a secret holding node.

(13) In Embodiment 1 described above, the program obfuscating device 10 inserts the equivalent program instruction after dividing the obfuscation target program into a plurality of post-division blocks. However, not limited to this, the program obfuscating device 10 may insert the generated first to $N^{th}$ equivalent program instructions into a location between the first program instruction to be executed and a program instruction containing the confidential information, in the obfuscation target program.

In this case, after inserting the first to $N^{th}$ equivalent program instructions, the program obfuscating device 10 may divide the obfuscation target program into a plurality of post-division blocks. Alternatively, after inserting the first to $N^{th}$ equivalent program instructions, the program obfuscating device 10 may further insert a dummy block, and insert a branch instruction for always bypassing the inserted dummy block. In this case, the program obfuscating device 10 may, for example, attach a label to a place immediately after the inserted dummy block, and write the inserted branch instruction such that the branch destination thereof is the attached label.

Here, the branch instruction for bypassing the dummy block is an instruction for branching to another program instruction that is not contained in the dummy block so that any of the program instructions contained in the dummy block is not executed.

(14) In Embodiment 1 described above, the program obfuscating device 10 replaces the value of the confidential information with the secret information dedicated variable, and inserts equivalent program instructions into corresponding equivalent program instruction insertion target blocks, respectively. However, the present invention is not limited to this.

The program obfuscating device 10 may replace the value of the confidential information with the secret information dedicated variable after inserting equivalent program instructions into corresponding equivalent program instruction insertion target blocks, respectively.

(15) In Embodiment 1 described above, the program that is obfuscated is a program that requires all instructions thereof to run in general use. Therefore, to secure that the obfuscated program runs properly in the general use, it is necessary to insert a branch instruction for branching to the start of the next block to execute, into the end of each post-division block (hereinafter merely referred to as "block").

However, the following case does not require the above-described method of inserting the branch instruction.

For example, when an input program already contains dummy instructions that are not required in general use, there is a possibility that a dummy instruction is contained in the start or end of a block. Such a case may happen when an obfuscated program that has been obfuscated by another obfuscation method is further obfuscated by the method of the present invention.

When such a program is input, the operation in the general use is not affected even if the execution of the dummy instructions is omitted. Therefore, the execution of a dummy instruction located at the start of a block may be omitted by inserting there a branch instruction for branching to the start of an instruction that is required in the general use.

Also, the execution of a dummy instruction located at the end of a block may be omitted by inserting there a branch instruction for branching to the end of an instruction that is required in the general use.

(16) The execution of a branch instruction to inserted in a dummy block or a branch instruction that does not branch to its branch destination does not affect the execution in general use, regardless of the branch destination specified in the branch instruction. Accordingly, there is no need for these branch instructions to be branch instructions for branching to the start of a block. These branch instructions may be branch instructions for branching to somewhere in a block.

(17) The instruction group of the present invention is composed of one or more instructions. That is to say, the instruction group of the present invention includes an instruction group that is composed of one instruction.

(18) Each of the above-described devices is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each device to achieve the functions. That is to say, the microprocessor reads out one instruction by one instruction from the computer program, analyzes the read-out instruction, and operates in accordance with the analysis result.

(19) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

It should be noted here that although the term LSI is used here, it may be called IC, system LSI, super LSI, ultra LSI or the like, depending on the level of integration.

Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(20) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(21) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(22) The present invention may be any combination of the above-described embodiments and modifications.

1.11 Summary (1) The present invention is achieved as a program obfuscating device for obfuscating a program, the program obfuscating device including: an equivalent program instruction group generating unit that generates a second program instruction group that has a same function as a first program instruction group that is composed of one or more program instructions which include a confidentiality object instruction or a program instruction that uses confidential information contained in a first input program; an equivalent program generating unit that generates a first output program by removing the first program instruction group from the first input program and inserting the second program instruction group; a dummy block inserted program generating unit that, during an arbitrary execution for obtaining an execution result in general use, generates one or more dummy blocks each of which is composed of one or more program instructions that are not executed, and generates a second output program by inserting the one or more dummy blocks into a second input program, wherein at least one of program instructions of the one or more dummy blocks uses a variable that is used by a program instruction contained in the second program instruction group.

(2) In the above-described program obfuscating device of (1), at least one of the one or more dummy blocks contains a branch instruction for branching to a program instruction contained in the second input program.

(3) The above-described program obfuscating device of (2) further including a program dividing unit that divides a third input program into post-division blocks each of which includes one or more program instructions, wherein the dummy block inserted program generating unit regards each post-division block and each dummy block as a node, determines that there is an edge between a first node and a second node when the first node contains a branch instruction for branching to the second node, determines that there is an edge between the first node and the second node when last program instruction of the first node is a program instruction other than an unconditional branch instruction and the second node corresponds to a program instruction that follows a program instruction in the second input program corresponding to the last program instruction of the first node, and generates the dummy blocks such that number of closed paths detected in a graph composed of nodes and edges is equal to or greater than a first predetermined number.

(4) The above-described program obfuscating device of (3) further including an input unit that inputs the first predetermined number.

(5) The above-described program obfuscating device of (2) further including a program dividing unit that divides the second input program into post-division blocks each of which is a program instruction group composed of one or more program instructions, wherein the dummy block inserted program generating unit regards each post-division block and each dummy block as anode, determines that there is an edge between a first node and a second node when the first node contains a branch instruction for branching to the second node determines that there is an edge between the first node and the second node when last program instruction of the first node is a program instruction other than an unconditional branch instruction and the second node corresponds to a program instruction that follows a program instruction in the second input program corresponding to the last program instruction of the first node, and generates the dummy blocks such that number of closed paths, each of which is composed of nodes the number of which is equal to or greater than a first predetermined number, detected in a graph composed of nodes and edges is equal to or greater than a second predetermined number.

(6) The above-described program obfuscating device of (5) further including an input unit that inputs the first predetermined number.

(7) The above-described program obfuscating device of (5) further including an input unit that inputs the second predetermined number.

(8) In the above-described program obfuscating device of (2), the dummy block inserted program generating unit may further include a program dividing unit that divides the second input program into post-division blocks each of which is a program instruction group composed of one or more program instructions, wherein the dummy block inserted program generating unit regards each dummy block as a node, determines that there is an edge between a first node and a second node when the first node contains a branch instruction for branching to the second node, determines that there is an edge between the first node and the second node when last program instruction of the first node is a program instruction other than an unconditional branch instruction and the second node corresponds to a program instruction that follows a program instruction in the second input program corresponding to the last program instruction of the first node, generates a first graph composed of nodes and edges, regards each post-division block and each dummy block as a node, determines that there is an edge between a first node and a second node when the first node contains a branch instruction for branching to the second node, determines that there is an edge between the first node and the second node when last program instruction of the first node is a program instruction other than an unconditional branch instruction and the second node corresponds to a program instruction that follows a program instruction in the second input program corresponding to the last program instruction of the first node, generates a second graph composed of nodes and edges, and generates the dummy blocks such that a difficulty level of a subgraph isomorphism problem of detecting the first graph from the second graph is equal to or greater than a first predetermined number.

(9) The above-described program obfuscating device of (8) further including an input unit that inputs the first predetermined number.

(10) The above-described program obfuscating device of (1) or (2) further including a pseudo branch instruction inserted program generating unit that divides a third input program into a first block and a second block at an arbitrary position, generates a third block by adding a conditional branch instruction, which determines a branch destination by a branch condition that a truth value becomes a first constant value during an arbitrary execution for obtaining an execution result in general use, to an end of the first block, and generates a third output program that is composed of the third block and the second block, wherein the branch destination of the conditional branch instruction is a start of the second block when the branch condition takes the first value.

(11) In the above-described program obfuscating device of (1), the equivalent program instruction group generating unit generates the second program instruction group such that a program, which is generated by replacing at least one pair of program instructions contained in the second program instruction group contained in the first output program, has a different function from the first output program when executed in general use.

(12) The above-described program obfuscating device of (1) or (2) further including: a small block generating unit that divides a fourth input program into small blocks each of which is composed of one or more program instructions; a replacement object block generating unit that generates replacement object blocks respectively from the small blocks; and a post arrangement order change program generating unit that generates a fourth output program by changing an arrangement order of the replacement object blocks, wherein the replacement object block generating unit generates a replacement object block by adding a branch instruction, which branches to a second small block that corresponds to a program instruction that follows a program instruction in the fourth input program corresponding to the last program instruction of a first small block, to an end of the first small block.

(13) In, the above-described program obfuscating device of (12), when last program instruction of the first small block is not an unconditional branch instruction, the replacement object block generating unit generates a replacement object block by adding a branch instruction, which branches to the second small block that corresponds to the program instruction that follows the program instruction in the fourth input program, to the end of the first small block.

(14) The above-described program obfuscating device of (1) or (2) further including: a small block-generating unit that generates small blocks each of which is composed of one or more program instructions, by dividing each program instruction group, which is contained in a fourth input program, is not a dummy block, and is composed of program instructions not contained in any dummy blocks, into the small blocks; a replacement object block generating unit that generates replacement object blocks respectively from tiny blocks that are the small blocks and/or the dummy blocks; and a post arrangement order change program generating unit that generates a fourth output program by changing an arrangement order of the replacement object blocks, wherein the replacement object block generating unit generates a replacement object block by adding a branch instruction, which branches to a second tiny block that corresponds to a program instruction that follows a program instruction in the fourth input program corresponding to the last program instruction of a first tiny block, to an end of the first tiny block.

(15) The above-described program obfuscating device of (1) or (2) further including: a replacement object block generating unit that generates replacement object blocks respectively from small blocks each of which is either a dummy block or a post-division block contained in a fourth input program; and a post arrangement order change program generating unit that generates a fourth output program by changing an arrangement order of the replacement object blocks, wherein the replacement object block generating unit generates a replacement object block by adding a branch instruction, which branches to a second small block that corresponds to a program instruction that follows a program instruction in the second input program corresponding to the last program instruction of a first small block, to an end of the first small block.

INDUSTRIAL APPLICABILITY

The above-described program obfuscating device can be manufactured and sold effectively, namely repetitively and continuously, in the industry for manufacturing electric devices. Also, the program obfuscating device of the present invention can be used effectively, namely repetitively and continuously, in the service industry for encrypting and distributing copyrighted data.

The invention claimed is:

1. A program obfuscating device for generating an obfuscated program from an original program which is composed of one or more authorized program instructions so that an execution result of the obfuscated program in general use is identical with an execution result of the original program, the program obfuscating device comprising:
a storage unit storing the original program;
a dummy block generating unit operable to generate a dummy block that is composed of dummy process instructions that are not required for obtaining the execution result in the general use; and
a dummy block inserting unit operable to insert the dummy block and a control instruction into the original program, and to insert a branch instruction into the dummy block generated by the dummy block generating unit, the control instruction causing the dummy block to be bypassed,
wherein the dummy block includes the branch instruction and an instruction executed before an execution of the branch instruction when the dummy block is executed,
wherein the instruction executed before the execution of the branch instruction is not a branch instruction, and
wherein the dummy block is not executed in the general use.

2. The program obfuscating device of claim 1,
wherein the original program includes a confidential process instruction group that contains confidential information that is to be kept confidential,
wherein the program obfuscating device further comprises:
a process instruction generating unit operable to generate a plurality of process instructions which provide a same result as the confidential process instruction group, by executing the process instructions in a predetermined calculation order; and
a process instruction inserting unit operable to insert the plurality of process instructions into the original program at a position between a start of the original program and the confidential process instruction group so as to be executed in the predetermined processing order, in place of the confidential process instruction group, and
wherein the dummy block generating unit generates the dummy block so that the dummy block is confused with the plurality of process instructions.

3. The program obfuscating device of claim 2,
wherein the dummy block inserting unit inserts into the generated dummy block, a branch instruction whose branch destination is either an execution program instruction executed in the general use or a dummy process instruction contained in another dummy block.

4. The program obfuscating device of claim 3,
wherein the execution program instruction is either one of the authorized program instructions or one of the process instructions.

5. The program obfuscating device of claim 2,
wherein the confidential process instruction group is a confidential calculation expression that contains the confidential information as an object of the expression,
wherein each of the process instructions is a calculation expression that substitutes a calculation result for a secret variable,
wherein each of the dummy process instructions is a dummy calculation expression whose calculation object is the secret variable,
wherein the process instruction generating unit generates a plurality of calculation expressions which provide a same result as the confidential calculation expression, by executing the calculation expressions in a predetermined calculation order, and
wherein the process instruction inserting unit includes:
a replacement subunit operable to replace the confidential information contained in the original program with the secret variable; and
an inserting subunit operable to insert the plurality of calculation expressions into the original program at a position between a start of the original program and the confidential process instruction group so as to be executed in the predetermined calculation order.

6. The program obfuscating device of claim 2,
wherein the original program contains a plurality of original blocks, each of which containing one or more authorized program instructions, the original blocks being arranged in an order of execution, wherein the process instruction inserting unit inserts each of the plurality of process instructions into a different original block among a series of original blocks from an original block to be executed first to an original block containing the confidential process instruction group, and wherein the dummy block inserting unit includes:

a first generating subunit operable to generate a graph by regarding each of the plurality of original blocks and the dummy block as a node, the graph being generated based on (a) an order of execution of the original blocks, (b) branch instructions contained in the original blocks, and (c) branch instructions contained in the dummy block;

a judging subunit operable to judge whether or not a difficulty level of the generated graph satisfies a predetermined condition;

a second generating subunit operable to insert the dummy block and the control instruction into the original program when the judging subunit judges that the difficulty level satisfies the predetermined condition, and to insert a conditional branch instruction, whose branch destination is an original block among the plurality of original blocks and another dummy block, into the dummy block when the judging subunit judges that the difficulty level does not satisfy the predetermined condition; and a control subunit operable to perform a control such that the first generating subunit, the judging subunit, and the second generating subunit continue to perform processes thereof until the predetermined condition is satisfied.

7. The program obfuscating device of claim 6, further comprising a receiving unit operable to receive a specified obfuscation strength, wherein the judging subunit judges that the predetermined condition is satisfied when a value "(number of edges)–(number of nodes)", which is obtained from a number of edges connecting nodes and a number of nodes, is not smaller than a predetermined number that is determined according to a graph difficulty level corresponding to the specified obfuscation strength, and wherein the judging subunit obtains the number of edges and the number of nodes from the graph generated by the first generating subunit, and judges whether the value "(number of edges)–(number of nodes)" is not smaller than the predetermined number.

8. The program obfuscating device of claim 6, further comprising a receiving unit operable to receive a specified obfuscation strength, wherein the judging subunit judges that the predetermined condition is satisfied when a number of closed paths in a graph is not smaller than a predetermined number that is determined according to a graph difficulty level corresponding to the specified obfuscation strength, and wherein the judging subunit obtains the number of closed paths from the graph generated by the first generating subunit, and judges whether the obtained number of closed paths is not smaller than the predetermined number.

9. The program obfuscating device of claim 6, wherein, when the graph is not a planar graph, the judging subunit judges that the predetermined condition is satisfied, and wherein the judging subunit judges whether or not the graph generated by the first generating subunit is a planar graph, and judges that the predetermined condition is satisfied when the judging subunit has judged the graph is not a planar graph.

10. The program obfuscating device of claim 6, further comprising a receiving unit operable to receive a specified obfuscation strength, wherein the judging subunit judges that the predetermined condition is satisfied when a number of closed paths, each of which is composed of a first predetermined number or more of nodes, is not smaller than a second predetermined number that is determined according to a graph difficulty level corresponding to the specified obfuscation strength, and wherein the judging subunit obtains the number of closed paths, each of which is composed of the first predetermined number or more of nodes, from the graph generated by the first generating subunit, and judges whether the obtained number of closed paths is not smaller than the second predetermined number.

11. The program obfuscating device of claim 6, wherein the dummy block inserting unit inserts into each of the plurality of original blocks, a conditional branch instruction which contains a comparative expression with which a constant truth value is provided when each calculation is executed in a predetermined calculation order, wherein a branch destination of the conditional branch instruction is a next original block that is to be executed immediately after the original block in which the conditional branch instruction is inserted, when a comparison result of the comparative expression is the constant truth value, and wherein the control instruction is a conditional branch instruction inserted in an original block immediately after which a dummy block is inserted.

12. The program obfuscating device of claim 2, wherein the original program contains a plurality of original blocks, each of which containing one or more authorized program instructions, the original blocks being arranged in an order of execution, wherein the process instruction inserting unit inserts each of the plurality of process instructions into an original block among a series of original blocks from an original block to be executed first to an original block containing the confidential process instruction group, and wherein the dummy block inserting unit includes:

a first generating subunit operable to generate a graph by regarding each of the plurality of original blocks and the dummy block as a node, the graph being generated based on (a) an order of execution of the original blocks, (b) branch instructions contained in the original blocks, and (c) branch instructions contained in the dummy block;

a judging subunit operable to judge whether or not a strength of the generated graph satisfies a predetermined condition;

a second generating subunit operable to insert the dummy block and the control instruction into the original program when the judging subunit judges that the strength satisfies the predetermined condition, and to either (i) insert a conditional branch instruction, whose branch destination is an original block among the plurality of original blocks and another dummy block, into the dummy block, or (ii)

insert a conditional branch instruction, whose branch destination is a dummy block and which never branches to the branch destination, into an original block when the judging subunit judges that the strength does not satisfy the predetermined condition; and a control subunit operable to perform a control such that the first generating subunit, the judging subunit, and the second generating subunit continue to perform processes thereof until the predetermined condition is satisfied.

13. The program obfuscating device of claim 2,
wherein the process instruction generating unit generates the plurality of process instructions such that the process instructions provide the same result as the confidential process instruction group only when the process instructions are executed in the predetermined processing order.

14. The program obfuscating device of claim 2,
wherein the original program has been preliminarily divided into a plurality of post-division blocks, each of which including one or more authorized program instructions, the post-division blocks being arranged in an order of execution,
wherein the process instruction inserting unit inserts each of the plurality of process instructions into a post-division block among a series of post-division blocks from a post-division block to be executed first to a post-division block containing the confidential process instruction group,
wherein the dummy block inserting unit includes:
  a dividing subunit operable to divide the original program into the plurality of post-division blocks, each of which including one or more authorized program instructions;
  a replacement object block generating subunit operable to generate one or more replacement object blocks respectively from one or more post-division blocks among the plurality of post-division blocks excluding a post-division block that includes an authorized program instructions that is to be executed last in the original program, each of the one or more replacement object blocks including a branch instruction indicating a post-division block to be executed next; and
  a block replacement subunit operable to replace with each other, in an arrangement order, (a) one or more replacement object blocks excluding a replacement object block that includes an authorized program instruction that is to be executed first in the original program and (b) the post-division block that includes the authorized program instruction to be executed last in the original program; and
  an inserting subunit operable to insert the dummy block into the original program, and
wherein the control instruction is a branch instruction contained in a replacement object block immediately after which a dummy block is inserted.

15. The program obfuscating device of claim 14,
wherein the replacement object block generating subunit further generates dummy replacement object blocks respectively from the plurality of dummy post-division blocks, each of the dummy replacement object blocks including a branch instruction indicating one dummy block or a dummy post-division block other than a current dummy post-division block, and wherein the inserting subunit inserts the dummy replacement object blocks into the original program.

16. The program obfuscating device of claim 2,
wherein the dummy block and one of the plurality of process instructions include an identical variable,
wherein the one of the plurality of process instructions is executed in the general use, and
wherein the identical variable included in the one of the plurality of process instructions is used to obtain the confidential information.

17. The program obfuscating device of claim 1,
wherein the dummy block inserting unit includes:
  a dividing subunit operable to divide the original program into a plurality of post-division blocks each of which includes one or more authorized program instructions;
  a replacement object block generating subunit operable to generate one or more replacement object blocks from one or more post-division blocks among the plurality of post-division blocks and excluding a post-division block that includes an authorized program instruction that is to be executed last in the original program, each of the one or more replacement object blocks including a branch instruction indicating a post-division block to be executed next;
  a block replacement subunit operable to replace with each other, in an arrangement order, (a) one or more replacement object blocks excluding a replacement object block that includes an authorized program instruction that is to be executed first in the original program and (b) the post-division block that includes the authorized program instruction to be executed last in the original program; and
  an inserting subunit operable to insert the dummy block into the original program, and
wherein the control instruction is a branch instruction contained in a replacement object block immediately after which a dummy block is inserted.

18. The program obfuscating device of claim 17,
wherein the dividing subunit further divides the dummy block into a plurality of dummy post-division blocks, each of which including one or more program instructions,
wherein the replacement object block generating subunit further generates dummy replacement object blocks respectively from the plurality of dummy post-division blocks, each of the dummy replacement object blocks including a branch instruction indicating a dummy post-division block other than a current dummy post-division block, and
wherein the inserting subunit inserts the dummy replacement object blocks into the original program.

19. The program obfuscating device of claim 17,
wherein the replacement object block generating subunit further generates dummy replacement object blocks respectively from the plurality of dummy blocks, each of the dummy replacement object blocks including a branch instruction indicating one divided block or a dummy block other than a current dummy block, and
wherein the inserting subunit inserts the dummy replacement object blocks into the original program.

20. The program obfuscating device of claim 1,
wherein the branch instruction included in the dummy block is a conditional branch instruction.

21. The program obfuscating device of claim 1,
wherein the dummy process instructions included in the dummy block, which is not executed in the general use, are program instructions in which the same variables or operators are used as in equivalent authorized program instructions of the original program.

22. The program obfuscating device of claim 1, wherein the dummy block generating unit generates a plurality of the dummy blocks in accordance with a predetermined number that is determined in accordance with a desired obfuscation strength.

23. A program obfuscating method for use in a program obfuscating device for generating an obfuscated program from an original program which is composed of one or more authorized program instructions so that an execution result of the obfuscated program in general use is identical with an execution result of the original program, wherein the program obfuscating device includes a storage unit storing the original program, the program obfuscating method comprising:
    generating a dummy block that is composed of dummy process instructions that are not required for obtaining the execution result in the general use;
    inserting the dummy block and a control instruction into the original program, the control instruction causing the dummy block to be bypassed; and
    inserting a branch instruction into the dummy block generated in the dummy block generating step,
    wherein the dummy block includes the branch instruction and an instruction executed before an execution of the branch instruction when the dummy block is executed,
    wherein the instruction executed before the execution of the branch instruction is not a branch instruction, and
    wherein the dummy block is not executed in the general use.

24. A non-transitory computer readable recording medium having stored thereon an obfuscation program generation program for use in a program obfuscating device for generating an obfuscated program from an original program which is composed of one or more authorized program instructions so that an execution result of the obfuscated program in general use is identical with an execution result of the original program,
    wherein the program obfuscating device includes a storage unit storing the original program, and
    wherein, when executed, the obfuscation program generation program causes the obfuscating device to perform a method comprising:
    generating a dummy block that is composed of dummy process instructions that are not required for obtaining the execution result in the general use;
    inserting the dummy block and a control instruction into the original program, the control instruction causing the dummy block to be bypassed; and
    inserting a branch instruction into the dummy block generated in the dummy block generating step,
    wherein the dummy block includes the branch instruction and an instruction executed before an execution of the branch instruction when the dummy block is executed,
    wherein the instruction executed before the execution of the branch instruction is not a branch instruction, and
    wherein the dummy block is not executed in the general use.

25. An integrated circuit for a program obfuscating device for generating an obfuscated program from an original program which is composed of one or more authorized program instructions so that an execution result of the obfuscated program in general use is identical with an execution result of the original program, the integrated circuit comprising:
    a storage unit storing the original program;
    a dummy block generating unit operable to generate a dummy block that is composed of dummy process instructions that are not required for obtaining the execution result in the general use; and
    a dummy block inserting unit operable to insert the dummy block and a control instruction into the original program, and to insert a branch instruction into the dummy block generated by the dummy block generating unit, the control instruction causing the dummy block to be bypassed,
    wherein the dummy block includes the branch instruction and an instruction executed before an execution of the branch instruction when the dummy block is executed,
    wherein the instruction executed before the execution of the branch instruction is not a branch instruction, and
    wherein the dummy block is not executed in the general use.

* * * * *